(12) United States Patent
Meng et al.

(10) Patent No.: US 11,769,249 B2
(45) Date of Patent: Sep. 26, 2023

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Xiaolin Meng, Shanghai (CN); Xin Weng, Shanghai (CN); Libo Zhang, Shanghai (CN); Qi Duan, Shanghai (CN); Shuai Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 429 days.

(21) Appl. No.: 16/994,733

(22) Filed: Aug. 17, 2020

(65) Prior Publication Data
US 2020/0388034 A1 Dec. 10, 2020

Related U.S. Application Data

(60) Division of application No. 16/022,873, filed on Jun. 29, 2018, now Pat. No. 10,748,280, which is a
(Continued)

(30) Foreign Application Priority Data

Dec. 31, 2015 (CN) .......................... 201511027638.5
Nov. 25, 2016 (CN) .......................... 201611061730.8

(51) Int. Cl.
*G06T 7/00* (2017.01)
*G06T 3/00* (2006.01)
(Continued)

(52) U.S. Cl.
CPC .............. *G06T 7/0012* (2013.01); *G06T 3/00* (2013.01); *G06T 3/0037* (2013.01); *G06T 7/11* (2017.01);
(Continued)

(58) Field of Classification Search
None
See application file for complete search history.

(56) References Cited

U.S. PATENT DOCUMENTS 6,229,521 B1  5/2001 Yip
6,694,057 B1  2/2004 Miller et al.
(Continued)

FOREIGN PATENT DOCUMENTS

CN  101082983  12/2007
CN  101373541  2/2009
(Continued)

OTHER PUBLICATIONS

Neubauer, Andre. Virtual Endoscopy for preoperative planning and training of endonasal transsphenoidal pituitary surgery. Diss. Neubauer, 2005. (Year: 2005).*
(Continued)

*Primary Examiner* — Sean M Conner
(74) *Attorney, Agent, or Firm* — METIS IP LLC

(57) ABSTRACT

An image processing method is provided, including: obtaining image data of a cavity wall of an organ; unfolding the cavity wall; and generating an image of the unfolded cavity wall. The unfolding of the cavity wall may include: obtaining a mask and a centerline of the organ; obtaining a connected region of the mask; dividing the connected region into at least one equidistant block; determining an orientation of the equidistant block in a three-dimensional coordinate system including a first direction, a second direction and a third direction; determining an initial normal vector
(Continued)

and an initial tangent vector of a center point of the centerline; assigning a projection of the initial normal vector to a normal vector of a light direction of the center point; assigning the third direction or an reverse direction of the third direction to a tangent vector of the light direction of the center point.

18 Claims, 36 Drawing Sheets

Related U.S. Application Data continuation of application No. PCT/CN2016/113387, filed on Dec. 30, 2016.

(51) Int. Cl.
*G06T 7/187* (2017.01)
*G06T 7/11* (2017.01)

(52) U.S. Cl.
CPC .... *G06T 7/187* (2017.01); *G06T 2207/10072* (2013.01); *G06T 2207/30028* (2013.01); *G06T 2207/30172* (2013.01)

(56) References Cited

U.S. PATENT DOCUMENTS

| | | | |
|---|---|---|---|
| 7,212,689 | B2 | 5/2007 | Muresan et al. |
| 2005/0245803 | A1 | 11/2005 | Glenn, Jr. et al. |
| 2007/0120845 | A1 | 5/2007 | Matsumoto |
| 2010/0215226 | A1 | 8/2010 | Kaufman et al. |
| 2011/0018871 | A1 | 1/2011 | Shirahata |
| 2011/0116692 | A1 | 5/2011 | Dekel et al. |
| 2014/0267220 | A1 | 9/2014 | Mehta et al. |
| 2015/0123970 | A1 | 5/2015 | Gyger et al. |
| 2017/0003366 | A1* | 1/2017 | Jafari-Lhouzani .... G06T 7/0012 |

FOREIGN PATENT DOCUMENTS

| | | | |
|---|---|---|---|
| CN | 101794460 | | 8/2010 |
| CN | 103295262 | | 9/2013 |
| CN | 104112265 | | 10/2014 |
| CN | 104167010 | | 11/2014 |
| CN | 104200511 | | 12/2014 |
| CN | 104240215 | | 12/2014 |
| CN | 104574364 | | 4/2015 |
| CN | 105550985 | | 5/2016 |
| CN | 105957066 | A | 9/2016 |
| WO | WO-2012037091 | A1 * | 3/2012 ............. G06T 15/08 |
| WO | 2012099843 | A2 | 7/2012 |
| WO | 2016007432 | A1 | 1/2016 |

OTHER PUBLICATIONS

Yoshitaka Masutani et al., Automated Segmentation of Colonic Walls for Computerized Detection of Polyps in CT Colonography, Journal of Computer Assisted Tomography, 25(4): 629-638, 2001.
Alberto Bert et al., An Automatic Method for Colon Segmentation in CT Colonography. Computerized Medical Imaging and Graphics, 33: 325-331, 2009.
Mie Sato et al., An automatic colon segmentation for 3D virtual colonoscopy, IEICE Trans. Information and Systems, 2000, 8 pages.
Sarang Lakare et al., Electronic Colon Cleansing Using Segmentation Rays for Virtual Colonoscopy, Medical Imaging, 412-418, 2002.
CT Colonography Manual by GE Medical Systems, 123 pages.
Instructions for Use The Philips Extended Brilliance Workspace, 992 pages.
Syngo, CT Colonography Manual, 2012, 76 pages.
Wan, Ming et al., Automatic Centerline Extraction for Virtual Colonoscopy, IEEE Transactions on Medical Imaging, 21(12): 1450-1460, 2002.
Klaus Engel et al., Real-Time Volume Graphics, ACM Siggraph 2004 Course Notes, 2004, 504 pages.
Wang, Wei et al., Research of VTK-based 3D Reconstruction of the Fruits and Visualization, Agricultural Mechanization Research, 1: 45-48, 2011.
International Search Report in PCT/CN2016/113387 dated Apr. 10, 2017, 7 pages.
Written Opinion in PCT/CN2016/113387 dated Apr. 10, 2017, 10 pages.
First Office Action in Chinese Application No. 201511027638.5 dated Feb. 26, 2018, 13 pages.
First Office Action in Chinese Application No. 201611061730.8 dated Sep. 30, 2018, 16 pages.
Third Office Action in Chinese Application No. 201611061730.8 dated Feb. 3, 2020, 10 pages.

* cited by examiner

SYSTEMS AND METHODS FOR IMAGE PROCESSING

CROSS-REFERENCE TO RELATED APPLICATIONS

This application is a divisional application of U.S. patent application Ser. No. 16/022,873, filed on Jun. 29, 2018, which is a continuation of International Application No. PCT/CN2016/113387, filed on Dec. 30, 2016, which claims priority to Chinese Application No. 201511027638.5, filed on Dec. 31, 2015, and Chinese Application No. 201611061730.8, filed on Nov. 25, 2016, the entire contents of each of which are hereby incorporated by reference.

TECHNICAL FIELD

This disclosure generally relates to a system and method for image processing, and more particularly, a system and method for processing an image relating to an organ of a medical image.

BACKGROUND

With the development of medical image processing technique and three-dimensional visualization technique, image processing technique including virtual endoscopy, a technique for unfolding a cavity wall of an organ, etc. may be applied widely with significant advantages of non-invasion, repeatability, etc. The virtual endoscopy technique may be mainly used in one or more organs with a cavity tissue structure, such as a colon, a trachea, a blood vessel, an inner ear, etc. For example, the virtual endoscopy may offer a minimally invasive colonoscopy way. Thus, one or more intestinal polyps may be detected in advance, and an occurrence of colon cancer may be prevented. The technique for unfolding a cavity wall of an organ may be mainly used for converting a three dimensional (3D) view of a cavity wall to a two dimensional (2D) plane view thereof, so as to facilitate observing and comparing one or more tissues inside the cavity wall, finding a pathological tissue and displaying it, thereby benefiting subsequent diagnosis and treatment. For example, the technique for unfolding a cavity wall of an organ may offer a way for unfolding an intestinal wall into a 2D plane view.

SUMMARY

According to an aspect of the present disclosure, an image processing method is provided. The image processing method may be implemented on at least one machine each of which has at least one processor and storage. The method may include one or more of the following operations: obtaining at least one type of image data, the at least one type of image data being related to a cavity wall of an organ; unfolding the cavity wall of the organ; and generating an image relating to the unfolded cavity wall of the organ.

The unfolding of the cavity wall of the organ may include: obtaining a mask of the organ and a centerline of the organ; obtaining a connected region of the mask; dividing the connected region into at least one equidistant block; determining an orientation of the at least one equidistant block in a three-dimensional coordinate system, wherein the orientation may include a first direction, a second direction, and a third direction; determining an initial normal vector and an initial tangent vector of a first center point of the centerline; assigning a projection of the initial normal vector in a plane of the first direction and the second direction to a normal vector of a first light direction of the first center point; and assigning the third direction or an reverse direction of the third direction to a tangent vector of the first light direction of the first center point.

In some embodiments, the obtaining of the mask of the organ may include segmenting an image relating to a colon. The segmenting of the image relating to the colon may include: segmenting the image relating to the colon based on the at least one type of image data; executing a first compensation to compensate a lost rectum segment in the segmented image relating to the colon; segmenting a liquid region based on the segmented image relating to the colon; performing reverse detection based on the liquid region; and executing a second compensation to compensate a lost colon segment in the segmented image relating to the colon.

In some embodiments, the performing of reverse detection may include: obtaining at least one boundary voxel of the liquid region; and detecting an air point from the at least one boundary voxel in a reverse direction of an axial direction of the first compensated image relating to the colon.

In some embodiments, the unfolding of the cavity wall of the organ may further include eliminating an adhesion structure of the colon. The eliminating of the adhesion structure of the colon may include: obtaining a binary image of the colon; determining the adhesion structure of the colon in the binary image; determining a starting location and an ending location of the adhesion structure; and determining a first candidate path between the starting location and the ending location. In some embodiments, the eliminating of the adhesion structure of the colon may include: determining at least one second candidate path between the starting location and the ending location, wherein the second candidate path may be different from the first candidate path; cutting off the second candidate path; determining a plurality of characteristic values corresponding to a plurality of equidistant blocks on the first candidate path; removing an equidistant block that has a characteristic value greater than a threshold; and compensating the removed equidistant block.

In some embodiments, the obtaining of the centerline of the organ may include: obtaining a maximum intensity projection (MIP) image of the mask related to a plurality of segments of the colon; determining an arranging score for each segment of the plurality of segments of the colon; obtaining a starting point and an ending point of the each segment of the plurality of segments; and connecting the starting point and the ending point of the each segment of the plurality of segments successively.

In some embodiments, the image processing method may include one or more of the following operations: obtaining a sample result by sampling the cavity wall of the organ based on the centerline and the first light direction of the first center point; mapping the sample result to a two-dimensional plane; and generating a two-dimensional image relating to an unfolded cavity wall of the organ in the two-dimensional plane.

In some embodiments, the determining of the initial normal vector and the initial tangent vector of the first center point of the centerline may include: determining a minimum rotation of the initial normal vector, the minimum rotation inducing a minimum intersection angle between the normal vector of the first center point and a normal vector of a center point adjacent to the first center point.

In some embodiments, the dividing of the connected region into at least one equidistant block may include:

designating intersection points of the centerline and two side surfaces of the connected region as a starting point and an ending point respectively; determining a complementary geodesic distance field (CGDF) between a point of the connected region and the starting point or the ending point; and dividing the connected region into the at least one equidistant block based on the CGDF.

In some embodiments, the unfolding of the cavity wall of the organ may further include correcting the first light direction, and the correcting of the first light direction may include: determining a second center point of the centerline; obtaining a second light direction of the second center point parallel to the first light direction of the first center point; obtaining a cavity wall unfolding direction of at least one of the first center point or the second center point of the centerline; and adjusting a center point of the centerline whose cavity wall unfolding direction has not been obtained.

In some embodiments, the determining of the second center point of the centerline may include: obtaining at least two unfolding points of a center point of the centerline; determining two distances between the at least two unfolding points and the center point, respectively; and determining the second center point based on the two distances between the at least two unfolding points and the center point, respectively.

In some embodiments, the image processing method may further include: selecting a front control point and a back control point of the second center point; and determining an overlapping situation between a first unfolding surface corresponding to the front control point and a second unfolding surface corresponding to the back control point.

In some embodiments, the image processing method may further include: obtaining a third center point between the front control point and the back control point; obtaining a first determination result based on the determination that the first unfolding surface and the second unfolding surface have no overlapping; determining at least one unfolding direction of the third center point by interpolation of the front control point and the back control point based on the first determination result; obtaining a second determination result based on the determination that the first unfolding surface and the second unfolding surface have a forward overlapping or middle overlapping; moving the front control point until the overlapping situation between a first unfolding surface and a second unfolding surface of the moved front control point is adjusted to no overlapping or backward overlapping, based on the second determination result; obtaining a third determination result based on the determination that the first unfolding surface and the second unfolding surface have a backward overlapping; and extending a distance between the third center point and the back control point by designating a tangent vector and a normal vector of the third center point as the tangent vector and the normal vector of the back control point, until the overlapping situation between the first unfolding surface and the second unfolding surface is adjusted to no overlapping, based on the third determination result.

In some embodiments, the image processing method may further include: designating the back control point as a last center point based on the determination that the back control point goes beyond the ending point of the centerline; and extending the distance between the third center point and the back control point by designating the tangent vector and the normal vector of the third center point as the tangent vector and the normal vector of the back control point, until the overlapping situation between the first unfolding surface and the second unfolding surface is adjusted to no overlapping.

According to another aspect of the present disclosure, an image processing method is provided. The image processing method may be implemented on at least one machine each of which has at least one processor and storage. The method may include one or more of the following operations: obtaining an image relating to volume data of a plurality of tissues, wherein a plurality of labels of the plurality of tissues may be organized in a tissue set; selecting a sample point based on the volume data; obtaining a plurality of neighboring points of the sample point, wherein labels of the plurality of neighboring points may be organized in a neighboring point set; determining whether the labels of the plurality of neighboring points belong to the tissue set; determining a color of the sample point based on the determination result; and obtaining a volume rendering result of the plurality of tissues based on the color of the sample point.

According to a further aspect of the present disclosure, an image processing system is provided. The image processing system may include at least one processor and a storage, and the system may further include: an input/output module configured to obtain at least one type of image data, the at least one type of image data being related to a cavity wall of an organ; and a processing module including an image segmentation unit configured to obtain a mask of the organ, the mask including at least one connected region; a centerline determination unit configured to extract a centerline of the organ; and a cavity wall unfolding unit configured to divide the connected region into at least one equidistant block and generate an image relating to the unfolded cavity wall of the organ. The cavity wall unfolding unit may determine an orientation of the at least one equidistant block in a three-dimensional coordinate system, wherein the orientation may include a first direction, a second direction, and a third direction, determine an initial normal vector and an initial tangent vector of a first center point of the centerline; assign a projection of the initial normal vector in a plane of the first direction and the second direction to a normal vector of a first light direction of the first center point; assign the third direction or an reverse direction of the third direction to a tangent vector of the first light direction of the first center point.

In some embodiments, the obtaining of the mask of the organ comprises segmenting an image relating to a colon may include: segmenting the image relating to the colon based on the at least one type of image data; executing a first compensation to compensate a lost rectum segment in the segmented image relating to the colon; segmenting liquid regions based on the segmented image relating to the colon; performing reverse detection based on the liquid region; and executing a second compensation to compensate lost colon segments in the segmented image relating to the colon.

In some embodiments, the performing of reverse detection may include: obtaining at least one boundary voxel of the liquid region; and detecting an air point from the at least one boundary voxel in a reverse direction of an axial direction of the first compensated image relating to the colon.

In some embodiments, the image segmentation unit may be further configured to eliminate an adhesion structure of the colon, and wherein the eliminating of the adhesion structure of the colon may include: obtaining a binary image of the colon; determining the adhesion structure of the colon in the binary image; determining a starting location and an ending location of the adhesion structure; and determining a first candidate path between the starting location and the ending location.

In some embodiments, the eliminating of the adhesion structure of the colon may further include: determining at least one second candidate path between the starting location and the ending location, wherein the second candidate path may be different from the first candidate path; cutting off the second candidate path; determining a plurality of characteristic values corresponding to a plurality of equidistant blocks on the first candidate path; removing an equidistant block that has a characteristic value greater than a threshold; and compensating the removed equidistant block.

In some embodiments, the centerline determination unit may be further configured to: obtain a maximum intensity projection (MIP) image of the mask related to a plurality of segments of the colon; determine an arranging score for each segment of the plurality of segments of the colon; obtain a starting point and an ending point of the each segment of the plurality of segments; and connect the starting point and the ending point of the each segment of the plurality of segments successively.

In some embodiment, the cavity wall unfolding unit may be further configured to: obtain a sample result by sampling the cavity wall of the organ based on the centerline and the first light direction of the first center point; map the sample result to a two-dimensional plane; and generate a two-dimensional image relating to an unfolded cavity wall of the organ in the two-dimensional plane.

In some embodiments, the determining of the initial normal vector and the initial tangent vector of the first center point of the centerline may include: determining a minimum rotation of the initial normal vector, the minimum rotation inducing a minimum intersection angle between the normal vector of the first center point and a normal vector of an center point adjacent to the first center point.

In some embodiments, the dividing of the connected region into at least one equidistant block may include: designating intersection points of the centerline and two side surfaces of the connected region as a starting point and an ending point respectively; determining a complementary geodesic distance field (CGDF) between a point of the connected region and the starting point or the ending point; and dividing the connected region into the at least one equidistant block based on the CGDF.

In some embodiments, the cavity wall unfolding unit may be further configured to correct the first light direction, and wherein the correcting of the first light direction may include: determining a second center point of the centerline; obtaining a second light direction of the second center point parallel to the first light direction of the first center point; obtaining a cavity wall unfolding direction of at least one of the first center point or the second center point of the centerline; and adjusting a center point of the centerline whose cavity wall unfolding direction has not been obtained.

In some embodiments, the determining of the second center point of the centerline may include: obtaining at least two unfolding points of a center point of the centerline; determining two distances between the at least two unfolding points and the center point, respectively; and determining the second center point based on the two distances between the at least two unfolding points and the center point, respectively.

According to a further aspect of the present disclosure, an image processing system is provided. The image processing system may include at least one processor and a storage, and the system may further include: a cavity wall unfolding unit. The cavity wall unfolding unit may be configured to: select a front control point and a back control point of the second center point; and determine an overlapping situation between a first unfolding surface corresponding to the front control point and a second unfolding surface corresponding to the back control point.

In some embodiments, the cavity wall unfolding unit may be further configured to: obtain a third center point between the front control point and the back control point; obtain a first determination result based on the determination that the first unfolding surface and the second unfolding surface have no overlapping; determine at least one unfolding direction of the third center point by interpolation of the front control point and the back control point based on the first determination result; obtain a second determination result based on the determination that the first unfolding surface and the second unfolding surface have a forward overlapping or middle overlapping; move the front control point until the overlapping situation between a first unfolding surface and a second unfolding surface of the moved front control point is adjusted to no overlapping or backward overlapping, based on the second determination result; obtain a third determination result based on the determination that the first unfolding surface and the second unfolding surface have a backward overlapping; and extend a distance between the third center point and the back control point by designating a tangent vector and a normal vector of the third center point as the tangent vector and the normal vector of the back control point, until the overlapping situation between the first unfolding surface and the second unfolding surface is adjusted to no overlapping, based on the third determination result.

In some embodiments, the cavity wall unfolding unit may be further configured to: designate the back control point as a last center point based on the determination that the back control point goes beyond the ending point of the centerline; and extend the distance between the third center point and the back control point by designating the tangent vector and the normal vector of the third center point as the tangent vector and the normal vector of the back control point, until the overlapping situation between the first unfolding surface and the second unfolding surface is adjusted to no overlapping.

According to a further aspect of the present disclosure, an image processing system is provided. The image processing system may include at least one processor and a storage, and the system may further include: a cavity wall unfolding unit. The cavity wall unfolding unit may be configured to: obtain an image relating to volume data of a plurality of tissues, wherein a plurality of labels of the plurality of tissues may be organized in a tissue set; select a sample point based on the volume data; obtain a plurality of neighboring points of the sample point, wherein labels of the plurality of neighboring points may be organized in a neighboring point set; determine whether the labels of the plurality of neighboring points belong to the tissue set; determine a color of the sample point based on the determination result; and obtain a volume rendering result of the plurality of tissues based on the color of the sample point.

According to a further aspect of the present disclosure, a non-transitory computer readable medium storing instructions is provided. The instructions, when executed by at least one machine, may cause the at least one machine to implement a method comprising: obtaining at least one type of image data, the at least one type of image data being related to a cavity wall of an organ; unfolding the cavity wall of the organ; and generating an image relating to the unfolded cavity wall of the organ.

The unfolding of the cavity wall of the organ may include: obtaining a mask of the organ and a centerline of the organ;

obtaining a connected region of the mask; dividing the connected region into at least one equidistant block; determining an orientation of the at least one equidistant block in a three-dimensional coordinate system, wherein the orientation may include a first direction, a second direction, and a third direction; determining an initial normal vector and an initial tangent vector of a first center point of the centerline; assigning a projection of the initial normal vector in a plane of the first direction and the second direction to a normal vector of a first light direction of the first center point; assigning the third direction or an reverse direction of the third direction to a tangent vector of the first light direction of the first center point.

According to a further aspect of the present disclosure, a system is provided. The system may include: at least one processor; and a set of instructions, when executing the set of instructions, the at least one processor may be directed to: obtain at least one type of image data, the at least one type of image data being related to a cavity wall of an organ; unfold the cavity wall of the organ; and generate an image relating to the unfolded cavity wall of the organ.

The unfolding of the cavity wall of the organ may include: obtaining a mask of the organ and a centerline of the organ; obtaining a connected region of the mask; dividing the connected region into at least one equidistant block; determining an orientation of the at least one equidistant block in a three-dimensional coordinate system, wherein the orientation may include a first direction, a second direction, and a third direction; determining an initial normal vector and an initial tangent vector of a first center point of the centerline; assigning a projection of the initial normal vector in a plane of the first direction and the second direction to a normal vector of a first light direction of the first center point; and assigning the third direction or an reverse direction of the third direction to a tangent vector of the first light direction of the first center point.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 8($b$) is a schematic diagram illustrating an exemplary process for determining one or more seed points in segmenting an image relating to a colon according to some embodiments of the present disclosure;

FIG. 8($c$) is a schematic diagram illustrating an exemplary process for determining one or more seed points in segmenting an image relating to a colon according to some embodiments of the present disclosure;

FIG. 10($b$) is a schematic diagram illustrating an exemplary starting location corresponding to a position where an adhesion structure of a colon is located according to some embodiments of the present disclosure;

FIG. 10($c$) is a schematic diagram illustrating an exemplary ending location corresponding to a position where an adhesion structure of a colon is located according to some embodiments of the present disclosure;

FIG. 12($b$) is a schematic diagram illustrating an exemplary geodesic distance field determined based on an ending point according to some embodiments of the present disclosure;

FIG. 12($c$) is a schematic diagram illustrating an exemplary geodesic distance field determined based on a starting point and an ending point according to some embodiments of the present disclosure;

FIG. 15($b$) is a schematic diagram for cutting off one or more other candidate paths except a first candidate path according to some embodiments of the present disclosure;

DETAILED DESCRIPTION

Figure 1:
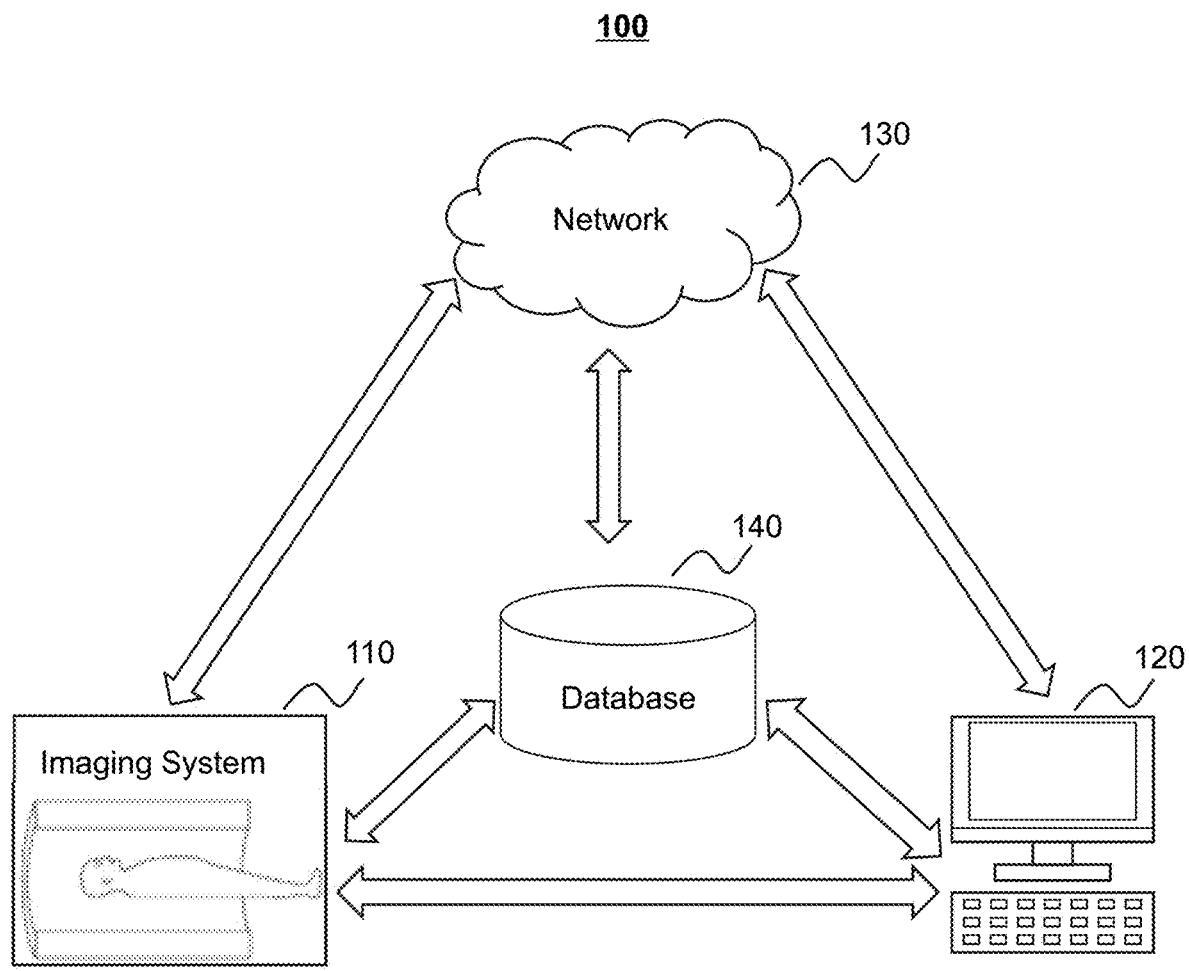
FIG. 1 is a schematic diagram illustrating an exemplary image processing system according to some embodiments of the present disclosure.

In order to illustrate the technical solutions related to the embodiments of the present disclosure more clearly, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As described in the specification and claims, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated steps and elements, but do not preclude the presence or addition of one or more other steps and elements.

Some modules of the system may be referred to in various ways according to some embodiments of the present disclosure, however, any number of different modules may be used and operated in an electric control equipment. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

FIG. 1 is a schematic diagram illustration an exemplary image processing system 100 according to some embodiments of the present disclosure. The image processing system 100 may include an imaging system 110, an image processing device 120, a network 130, and a database 140. In some embodiments, the imaging system 110 may be an independent imaging device, or a multi-modality imaging system. In some embodiments, the image processing device 120 may be a system for analyzing and processing obtained information to output a processing result.

The imaging system 110 may be a single imaging device, or a combination of a plurality of different imaging devices. The imaging device may generate an image by scanning a target object. In some embodiments, the imaging device may be a medical imaging device. The medical imaging device may collect image information of various parts of a human body. In some embodiments, the imaging system 110 may be a positron emission tomography (PET) system, a single photon emission computed tomography (SPECT), a computed tomography (CT) system, a magnetic resonance imaging (MRI) system, a digital radiography (DR) system, a computed tomography colonography (CTC) system, or the like, or any combination thereof. The imaging system 110 may include one or more scanners. The scanner(s) may be a digital subtraction angiography (DSA) scanner, a magnetic resonance angiography (MRA) scanner, a computed tomography angiography (CTA) scanner, a positron emission tomography (PET) scanner, a single photon emission computed tomography (SPECT) scanner, a computed tomography (CT) scanner, a magnetic resonance imaging (MRI) scanner, a digital radiography (DR) scanner, a multi-modality scanner, or the like, or any combination thereof. In some embodiments, the multi-modality scanner may be a computed tomography-positron emission tomography (CT-PET) scanner, a computed tomography-magnetic resonance imaging (CT-MRI) scanner, a positron emission tomography-magnetic resonance imaging (PET-MRI) scanner, a digital subtraction angiography-magnetic resonance imaging (DSA-MRI) scanner, etc.

The image processing device 120 may process obtained data information. In some embodiments, the data information may include text information, image information, sound information, etc., or a combination thereof. In some embodiments, the image processing device 120 may include a processor, a processing core, one or more memories, or the like, or any combination thereof. For example, the image processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a processor, a microprocessor, an advanced RISC machines (ARM) processor, or the like, or any combination thereof. In some embodiments, the image processing device 120 may process image information obtained from the imaging system 110.

The network 130 may be a single network, or a combination of multiple different networks. For example, the network 130 may be a local area network (LAN), a wide area network (WAN), a public network, a private network, a proprietary network, a public switched telephone network (PSTN), the Internet, a wireless network, a virtual network, a metropolitan area network, a telephone network, or the like, or any combination thereof. The network 130 may include one or more network access points, for example, wired and/or wireless access points including a wired access point, a wireless access point, a base station, an Internet exchange point, etc. Through these access points, a data source may access the network 130 and data information may be sent via the network 130. For the convenience of understanding, the imaging system 110 in medical image processing is now taken as an example, and not intended to limit the scope of the present disclosure. For example, the imaging system 110 may be a computed tomography (CT) system or a magnetic resonance imaging (MRI) system, and the network 130 of the image processing system 100 may be a wireless network (Bluetooth and wireless local area networks (WLAN, Wi-Fi, WiMax, etc.)), a mobile network (2G, 3G, 4G signals, etc.), or other connection modes (a virtual private network (VPN), a shared network, a near field communication (NFC) network, ZigBee, etc.). In some embodiments, the network 130 may be used for communication of the image processing system 100, to receive information internal or external to the image processing system 100, and send information outside or to other portions inside the image processing system 100. In some embodiments, the imaging system 110, the image processing device 120, and the database 140 may access the network 130 in a manner of wired connection, wireless connection, or a combination thereof.

The database 140 may be a device with a storage function. The database 140 may be local or remote. In some embodiments, the database 140 or one or more other storage devices in the system may be used to store various information, such as image data. In some embodiments, the database 140 or the other storage device(s) in the system may refer to a medium with a read/write function. The database 140 or the other storage device(s) in the system may be devices inside the system, or external devices outside the system. The connection between the database 140 and the other storage device(s) in the system may be wired or wireless. The database 140 or the other storage device(s) in the system may include a hierarchical database, a network database, a relational database, or the like, or any combination thereof. The database 140 or the other storage device(s) in the system may digitize information before storing it in a storage device using electricity, magnetism, optics, etc.

The database 140 or the other storage device(s) in the system may be a device that stores information by using electrical energy, for example, a random access memory (RAM), a read only memory (ROM), or the like, or any combination thereof. The random access memory RAM may include a decade counting tube, a selectron tube, a delay line memory, a Williams tube, a dynamic random access memory (DRAM), a static random access memory (SRAM), a thyristor random access memory (T-RAM), a zero-capacitor random access memory (Z-RAM), or the like, or any combination thereof. The read only memory ROM may include a bubble memory, a magnetic button line memory, a thin-film memory, a magnetic plated wire memory, a magnetic core memory, a magnetic drum memory, an optical disk drive, a hard disk, a tape, a phase change memory, a flash memory, an electrically-erasable programmable read-only memory, an erasable programmable read only memory, a programmable read only memory, a mask read only memory, a racetrack memory, a resistive random-access memory, a programmable metallization cell, or the like, or any combination thereof. The database 140 or the other storage device(s) in the system may be a device that stores information by using magnetic energy, for example, a hard disk, a floppy disk, a tape, a magnetic core memory, a bubble memory, a USB flash disk, a flash memory, etc. The database 140 or the other storage device(s) in the system may be a device that stores information by using optics, for example, a CD, a DVD, etc. The database 140 or the other storage device(s) in the system may be a device that stores information by using magneto-optics, for example, a magneto-optical disk, etc. An access mode of the database 140 or the other storage device(s) in the system may be random access, serial access, read only, or the like, or any combination thereof. The database 140 or the other storage device(s) in the system may be a volatile memory or a nonvolatile memory. The above-mentioned storage devices are merely examples, and storage devices that the system may use are not limited thereto.

In some embodiments, the database 140 may be arranged at a background of the image processing system 100. In some embodiments, the database 140 may be part of the image processing system 100. In some embodiments, the database 140 may be part of the imaging system 110. In some embodiments, the database 140 may be part of the image processing device 120. In some embodiments, the database 140 may be independent and connected directly to the network 130. In some embodiments, the database 140 may be mainly used to store data collected from the imaging system 110, the image processing device 120, and/or the network 130, and various data used, generated and output during the operation of the image processing device 120. In some embodiments, the connection or communication of the database 140 with the imaging system 100, the image processing device 120, and/or the network 130 may be wired, or wireless, or a combination thereof. In some embodiments, the imaging system 110 may access the database 140, the image processing device 120, etc. directly or via the network 130.

It should be noted that the image processing device 120 and/or the database 140 described above may be actually present in the imaging system 110, or accomplish corresponding function(s) through a cloud computing platform. The cloud computing platform may include a storage cloud platform that is mainly used for storing data, a computing cloud platform that is mainly used for processing data, and an integration cloud computing platform for storing and processing data. The cloud platform used by the imaging system 110 may be a public cloud, a private cloud, a community cloud, or a mixed cloud, etc. For example, some image information and/or data information output from the imaging system 110 may be computed and/or stored by a user cloud platform according to actual needs. Other image information and/or data information may be computed and/or stored by the local image processing device 120 and/or the database 140.

It should be noted that the above description of the image processing system is merely provided for the purposes of illustration, and not intended to limit the scope of the present disclosure. For persons having ordinary skills in the art, after understanding the basic principles of the computing device, the modules may be combined in various ways, or connected with other modules as sub-systems without departing from the principles. Various variations and modifications may be conducted under the teaching of the present disclosure. However, those variations and modifications are still within the scope of the present disclosure described above. For example, the database 140 may be a cloud computing platform with a data storage function, including a public cloud, a private cloud, a community cloud, a mixed cloud, etc. Such changes are all within the protection scope of the present disclosure.

Figure 2:
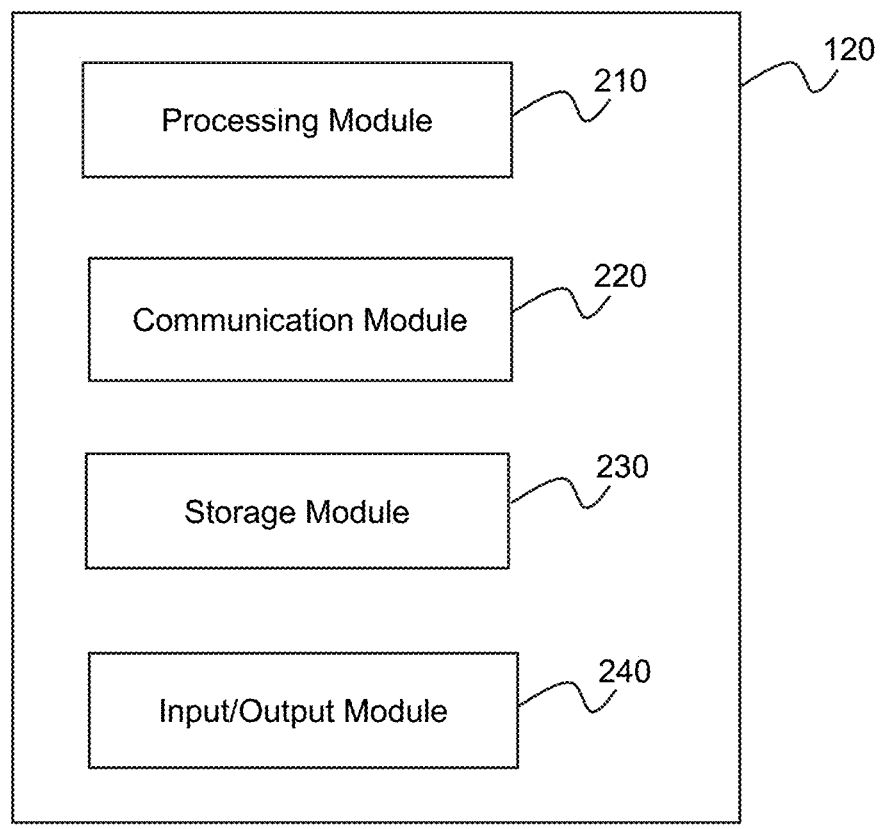
FIG. 2 is a schematic block diagram illustrating an exemplary image processing device in an image processing system according to some embodiments of the present disclosure.

FIG. 2 is a schematic block diagram illustrating an exemplary image processing device 120 according to some embodiments of the present disclosure. The image processing device 120 may include a processing module 210, a communication module 220, and a storage module 230. The image processing device 120 may further include an input/output module 240. The input/output module 240 may receive image data from a plurality of imaging devices of the imaging system 110, and send the image data to the processing module 210. The input/output module 240 may send image data processed by the processing module 210 to the imaging system 110, the network 130, and/or the database 140, etc. connected with the image processing device 120. The connection between the modules of the image processing device 120 may be a wired connection, a wireless connection, and/or a combination thereof. The modules of the image processing device 120 may be local, remote, and/or a combination thereof. The correspondence between the modules of the image processing device 120 may be one-to-one, one-to-many, and/or many-to-many. For example, the image processing device 120 may include one processing module 210 and one communication module 220. As another example, the image processing device 120 may include a plurality of processing modules 210 and a plurality of storage modules 230. The plurality of processing modules 210 may correspond to the plurality of storage modules 230 respectively, so as to process image data from the corresponding storage module 230 respectively.

The input/output module 240 may receive information from one or more other modules of the image processing system 100 or external modules. The input/output module 240 may send the information to the other module(s) of the image processing system 100 or the external module(s). In some embodiments, the input/output module 240 may receive image data generated by the imaging system 110. The image data may include computed tomography image data, X-ray image data, magnetic resonance image data, ultrasonic image data, thermal image data, nuclear image data, light image data, etc. In some embodiments, the information received by the input/output module 240 may be processed in the processing module 210, and/or be stored in the storage module 230. In some embodiments, the input/output module 240 may output image data processed by the processing module 210. In some embodiments, the data received by and/or output from the input/output module 240 may be in digital imaging and communications in medicine (DICOM) format. The DICOM format data may be transmitted and/or stored based on a standard.

The processing module 210 may process image data. In some embodiments, the processing module 210 may obtain image data from the imaging system 110 by the input/output module 240. In some embodiments, the processing module 210 may obtain image data from the database 140 by the input/output module 240. In some embodiments, the processing module 210 may obtain image data from the storage module 230. In some embodiments, the processing module 210 may process obtained image data. The processing may include image segmentation, region growing, threshold segmentation, high pass filtering, Fourier transformation, fitting, interpolation, scattering, volume ray casting, texture mapping, radiation coloring, ray tracing, early ray termination, octree, pseudo-color enhancement, gray window, model-based coding, neural network-based coding, region-based segmentation, or the like, or any combination thereof. In some embodiments, the processing module 210 may process medical image data. The processing may include image segmentation, centerline extraction, image enhancement, image reconstruction, image recognition, polyp detection, or the like, or any combination thereof. For example, in processing an image relating to a colon, a cavity wall of the colon may be unfolded based on colon segmentation and centerline extraction.

In some embodiments, the processing module 210 may include one or more processing elements or devices, for example, a central processing unit (CPU), a graphics processing unit (GPU), a digital signal processor (DSP), a system on a chip (SoC), a microcontroller unit (MCU), or the like, or any combination thereof. In some embodiments, the processing module 210 may include a processing element with a specific function.

The communication module 220 may establish a communication between the image processing device 120 and the network 130. The communication mode of the communication module 220 may include a wired communication and/or a wireless communication. The wired communication may be realized based on a transmission medium including a conducting wire, a cable, an optical fiber cable, a waveguide, a nanomaterial, etc. The wireless communication may include an IEEE 802.11 wireless local area network communication, an IEEE 802.15 wireless communication (e.g., Bluetooth, ZigBee, etc.), a mobile communication (e.g., TDMA, CDMA, WCDMA, TD-SCDMA, TD-LTE, FDD-LTE, etc.), a satellite communication, a microwave communication, a scatter communication, an atmosphere laser communication, etc. In some embodiments, the communication module 220 may encode transmitted information based on one or more encoding modes. The encoding modes may include phase encoding, non-return-to-zero encoding, differential Manchester encoding, or the like, or any combination thereof. In some embodiments, the communication module 220 may select different encoding and transmission modes according to image types. For example, the communication module 220 may encode and/or transmit image data according to a DICOM standard if the image data is in DICOM format.

The storage module 230 may store information. The information may include image data obtained from the input/output module 240, a processing result generated by the processing module 210, etc. The information may include text, number, sound, image, video, or the like, or any combination thereof. In some embodiments, the storage module 230 may be storage devices of various types, such as a solid state disk, a mechanical hard disk, a USB flash drive, a SD memory card, an optical disk, a random access memory (RAM), a read-only memory (ROM), or the like, or any combination thereof. In some embodiments, the storage module 230 may include a local storage or an external storage of the image processing device 120, a storage (such as a cloud storage) accessible through a network communication (e.g., via the network 130), etc. In some embodiments, the storage module 230 may include a data management unit. The data management unit may monitor and manage data in a storage module, delete data whose utilization rate is zero or low, thereby making the storage module 230 maintain a sufficient storage capacity.

It should be noted that the above description of the image processing device 120 is merely provided for the purposes of illustration, and not intended to limit the scope of the present disclosure. For persons having ordinary skills in the art, after understanding the basic principles of the modules, the modules may be combined in various ways, or connected with other modules as sub-systems without departing from the principles. Various variations and modifications may be conducted to the configuration of the processor under the teaching of the present disclosure. However, those variations and modifications are still within the scope of the present disclosure described above. For example, the image processing device 120 may include a control module. The control module may control one or more modules of the image processing device 120 to receive, store, process, or output image data, or the like. For example, the input/output module 240 may obtain information (e.g., an expert opinion) from the network 130, or output information (e.g., shared patient information in a medical system) to the network 130.

Figure 3:
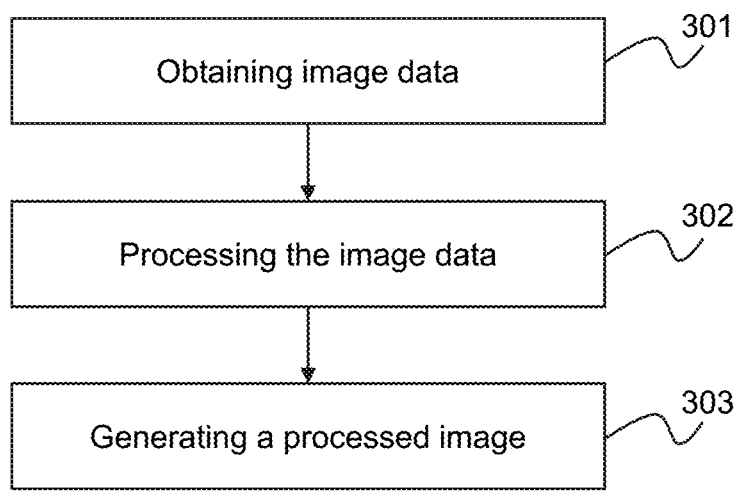
FIG. 3 is a flowchart illustrating an exemplary process for processing an image according to some embodiments of the present disclosure.

FIG. 3 is a flowchart illustrating an exemplary process for processing an image by the image processing system 100 according to some embodiments of the present disclosure. Process 300 may be implemented by the image processing device 120. In 301, image data may be obtained. In some embodiments, operation 301 may be implemented by the input/output module 240. In some embodiments, the image data may be obtained from the imaging system 110 by scanning an object or a part thereof. In some embodiments, the image data may be obtained from an internal storage device. The internal storage device may include the database 140 and/or the storage module 230. In some embodiments, the image data may be obtained from an external storage device. The external storage device may include a network storage device, a cloud disk, a portable hard disk, or the like, or any combination thereof. The image data may include an image matrix, image information, an image vector, a bitmap, a dynamic image, image encoding, primitive, an image segment, or the like, or any combination thereof.

In some embodiments, the image data may be medical image data. In some embodiments, the medical image data may be obtained using one or more types of scanners. The scanner may include a magnetic resonance imaging (MRI) scanner, a computed tomography (CT) imaging scanner, a positron emission tomography (PET) scanner, a single photon emission computed tomography (SPECT) scanner, a computed tomography colonography (CTC) scanner, or the like, or any combination thereof. In some embodiments, the image data may be scan data relating to an organ, a body, an object, dysfunction, a tumor, etc., or a variety of objects. As an example, the image data may relate to a cavity wall of an organ. In some embodiments, the image data may be scan data relating to a head, a thorax, an organ, a bone, a blood vessel, a colon, etc., or a variety of objects. In some embodiments, the image data may be two-dimensional data and/or three-dimensional data. In some embodiments, the image data may include one or more two-dimensional pixels or three-dimensional voxels. A numerical value of the image data may correspond to one or more attributes of the pixels or the voxels, such as gray scale, brightness, color, absorbance of X-rays or γ-rays, density of hydrogen atoms, biomolecule metabolism, receptor and neurohumor activity, etc.

In 302, the image may be processed. In some embodiments, operation 302 may be implemented by an image segmentation unit 410, a centerline determination unit 420, and a cavity wall unfolding unit 430 in the processing module 210. The image processing may include image segmentation, centerline extraction, virtual endoscope, colon wall unfolding, polyp detection, etc. The image segmentation may include dividing the image into one or more specific regions. In some embodiments, the image segmentation may further include selecting a target region of interest from the specific regions. The image segmentation algorithm may include a segmentation algorithm based on a threshold, a segmentation algorithm based on a region, a segmentation algorithm based on an edge, and/or a segmentation algorithm based on a specific theory, or the like, or any combination thereof. In some embodiments, the threshold segmentation may be used to perform image segmentation based on a determined threshold. The threshold may include a global threshold, an optimal threshold, an adaptive threshold, or the like, or any combination thereof. In some embodiments, the regional segmentation may be used to perform image segmentation based on region growing and/or a split and merge algorithm. The region growing may include selecting a seed pixel and determining a similarity criterion of a growth process and a condition for cessation of growth. The similarity criterion may be based on a gradient, a color, a texture, a gray scale, or the like, or any combination thereof. The centerline extraction may be used for virtual endoscopy of a cavity wall of an organ or colon wall unfolding. The virtual endoscopy may include three-dimensional reconstruction, path planning, real time rendering, etc. The colon wall unfolding may include electronic colon cleansing, colon wall unfolding, polyp detection, etc. In some embodiments, the centerline may be a centerline of a colon. In some embodiments, the centerline of the colon may be used for determining a scan route of a virtual endoscopy. In some embodiments, a point on the centerline may be a center point suitable for intestinal wall unfolding.

In 303, a processed image may be generated. In some embodiments, operation 303 may be implemented by the cavity wall unfolding unit 430. In some embodiments, the image generated in 303 may be output by the input/output module 240. In some embodiments, the output of the image data may include sending processed image data to one or more other modules of the system. For example, the input/output module 240 may send the processed image data to the imaging system 110 directly and/or via the network 130 in 303. The input/output module 240 may send the processed image data to the database 140 directly and/or via the network 130 in 303. In some embodiments, operation 303 may further include storing the processed image data in the storage module 230. In some embodiments, the output of the image data may include displaying the processed image data by a display module of the imaging system 110 and/or the image processing device 120. In some embodiments, operation 303 may include sending the processed image data to modules or devices external to the system. The sending of the image data by the input/output module 240 may be wireless, wired, or a combination thereof. For example, the processed image data may be sent to the modules or devices external to the system by the communication module 220 of the image processing device 120.

It should be noted that the above description of process 300 is provided for the purpose of illustration, and not intended to limit the scope of the present disclosure. For persons having ordinary skills in the art, steps may be combined in various ways. Various variations and modifications may be conducted on a basis of implementing the above function after understanding the operations executed in process 300. However, those variations and modifications may not depart from the spirit and scope of this disclosure. For example, in some embodiments, process 300 may include one or more other operations. Such variations are within the scope of the present disclosure.

Figure 4:
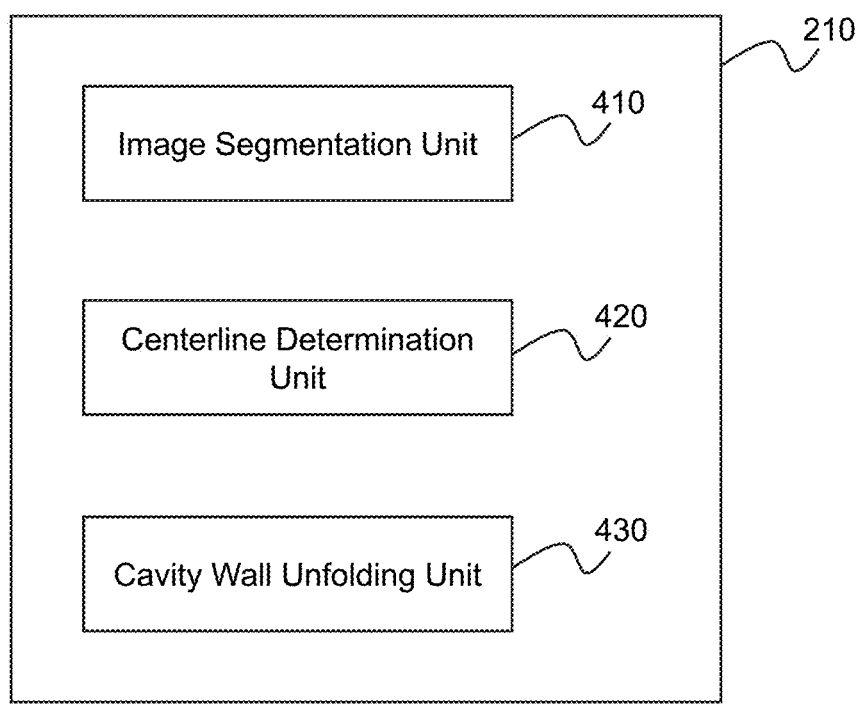
FIG. 4 is a schematic block diagram illustrating an exemplary processing module in an image processing device according to some embodiments of the present disclosure.

FIG. 4 is a schematic block diagram illustrating an exemplary processing module 210 in an image processing device 120 according to some embodiments of the present disclosure. The processing module 210 may include one or more of the following units: the image segmentation unit 410, the centerline determination unit 420, and the cavity wall unfolding unit 430. It should be noted that the above description of the structure of the processing module 210 of the image processing device 120 is merely exemplary, and is not intended to limit the scope of the present disclosure. In some embodiments, the processing module 210 may include one or more other units. In some embodiments, one or more units of the above units may be unnecessary. In some embodiments, two or more units of the above units may be combined into one unit to operate together. In some embodiments, the above units may be independent. The units being independent may refer that each unit may execute a function respectively. In some embodiments, the above units may be interconnected. The units being interconnected may refer that data of the units may be used interchangeably.

The image segmentation unit 410 may segment received image data to obtain segmented image data. The image segmentation unit may divide an image into one or more specific regions. In some embodiments, the image segmentation unit 410 may select a target region of interest from the specific regions. The image segmentation may be performed based on a segmentation algorithm, for example, a segmentation algorithm based on a threshold, a segmentation algorithm based on a region, a segmentation algorithm based on an edge, and/or a segmentation algorithm based on a specific theory, or the like, or any combination thereof. The image segmentation unit 410 may include region segmentation. The region segmentation may include region growing and/or region splitting and merging. For example, the image segmentation unit 410 may eliminate one or more voxels corresponding to a background and/or one or more voxels corresponding to air in a lung in an image using the region growing algorithm. The image segmentation unit 410 may perform threshold segmentation to segment an image based on a threshold. The threshold may be determined based on an empirical value. For example, a threshold relating to air may be 800, and a threshold relating to liquid may be 400. In some embodiments, the image segmentation unit 410 may segment a portion corresponding to air in a colon and/or a portion corresponding to a small intestine in the image using the threshold segmentation. In some embodiments, the image segmentation unit may implement colon segmentation automatically based on double compensation. A mask of the colon may be obtained using the colon segmentation. The mask may include a connected region. In some embodiments, the image segmentation unit 410 may segment a binary image relating to a colon from a three-dimensional scan image. In some embodiments, the image segmentation unit 410 may eliminate one or more adhesion structures of a colon in an image. In some embodiments, sources of the image data received by the image segmentation unit 410 may include the imaging system 110, the network 130, the database 140, other units or subunits of the processing module 210, or the like, or any combination thereof. The image data processed by the image segmentation unit 410 may be sent to the centerline determination unit 420.

In the present disclosure, an object of image processing may be an image or part thereof (for example, one or more voxels or pixels in the image). The processing (e.g., identifying, segmenting, eliminating from the image, merging corresponding images, etc.) of one or more parts corresponding to a tissue, an organ, or related content (e.g., a colon, a small intestine, a lung, or air or liquid therein, etc.) may be realized by processing corresponding image data. For brevity, such processing may be described as processing the tissue, the organ, or a related part. For example, segmentation of a part corresponding to air in a colon or a part corresponding to a small intestine may be described as segmenting the air in the colon or the small intestine. As another example, eliminating of an adhesion structure of a colon in an image may be described as eliminating the adhesion structure of the colon. As another example, extracting of a centerline of a cavity wall of an organ in an image may be described as extracting the centerline of the cavity wall of the organ. As still another example, performing an unfolding process to an image of a colon wall of a colon may be described as unfolding the colon wall of the colon. Similarly, one or more parts corresponding to a tissue, an organ, or related content (e.g., a colon, a small intestine, a lung, or air or liquid therein, etc.) in an image may be described directly with the name of the tissue, the organ, or the related content. For example, a part corresponding to air in a colon or a part corresponding to a small intestine in an image may be simply described as air in the colon or the small intestine. As another example, an adhesion structure of a colon in an image may be simply described as the adhesion structure of the colon. As still another example, a centerline of a cavity wall of an organ shown in an image may be simply described as the centerline of the cavity wall of the organ.

The centerline determination unit 420 may extract one or more centerlines. The centerline determination unit 420 may extract a centerline of a cavity wall of an organ in an image. In some embodiments, the centerline determination unit 420 may determine a colon segmentation result after image segmentation. If no colon segment (or colon section) is generated, the centerline determination unit 420 may extract the centerline automatically. If one or more colon segments (or colon sections) are generated, the centerline determination unit 420 may extract one or more centerlines of the colon segments and connect the centerlines. For example, the centerline determination unit 420 may determine an arranging score of a colon segment based on a maximum intensity projection (MIP) image. In some embodiments, the centerline determination unit 420 may further determine a starting point and an ending point of a colon segment. In some embodiments, the centerline determination unit 420 may obtain image data generated by image segmentation from the image segmentation unit 410. The centerline determination unit 420 may send processed image data to the cavity wall unfolding unit 430. The cavity wall unfolding unit 430 may unfold a cavity wall. The cavity wall unfolding unit 430 may unfold a cavity wall of an organ. In some embodiments, the cavity wall unfolding unit 430 may divide a connected region of a colon mask obtained by the image segmentation unit 410 into one or more equidistant blocks based on the centerline extracted by the centerline determination unit 420. In some embodiments, the cavity wall unfolding unit 430 may obtain a mask and a centerline of an organ, obtain a connected region of the organ, and divide the connected region into at least one equidistant block. For example, the cavity wall unfolding unit 430 may designate intersection points of the centerline and two side surfaces of the connected region as a starting point and an ending point respectively, determine a complementary geodesic distance field (CGDF) between a point in the connected region and the starting point and the ending point, and divide the connected region into at least one equidistant block based on the CGDF. In some embodiments, the cavity wall unfolding unit 430 may determine an orientation of the equidistant block in a three-dimensional coordinate system. The orientation may include a first direction, a second direction, and/or a third direction. In some embodiments, the cavity wall unfolding unit 430 may initialize a light direction of a point of a centerline. In some embodiments, the cavity wall unfolding unit 430 may determine an initial normal vector and an initial tangent vector of a first center point on the centerline. For example, the cavity wall unfolding unit 430 may determine a minimum rotation of the initial normal vector. The minimum rotation may indicate a minimum intersection angle between the normal vector of the first center point and a normal vector of a center point adjacent to the first center point. In some embodiments, the cavity wall unfolding unit 430 may assign a projection of the initial normal vector in a plane of the first direction and the second direction to a normal vector of a first light direction of the first center point, and assign the third direction or an reverse direction of the third direction to a tangent vector of the first light direction of the first center point. In some embodiments, the cavity wall unfolding unit 430 may correct the light direction of one or more points of the centerline. In some embodiments, the cavity wall unfolding unit 430 may determine a second center point of the centerline, and obtain a second light direction of the second center point, wherein the second light direction of the second center point may be parallel to the first light direction of the first center point. The cavity wall unfolding unit 430 may obtain a cavity wall unfolding direction of a point of the centerline, and adjust a center point of the centerline whose cavity wall unfolding direction has not been obtained. For example, the cavity wall unfolding unit 430 may obtain at least two unfolding points of a center point of the centerline, determine two distances between the at least two unfolding points and the center point, respectively, and determine the second center point based on the two distances. In some embodiments, the cavity wall unfolding unit 430 may further select a front control point and a back control point of the second center point, and determine an overlapping situation between a first unfolding surface corresponding to the front control point and a second unfolding surface corresponding to the back control point. In some embodiments, the cavity wall unfolding unit 430 may obtain a third center point between the front control point and the back control point. For example, the cavity wall unfolding unit 430 may obtain a first determination result based on the determination that the first unfolding surface and the second unfolding surface have no overlapping, and determine an unfolding direction of the third center point by interpolation of the front control point and the back control point based on the first determination result. As another example, the cavity wall unfolding unit 430 may obtain a second determination result based on the determination that the first unfolding surface and the second unfolding surface have a forward overlapping or middle overlapping, and move the front control point until the overlapping situation between a first unfolding surface and a second unfolding surface of the moved front control point is adjusted to no overlapping or backward overlapping, based on the second determination result. As still another example, the cavity wall unfolding unit 430 may obtain a third determination result based on the determination that the first unfolding surface and the second unfolding surface have a backward overlapping, extend a distance between the third center point and the back control point by designating a tangent vector and a normal vector of the third center point as the tangent vector and the normal vector of the back control point, until the overlapping situation between the first unfolding surface and the second unfolding surface is adjusted to no overlapping, based on the third determination result. In some embodiments, the cavity wall unfolding unit 430 may designate the back control point as a last center point based on the determination that the back control point goes beyond the ending point of the centerline. The cavity wall unfolding unit 430 may extend the distance between the third center point and the back control point by designating the tangent vector and the normal vector of the third center point as the tangent vector and the normal vector of the back control point, until the overlapping situation between the first unfolding surface and the second unfolding surface is adjusted to no overlapping. In some embodiments, the cavity wall unfolding unit 430 may obtain a sample result by sampling the cavity wall based on one or more points of the centerline and the first light direction of the first center point, and map the sample result to a two-dimensional plane. For example, a two-dimensional image relating to an unfolded cavity wall of an organ may be generated in the two-dimensional plane. In some embodiments, the cavity wall unfolding unit 430 may obtain the processed image data from the image segmentation unit 410 and/or the centerline determination unit 420. The cavity wall unfolding unit 430 may perform volume rendering. In some embodiments, the cavity wall unfolding unit 430 may obtain an image relating to volume data of one or more tissues. The labels of the tissues may be organized in a tissue set. The cavity wall unfolding unit 430 may select a sample point in the volume data, and obtain one or more neighboring points of the sample point. The labels of the neighboring points may be organized in a neighboring point set. The cavity wall unfolding unit 430 may determine whether the labels of the neighboring points belong to the tissue set, determine a color of the sample point based on the determination result, and obtain a volume rendering result of the tissues based on the color of the sample point. In some embodiments, the cavity wall unfolding unit 430 may generate an image relating to an unfolded cavity wall of an organ. For example, an image relating to an unfolded colon wall. The cavity wall unfolding unit 430 may send the processed image data to one or more other modules of the image processing device 120, for example, the storage module 230.

It should be noted that the above description of the processing module 210 of the image processing device 120 is merely provided for the purposes of illustration, and not intended to limit the scope of the present disclosure. It should be understood that, for those skilled in the art, after understanding the functions performed by the processing module, the modules, units or sub-units may be combined in various ways. Various variations and modifications may be conducted to the configuration of the processing module under the teaching of the present disclosure. However, those variations and modifications are still within the scope of the present disclosure described above. For example, in some embodiments, the processing module 210 may further include an independent image unit to implement the processing of the image data. The independent image unit may be independent with respect to the image segmentation unit 410. In some embodiments, one or more units may be unnecessary, for example, the cavity wall unfolding unit 430. In some embodiments, the processing module 210 may include one or more other units or subunits. Such variations are within the scope of the present disclosure.

Figure 5:
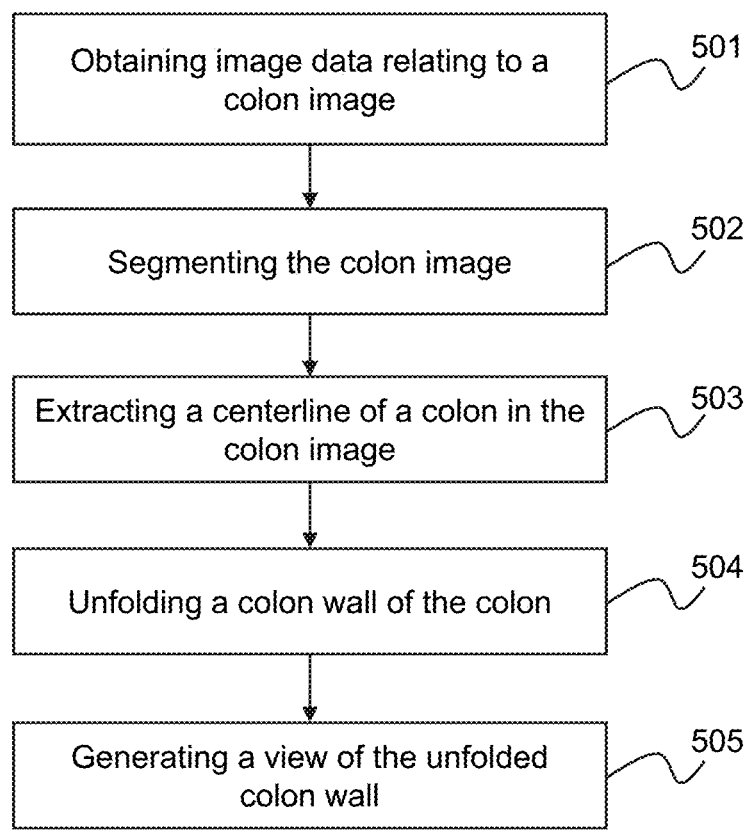
FIG. 5 is a flowchart illustrating an exemplary process for processing an image according to some embodiments of the present disclosure.

FIG. 5 is a flowchart illustrating an exemplary process for processing an image according to some embodiments of the present disclosure. Process 500 may be implemented by the processing module 210 of the image processing device 120.

In 501, image data relating to a colon image may be obtained. In some embodiments, operation 501 may be implemented by the input/output module 240 of the imaging system 110 or the image processing device 120. The image data may include medical image. The medical image may include a magnetic resonance imaging image (MRI image), a computed tomography image (CT image), a positron emission tomography image (PET image), a single photon emission computed tomography image (SPECT image), a computed tomography colonography image (CTC image), etc. In some embodiments, the image data relating to the colon image may be CT colon data. For example, by scanning a subject in a prone position and a supine position twice, CT colon data in accord with digital imaging and communication in medicine (DICOM) 3.0 format may be obtained.

In 502, the colon image may be segmented. In some embodiments, operation 503 may be implemented by the image segmentation unit 410 of the processing module 210. The segmenting of the colon image may include segmenting an air region and a liquid region in the colon based on a two-dimensional image in a traverse plane. The two-dimensional image data in the traverse plane may be obtained through operation 501. In some embodiments, the colon image may be obtained after electronic colon cleansing. The electronic colon cleansing may be an operation of separating residual liquid contained in a cavity of a colon based on a colon image to obtain a colon tissue using a contrast intensifier. Taking a colon CT image as an example, the contrast intensifier may improve a CT value of the residual liquid in the colon, so as to facilitate the separation of the residual liquid in the colon from the colon tissue. In some embodiments, the image data after colon cleansing may include data relating to an enhanced colon CT image. The enhanced colon CT image may be an image obtained after eliminating liquid in a colon cavity by the electronic colon cleansing. In some embodiments, the image data after colon cleansing may include a scanning colon image (such as a colon CT image) obtained by physical colon cleansing based on an agent taken by the subject. In some embodiments, the colon segmentation may further include region growing. The region growing may be performed based on an air point detected in the colon image that is used as a seed point to compensate a lost colon segment region. In some embodiments, the colon segmentation may further include eliminating one or more adhesion structures. In some embodiments, the colon segmentation may further include obtaining a mask of a colon.

In 503, a centerline of a colon may be extracted. In some embodiments, operation 504 may be implemented by the centerline determination unit 420 of the processing module 210. The extracting of the centerline of the colon may further include determining a colon segmentation result. If no colon segment is generated, the centerline of the colon may be obtained. If one or more colon segments are generated, one or more centerlines of the colon segments may be obtained, and be connected to obtain an integrated centerline of the colon. In some embodiments, the extracting of the centerline of the colon may include determining an arranging score for a colon segment based on an MIP image. The arranging score for the colon segment may be determined based on an MIP score chart of the MIP image. In some embodiments, the extracting of the centerline of the colon may further include determining a starting point and an ending point of a colon section (or colon segment).

In 504, a colon wall of the colon may be unfolded. In some embodiments, operation 505 may be implemented by the cavity wall unfolding unit 430 of the processing module 210. The colon wall unfolding may include initializing a light direction of a point of the centerline, and determining a center point of the centerline suitable for unfolding the colon wall. The initializing of the light direction of the point of the centerline may include dividing a connected region in a mask of the colon into one or more equidistant blocks based on the centerline of the colon. In some embodiments, the colon wall unfolding may further include correcting the light direction of the point of the centerline. The correcting of the point of the centerline may further include obtaining a colon wall unfolding direction for each center point.

In 505, a view of the unfolded colon wall of the colon may be generated. In some embodiments, operation 505 may be implemented by the processing module 210 of the image processing device 120 or the cavity wall unfolding unit 430 of the processing module 210. The generating of the view of the unfolded colon wall of the colon may include sampling the colon wall based on the center point and the light direction of the center point, and mapping the sample result to a two-dimensional plane to generate image data relating to the unfolded colon wall. In some embodiments, the view of the unfolded colon wall may be a two-dimensional view of the unfolded colon wall. In some embodiments, the view of the unfolded colon wall may be generated based on a volume rendering technique.

It should be noted that the above description of process 500 is provided for the purpose of illustration, and not intended to limit the scope of the present disclosure. For persons having ordinary skills in the art, steps may be combined in various ways. Various variations and modifications may be conducted on a basis of implementing the above function after understanding the operations executed in process 500. However, those variations and modifications may not depart from the spirit and scope of this disclosure. For example, in some embodiments, process 500 may include one or more other operations, for example, electronic colon cleansing, polyp detection, etc. Such variations are within the scope of the present disclosure.

Figure 6:
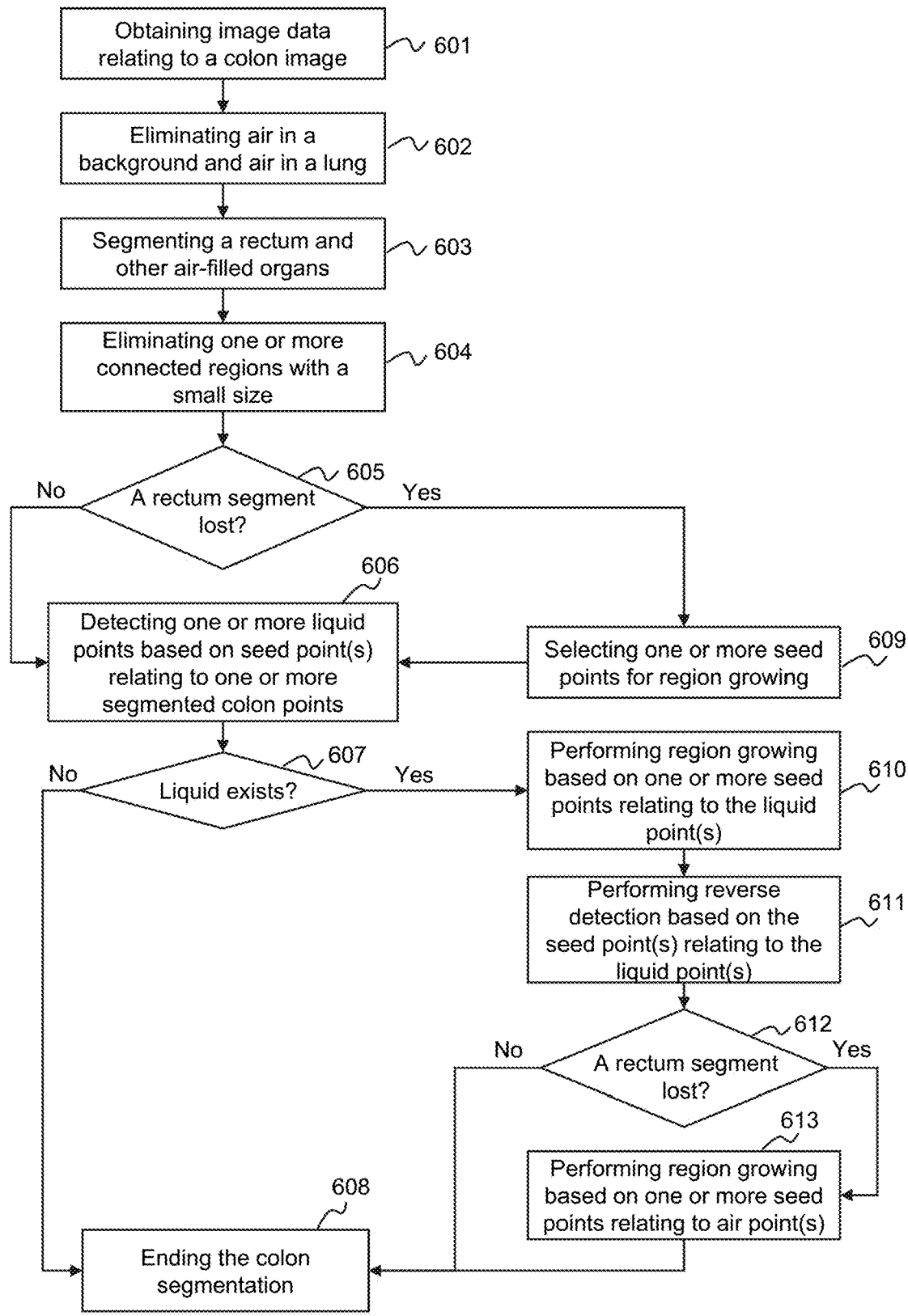
FIG. 6 is a flowchart illustrating an exemplary process for segmenting an image relating to a colon according to some embodiments of the present disclosure.

FIG. 6 is a flowchart illustrating an exemplary process for segmenting an image relating to a colon according to some embodiments of the present disclosure. Process 600 may be implemented by the image segmentation unit 410 of the processing module 210. In some embodiments, the colon image segmentation may be automatic colon segmentation based on double compensation.

In 601, image data relating to a colon image may be obtained. In some embodiments, operation 601 may be implemented by the imaging system 110. The image data may include a medical image. The medical image may include a magnetic resonance imaging image (MRI image), a computed tomography image (CT image), a positron emission tomography image (PET image), a single photon emission computed tomography image (SPECT image), a computed tomography colonography image (CTC image), etc. In some embodiments, the image data relating to the colon image may be CT colon data. In some embodiments, the image segmentation unit 410 may segment a colon image based on the obtained image data.

In 602, air in a background and air in a lung may be eliminated. The air in the background may refer to one or more background voxels of the image. The background may be image data outside of one or more boundary voxels of a colon. In some embodiments, operation 602 may be implemented by the image segmentation unit 410 of the processing module 210. The air in the background and the air in the lung may be eliminated using a region growing algorithm. For example, as shown in FIGS. 25(b) and 25(c), FIG. 25(b) shows an image generated after the background voxels are eliminated from a colon image, and FIG. 25(c) shows an image generated after the air in the lung is eliminated from a colon image. In 603, a rectum and one or more other air-filled organs including, for example, a colon, a small intestine, a stomach, etc. may be segmented. In some embodiments, operation 603 may be implemented by the image segmentation unit 410 of the processing module 210. The segmenting may be implemented based on a threshold, for example, a gray scale threshold. As shown in FIG. 26(*b*), FIG. 26(*b*) shows a result of segmenting air in a colon of a colon image. For example, a gray scale threshold for segmenting the rectum may be −800. In 604, one or more connected regions with a small size may be eliminated. In some embodiments, operation 604 may be implemented by the processing module 210. The eliminating of the connected regions with a small size may be performed based on a size. For example, 10% of the size of a largest connected region obtained by segmenting the colon image in this case may be designated as a threshold, and a connected region whose size is less than the threshold may be considered as a connected region with a small size. The connected region with a small size may include a small colon segment, a small intestine, etc. In some embodiments, the eliminating of the connected region with a small size may include eliminating a small intestine in the colon image. In some embodiments, one or more lost small colon segments may be compensated based on a region growing algorithm.

In 605, whether a rectum segment is lost may be determined. The rectum segment may be part of the colon. If the rectum segment is not lost, one or more liquid points may be detected based on seed point(s) relating to one or more segmented colon voxels in 606. If it is determined that the rectum segment is lost in 605, one or more seed points may be selected for region growing in 609. The seed points may be one or more lost rectum points. The rectum points may be voxels corresponding to points of a rectum wall in the image. The lost rectum segment may be compensated based on a region growing algorithm. For example, the image segmentation unit 410 may execute a first compensation to compensate the lost rectum segment in the segmented colon image. After the lost rectum segment is compensated, the process may proceed to 606.

In 607, whether liquid exists in the colon may be determined. In some embodiments, the detecting of the liquid point may include obtaining one or more boundary voxels of a colon region. The boundary of the colon region may correspond to a colon wall of the colon. For the convenience of illustration, an X axis and a Y axis of the colon image may be defined, as shown in FIGS. 8(*a*), 8(*b*), and 8(*c*). A pixel of the image may have an x coordinate value in the X axis direction, and have a y coordinate value in the Y axis direction. The detecting of the liquid point may further include detecting from the boundary voxel(s) along a positive Y axis direction of the image. In some embodiments, the distance along the positive Y axis direction for detecting the liquid point may be small, for example, 5 pixels and/or 3.5 mm. The detecting of the liquid point may be performed based on one or more gray values of one or more voxels of the image. In some embodiments, if the gray value of a voxel is within a gray value range of the liquid, the voxel may be considered to be corresponding to the liquid, or that the liquid may exist. If the liquid does not exist, colon segmentation may be ended in 608.

If it is determined in 607 that the liquid exists, in 610, region growing may be performed based on one or more seed points relating to the liquid point(s). The liquid may be segmented using the region growing. For example, the image segmentation unit 410 may segment a liquid region based on the segmented colon image. In 611, reverse detection may be performed based on the seed point(s) relating to the liquid point(s). For example, the image segmentation unit 410 may perform reverse detection based on the liquid region. The reverse detection may be performed along an axial direction of the image. The axial direction may be a defined negative Y axis direction of the image. In 612, it may be determined whether a rectum segment is lost. In some embodiments, the reverse detection may include obtaining the boundary voxel(s) of the liquid region. The reverse detection may further include detecting from the boundary voxel(x) of the liquid region along the negative Y axis direction of the image. For example, the image segmentation unit 410 may detect an air point from the boundary voxel(s) along a reverse direction of an axial direction of the first compensated colon image. In some embodiments, in the reverse detection, if a gray value of a voxel is within a gray value range of air, the voxel may be considered to be an air point, and it may be determined that a rectum segment is lost in 612. If the rectum segment is lost, in 603, region growing may be performed based on one or more seed points relating to one or more air points, and the lost rectum segment may be compensated based on region growing. For example, the image segmentation unit 410 may execute a second compensation to compensate a lost colon segment in the segmented colon image. After the lost rectum segment is compensated, the process may proceed to 608, and the colon segmentation may be ended. If it is determined in 612 that the rectum segment is not lost, the colon segmentation may be ended in 608.

It should be noted that the above description of process 600 is provided for the purpose of illustration, and not intended to limit the scope of the present disclosure. For persons having ordinary skills in the art, steps may be combined in various ways. Various variations and modifications may be conducted on a basis of implementing the above function after understanding the operations executed in process 600. However, those variations and modifications may not depart from the spirit and scope of this disclosure. For example, in some embodiments, one or more of the operations in process 600 may be combined, for example, 606 and 607 may be combined to detect whether a liquid point exists. Such variations are within the scope of the present disclosure.

Figure 7:
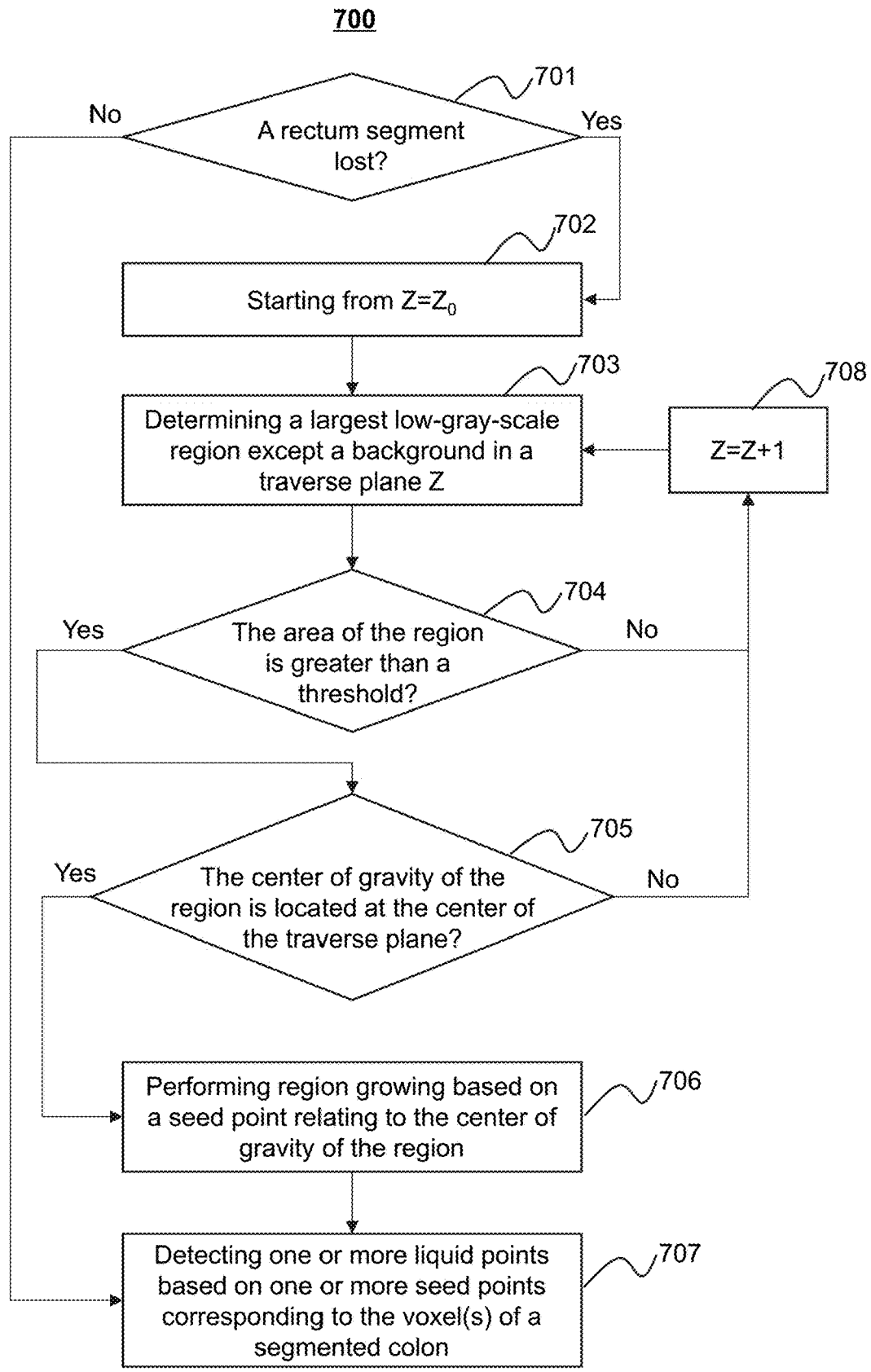
FIG. 7 is a flowchart illustrating an exemplary process for determining one or more seed points in segmenting an image relating to a colon according to some embodiments of the present disclosure.

FIG. 7 is a flowchart illustrating an exemplary process for determining one or more seed points in segmenting an image relating to a colon according to some embodiments of the present disclosure. Process 700 may be implemented by the image segmentation unit 410 of the processing module 210 of the image processing device 120. In some embodiments, operation 609 illustrated in process 600 may be performed according to the process 700.

In 701, it may be determined whether a rectum segment is lost. If the rectum segment is not lost, in 707, one or more liquid points in a segmented colon may be detected based on one or more seed points corresponding to one or more voxels of the segmented colon. If it is determined that the rectum segment is lost in 701, in 702, processing may be started from a traverse plane Z which is equal to Z0. In 703, a largest low-gray-scale region except a background in the traverse plane Z may be determined. In 704, it may be determined whether the area of the region is greater than a threshold. If the area of the region is less than or equal to the threshold, Z may be updated to Z+1 in 708, and process 700 may return to 703. If the area of the region is greater than the threshold, it may be determined whether a center of gravity of the region is located at a center of the traverse plane in 705. In some embodiments, the center of gravity of the region may be determined based on the mean values of x coordinates and y coordinates of all points in the region respectively. If the center of gravity of the region is not located at the center of the traverse plane, Z may be updated to Z+1 in 708, and then process 700 may return to 703. If the center of gravity of the region is located at the center of the traverse plane, in 706, region growing may be performed based on a seed point relating to the center of gravity of the region. After the lost rectum segment is compensated, the process may proceed to 707.

In some embodiments, a gradual increasing of the traverse plane Z from Z0 to Z+1 may indicate a direction from feet to a head of a subject in a two-dimensional traverse plane. In some embodiments, the threshold of an area of the region may be determined based on a size of a rectum segment required for medical data. In some embodiments, the center of the traverse plane may be a physiology location of the rectum segment of a human. The center of the traverse plane may be a region of interest (ROI) defined by a user. In some embodiments, the region of interest may be a rectangular region in the center of the image in the traverse plane. In some embodiments, the region of interest may be a circular region in the center of the image in the traverse plane.

Figure 8A:
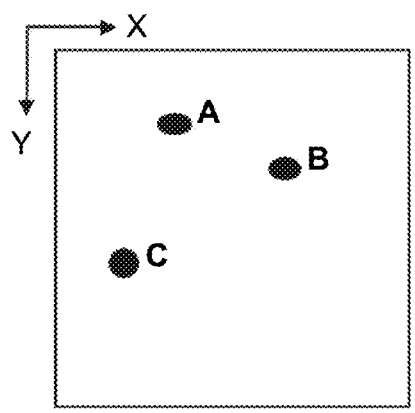
FIG. 8($a$) is a schematic diagram illustrating an exemplary process for determining one or more seed points in segmenting an image relating to a colon according to some embodiments of the present disclosure.
Figure 8B:
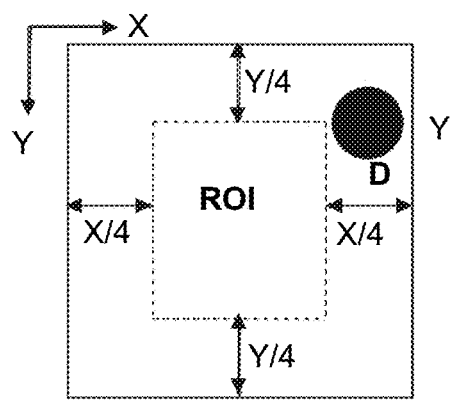
Figure 8C:
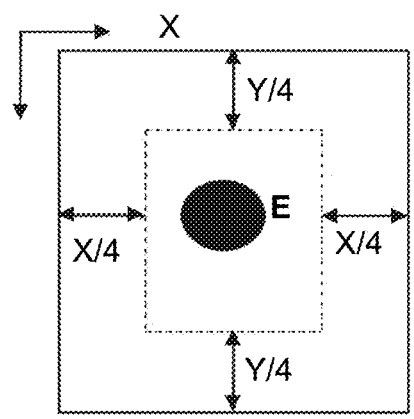

FIGS. 8(a), 8(b), and 8(c) are schematic diagrams illustrating an exemplary process for determining one or more seed points in segmenting an image relating to a colon according to some embodiments of the present disclosure. A, B, and C in FIG. 8(a) may indicate three regions of rectum points. The areas of the three regions of rectum points may be all less than a threshold, and the rectum points in the three regions may not meet a condition. D in FIG. 8(b) may be a region of rectum points, and the center of gravity of the region D may be not located in a ROI of the center in the traverse plane, and the rectum points in the region D may not meet a condition. The center of gravity of a region of rectum points may be determined based on the mean values of x coordinates and y coordinates of all points in the region respectively. E in FIG. 8(c) may be a region of rectum points. The area of the region E may satisfy a threshold condition, and the center of gravity of the region E may be located in a rectangular ROI of the center in the traverse plane, and thus, the rectum points in the region E may meet the condition. In some embodiments, a rectum point may be a voxel corresponding to part of a rectum. In some embodiments, a rectum point may be part of a colon. In some embodiments, the rectum point(s) may be designated as seed point(s) for region growing, and one or more rectum segments may be segmented.

It should be noted that the above description of process 700 and the schematic diagram of FIGS. 8(a), 8(b), and 8(c) is provided for the purpose of illustration, and not intended to limit the scope of the present disclosure. For persons having ordinary skills in the art, steps may be combined in various ways. Various variations and modifications may be conducted on a basis of implementing the above function after understanding the operations executed in process 700. However, those variations and modifications may not depart from the spirit and scope of this disclosure. For example, in some embodiments, a dashed rectangular region of the region of interest in FIG. 8(b) may be replaced with a circular region, a diamond region, etc. Such variations are within the scope of the present disclosure.

Figure 9:
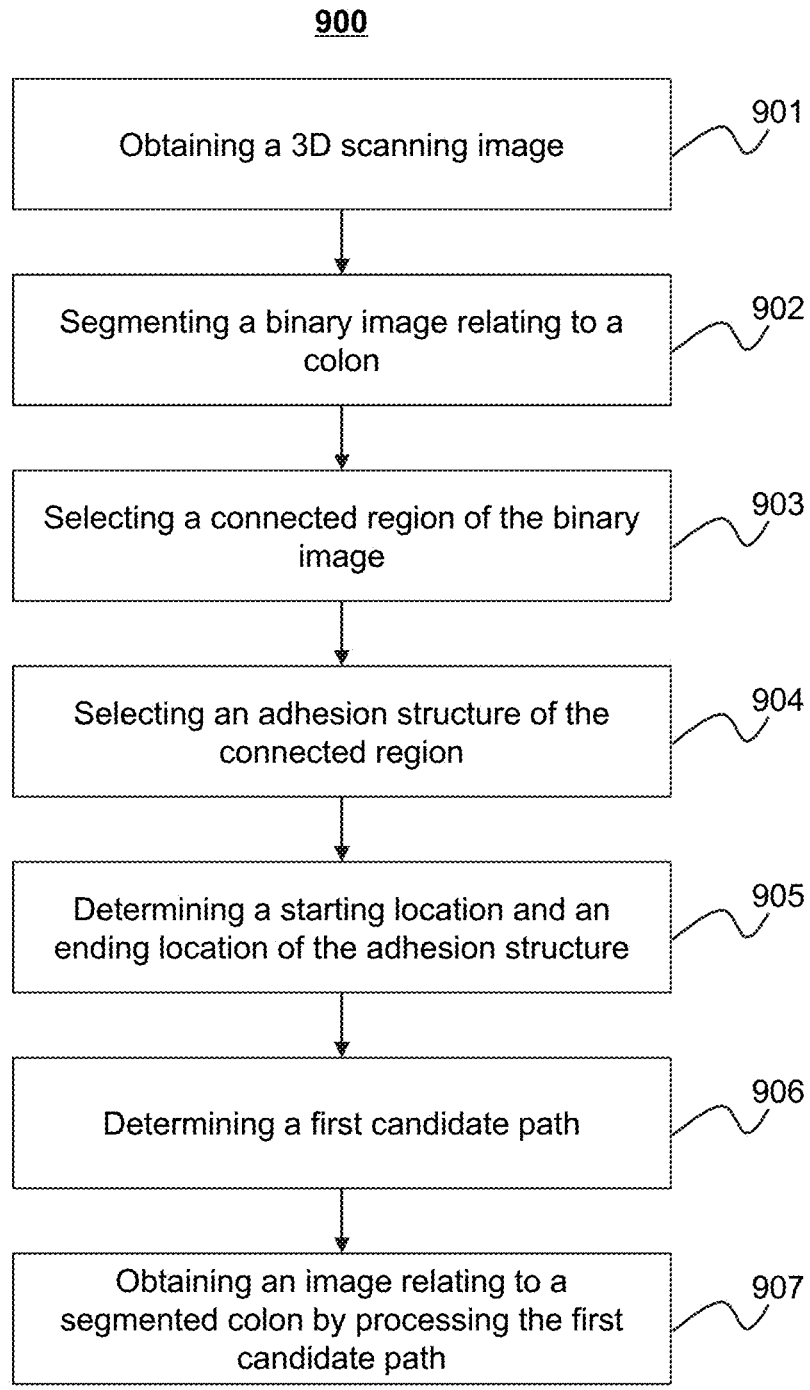
FIG. 9 is a flowchart illustrating an exemplary process for eliminating an adhesion structure in segmenting an image relating to a colon according to some embodiments of the present disclosure.

FIG. 9 is a flowchart illustrating an exemplary process for eliminating an adhesion structure in segmenting an image relating to a colon according to some embodiments of the present disclosure. Process 900 may be implemented by the image segmentation unit 410 of the processing module 210.

In 901, a three-dimensional (3D) scanning image may be obtained. In some embodiments, the three-dimensional scanning image may be obtained by the imaging system 110. The imaging system 110 here may be a computed tomography (CT) device, a magnetic resonance imaging (MRI) device, a positron emission computed tomography (PET) device, an X-ray device, an ultrasound device, etc.

In some embodiments, an abdomen of a subject to be detected may be scanned using a CT device to obtain a three-dimensional scanning image. The subject to be detected may be required to take an oral contrast agent to improve a pixel value of liquid in the colon in a CT image. In some embodiments, the oral contrast agent and a partial volume effect of the CT device may induce an adhesion structure in a segmented image relating to a colon portion based on the three-dimensional scanning image. The adhesion structure here may include a simple adhesion structure and a complex adhesion structure. The simple adhesion structure may have a ring structure or a redundant branch structure. The complex adhesion structure may have two or more ring structures. In some embodiments, the adhesion structure may be an adhesion structure formed between different regions of a colon, a simple adhesion structure formed between a non-colon structure, such as a small intestine, and a colon, or a complex adhesion structure formed between a non-colon structure, such as a small intestine, and a colon.

In 902, a binary image relating to a colon may be segmented. The binary image here may have only two possible values or grey scale levels for each pixel in the image, for example, a black and white or monochrome image may be used to represent the binary image.

In some embodiments, the three-dimensional scanning image relating to the colon may be segmented based on pixel information of the three-dimensional scanning image. Binarization may be performed to the three-dimensional scanning image relating to the colon to obtain the binary image relating to the colon portion. The binarization here may refer to setting a gray value of a pixel of the image based on two levels, such as 0 and 255. In some embodiments, pixel information may be a grey scale level, a color, a texture, a gradient, a CT value, spatial information of air and liquid in the colon, or the like, or any combination thereof. In some embodiments, the segmentation technique may include threshold segmentation, region segmentation, edge segmentation, histogram-based algorithm, or the like, or any combination thereof.

Figure 10A:
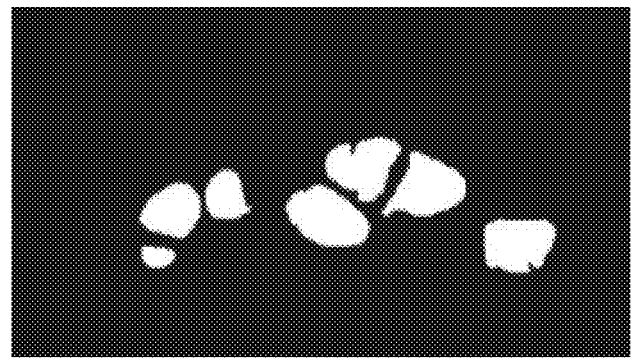
FIG. 10($a$) is a schematic diagram illustrating an exemplary binary image of a colon according to some embodiments of the present disclosure.

In 903, a connected region of the binary image may be selected. The connected region here may be a closed two-dimensional region. In some embodiments, the binary image relating to the colon portion may have one or more connected regions. For example, as shown in FIG. 10(a), the binary image relating to the colon portion may have seven connected regions. In some embodiments, one or more connected regions may be selected based on a centroid of a connected region, an area of a connected region, or a region of interest. In some embodiments, all connected regions of the binary image relating to the colon may be traversed.

In 904, an adhesion structure of the connected region may be selected. In some embodiments, one or more adhesion structures may be selected based on shape information of the binary image relating to the colon, and/or one or more regions of interest. In some embodiments, all selected adhesion structures of the connected region may be traversed.

Figure 10B:
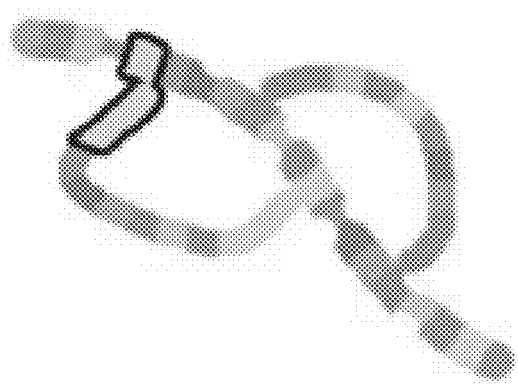
Figure 10C:
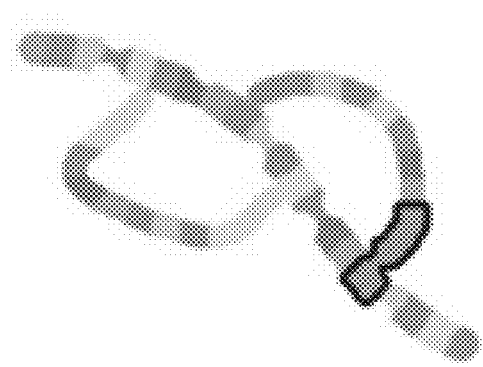

In 905, a starting location and an ending location of the adhesion structure may be determined. In some embodiments, the starting location and the ending location of the adhesion structure may be determined based on a morphological structure of the colon, and/or a CGDF between a pixel of the selected connected region and a starting point of and an ending point of the connected region. In some embodiments, the selected connected region may be divided into one or more equidistant blocks based on the CGDF. In some embodiments, the starting location and the ending location of the adhesion structure may be determined by detecting the equidistant blocks. In some embodiments, the starting location and the ending location of the adhesion structure may be a certain equidistant block of the connected region, for example, as shown in FIGS. 10(b) and 10(c). FIGS. 10(b) and 10(c) are schematic diagrams of a starting location and an ending location corresponding to locations of a colon adhesion structure. More descriptions of a specific operation of determining the starting location and the ending location of the selected adhesion structure may be found elsewhere in the present disclosure. See, for example, FIG. 11 and the description thereof.

Figure 13:
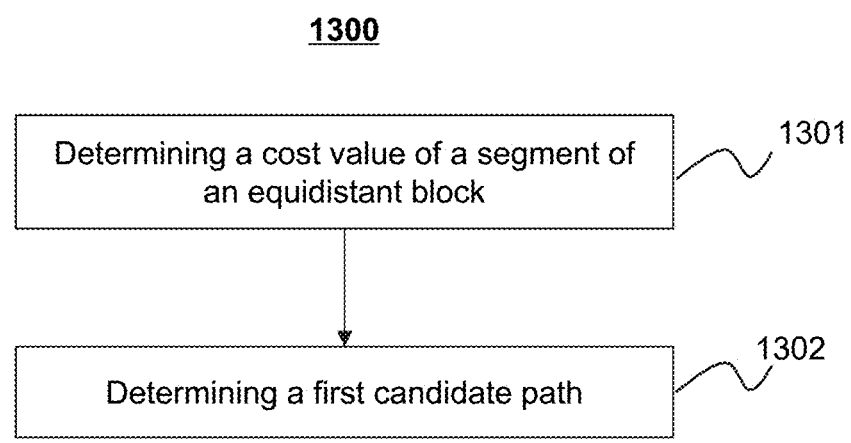
FIG. 13 is a flowchart illustrating an exemplary process for determining a first candidate path according to some embodiments of the present disclosure.

In 906, a first candidate path may be determined. The first candidate path here may be a first candidate path between the starting location and the ending location of the selected adhesion structure. In some embodiments, there may be two or more candidate paths between the starting location and the ending location of the selected adhesion structure. In some embodiments, two or more candidate paths may be formed by connecting segments of equidistant blocks between the starting location and the ending location of the selected adhesion structure end to end. The first candidate path here may be an optimal path in the two or more candidate paths. The first candidate path may be used to determine a location of the colon. In some embodiments, the first candidate path may be selected based on cost values of the segments of the equidistant blocks in the two or more candidate paths. FIG. 13 and description thereof show an exemplary process for determining a first candidate path between a starting location and an ending location of a selected adhesion structure.

Figure 14:
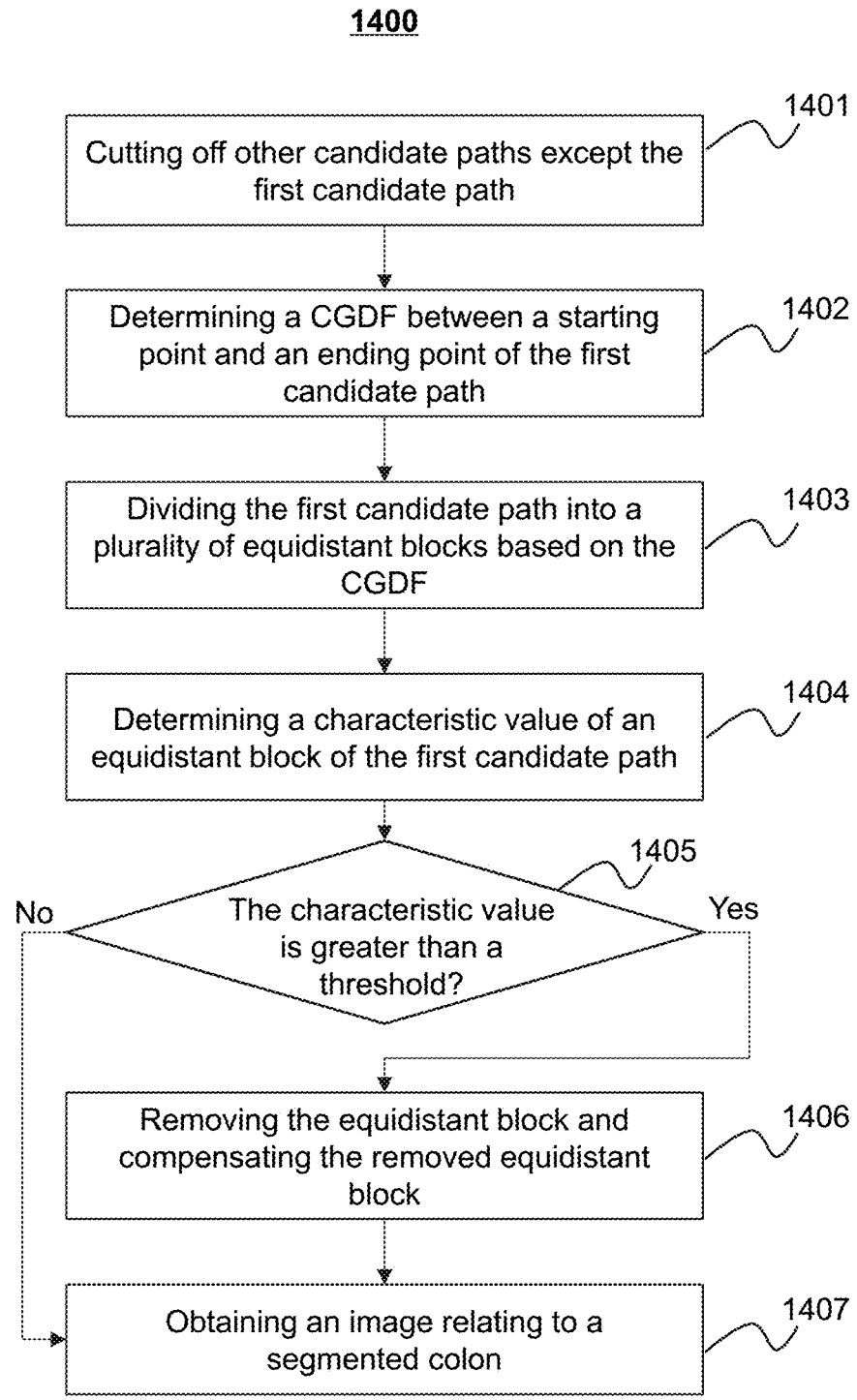
FIG. 14 is a flowchart illustrating an exemplary process for processing a first candidate path according to some embodiments of the present disclosure.

In 907, an image relating to a segmented colon may be obtained by processing the first candidate path. In some embodiments, the image relating to the segmented colon may be finally obtained by cutting off other candidate paths except the first candidate path and processing partial or all equidistant blocks in the first candidate path. FIG. 14 and descriptions thereof show an exemplary process for obtaining a segmented colon image based on a first candidate path.

It should be noted that the above description of process is provided for the purpose of illustration, and not intended to limit the scope of the present disclosure. For persons having ordinary skills in the art, various variations and modifications may be conducted on the application field of the above method and system in form and detail on a basis of implementing the above function after understanding the above process. For example, in some embodiments, the colon image where the air in the background and the air in the lung have been eliminated in 602 may be directly obtained in 901. As another example, in some embodiments, operations 903 and 904 may be combined into one operation in which one or more adhesion structures in one or more connected regions in a binary image may be directly selected. As still another example, in some embodiments, when a first candidate path is processed, the operation for processing the partial or all equidistant blocks in the first candidate path may be unnecessary. Such variations are within the protection scope of the present disclosure.

Figure 11:
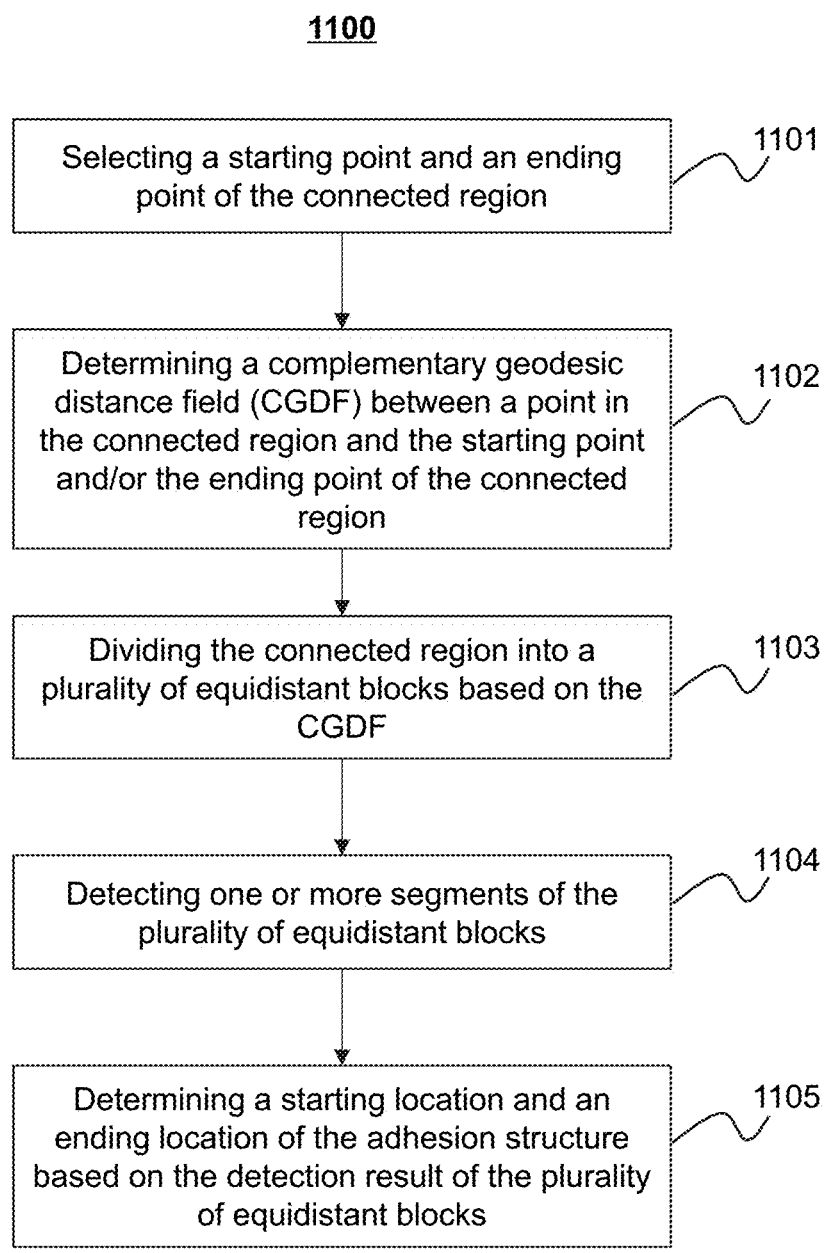
FIG. 11 is a flowchart illustrating an exemplary process for determining a starting location and an ending location of a selected adhesion structure according to some embodiments of the present disclosure.

FIG. 11 is a flowchart illustrating an exemplary process for determining a starting location and an ending location of a selected adhesion structure according to some embodiments of the present disclosure. Process 1100 may be implemented by the image segmentation unit 410 of the processing module 210. In some embodiments, operation 905 illustrated in process 900 may be performed according to the process 1100.

In 1101, a starting point and an ending point of the connected region may be selected. The starting point and the ending point of the connected region here may be two pixels arbitrarily selected from two sides of the connected region. In some embodiments, the starting point and the ending point of the connected region may be located at a centerline of a selected colon portion respectively, for example, the centerline of a colon portion extracted in 503. In some embodiments, intersection points of the centerline and two side surfaces of the connected region where the selected adhesion structure is located may be designated as the starting point and the ending point of the connected region respectively.

In 1102, a complementary geodesic distance field (CGDF) between a point of the connected region and the starting point and the ending point may be determined. In some embodiments, the CGDF may be determined based on Equation (1):

$$CGDF_{AB(p)} = GDF_{A(p)} - GDF_{B(p)}. \quad (1)$$

Figure 12A:
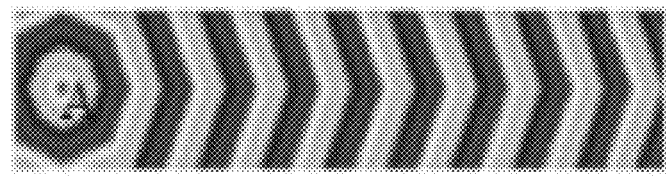
FIG. 12($a$) is a schematic diagram illustrating an exemplary geodesic distance field determined based on a starting point according to some embodiments of the present disclosure.
Figure 12B:
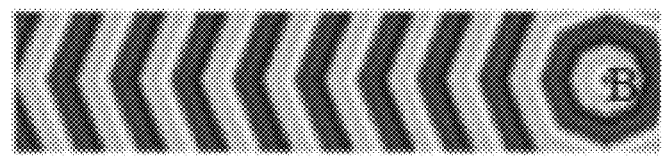
Figure 12C:
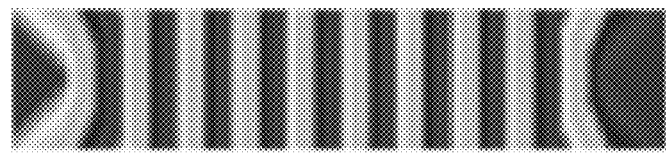

In Equation (1), A and B may be a starting point and an ending point of a connected region respectively, p may be a pixel of the connected region, $GDF_{A(p)}$ may be a value of a geodesic distance field (GDF) between the starting point A and the pixel p, $GDF_{B(p)}$ may be a value of a GDF between the ending point B and the pixel p, and $CGDF_{AB(p)}$ may be a CGDF between the starting point A and the ending point B and the pixel p. FIGS. 12(a), 12(b), and 12(c) are schematic diagrams of a GDF determined based on the starting point A, a GDF determined based on the ending point B, and a CGDF determined based on the starting point A and the ending point B.

In 1103, the connected region may be divided into a plurality of equidistant blocks based on the CGDF. In some embodiments, the connected region may be divided into a plurality of equidistant blocks based on the CGDF and/or a distance interval between the plurality of equidistant blocks. In some embodiments, the distance interval between the plurality of equidistant blocks may be equal, or unequal. In some embodiments, the distance interval between the plurality of equidistant blocks may be 4 to 6 pixels, or 2 to 3 pixels, etc.

In 1104, one or more segments of the plurality of equidistant blocks may be detected. In some embodiments, the equidistant blocks may be detected one by one along a direction from the starting point to the ending point of the connected region. In some embodiments, an equidistant block having two or more segments which is detected for the first time may be designated as an $r^{th}$ equidistant block, and an equidistant block having two or more segments which is detected for the last time may be designated as a $t^{th}$ equidistant block. R may be a positive integer greater than or equal to 2, and t may be a positive integer greater than or equal to r.

In 1105, a starting location and an ending location of the adhesion structure may be determined based on a detection result of the equidistant blocks. In some embodiments, if the equidistant block r having two or more segments is detected for the first time, it may be indicated that at least two paths exist between a previous (r−1)th equidistant block of the $r^{th}$ equidistant block and the $r^{th}$ equidistant block, i.e., an adhesion structure may exist, and thus, the (r−1)th equidistant block may be designated as the starting location of the adhesion structure. If the equidistant block t having two or more segments is detected for the last time, it may be indicated that at least two paths exist between the $t^{th}$ equidistant block and a next $(t+1)^{th}$ equidistant block of the $t^{th}$ equidistant block, i.e., the adhesion structure may disappear at the $(t+1)^{th}$ equidistant block, and thus, the $(t+1)^{th}$ equidistant block may be designated as the ending location of the adhesion structure.

Figure 15A:
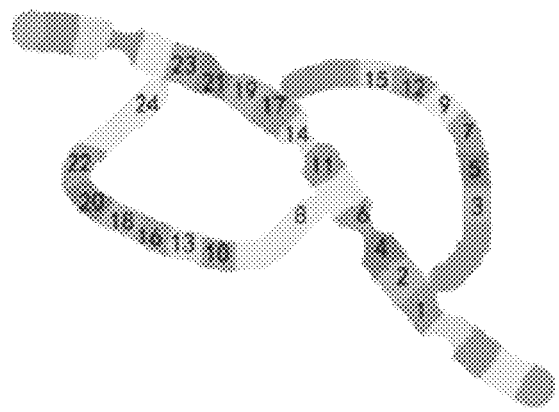
FIG. 15($a$) is a schematic diagram for numbering one or more segments of an equidistant block according to some embodiments of the present disclosure.

It should be noted that the above description of process is provided for the purpose of illustration, and not intended to limit the scope of the present disclosure. For persons having ordinary skills in the art, various variations and modifications may be conducted on the application field of the above method and system in form and detail on a basis of implementing the above function after understanding the above process. For example, in some embodiments, in 1104, segments of the equidistant blocks may be detected one by one along a direction from the ending point to the starting point, and then a previous equidistant block of the equidistant block having two or more segments which is detected for the first time may be designated as the ending point of the adhesion structure; a next equidistant block of the equidistant block having two or more segments which is detected for the last time may be designated as the starting point of the adhesion structure. As another example, in some embodiments, in 1104, the detection result of the segments of the equidistant blocks may be used to determine a starting location and an ending location of an adhesion structure, or be stored in the storage module 230 for other operations. As still another example, in some embodiments, for the convenience in identifying and recording different segments of one or more equidistant blocks, segments of equidistant block(s) between a starting point and an ending point of a connected region may be numbered, as show in FIG. 15(a). Such variations are within the scope of the present disclosure.

FIG. 13 is a flowchart illustrating an exemplary process for determining a first candidate path according to some embodiments of the present disclosure. Process 1300 may be implemented by the image segmentation unit 410 of the processing module 210. In some embodiments, operation 906 illustrated in process 900 may be performed according to the process 1300.

In 1301, one or more cost values of one or more segments of one or more equidistant blocks may be determined. The cost value(s) of the segment(s) of the equidistant block(s) here may include a cost value of each segment of the equidistant block between the starting point and the ending point of the connected region. In the present disclosure, a cost value may be regarded as a characteristic value. In some embodiments, the cost value of each segment of an equidistant block between the starting point and the ending point of the connected region may be determined using a thickness-based algorithm, as shown in Equation (2):

$$\text{Cost}_R = V_R/(S_{Rfore} + S_{Rback}). \quad (2)$$

In Equation (2), R may represent a segment of an equidistant block between a starting location and an ending location of an adhesion structure, $\text{Cost}_R$ may represent a cost value of the segment of the equidistant block R, $V_R$ may represent a volume of the segment of the equidistant block R, and $S_{Rfore}$ and $S_{Rback}$ may represent an area of a forward overlapping section and an area of a backward overlapping section of the segment of the equidistant block R respectively.

In some embodiments, the cost value of each segment of an equidistant block between the starting location and the ending location of the adhesion structure may be determined using a centerline-based algorithm. In some embodiments, the centerline may be the centerline obtained in 503, or a centerline obtained manually. In some embodiments, the centerline-based algorithm may refer to setting a cost value of a segment of an equidistant block through which a centerline passes as a first cost value, and setting a cost value of a segment of an equidistant block through which the centerline does not pass as a second cost value. In some embodiments, the first cost value may be less than or greater than the second cost value. In some embodiments, the first cost value may be set to a relatively small value such as 0; the second cost value may be set to a relatively large value such as 1.

In 1302, a first candidate path may be determined. In some embodiments, the first candidate path may be selected from two or more candidate paths between the starting location and the ending location of the adhesion structure using an optimal path algorithm, and be regarded as a location where a colon may be located. In some embodiments, the optimal path algorithm may be a Dijkstra algorithm, an A* algorithm, a Bellman-Ford algorithm, a Floyd-Warshall algorithm, a Johnson algorithm, or the like, or any combination thereof.

Based on the Dijkstra algorithm, a set S of segments of one or more equidistant blocks may be set and augmented continually based on elastic selection. The elastic selection may refer to flexible selection, and may be a dynamic programming process. In some embodiments, V may be a set of all segments of equidistant block(s); S may be a set of segments of equidistant block(s) of which a shortest path is determined, an initial value of S may be a starting location of an adhesion structure, T may be a set of segments of equidistant block(s) of which a shortest path is not determined (i.e., V-S), and an initial value of T may be all segments of equidistant block(s) except the starting location of the adhesion structure. The segments of the equidistant block in the set T may be added to the set S one by one in an ascending order of a path length, until all segments of the equidistant block which can be reached from the starting location of the adhesion structure are in the set S. In some embodiments, the image segmentation unit 410 may determine a plurality of path lengths from a starting location of an adhesion structure to all segments of equidistant block(s) except the starting location, and select one or more segments of equidistant block(s) to augment the set S based on the determined path lengths. The path length here may refer to a sum of cost values of segments of equidistant block(s) in candidate paths formed between a starting location and other segments of the equidistant block.

In some embodiments, a mean cost value of two or more candidate paths may be determined based on the cost value(s) of segment(s) of equidistant block(s) obtained in 1301. A first candidate path may be selected based on the mean cost value. In some embodiments, a candidate path with a minimum mean cost value may be selected as a first candidate path. In some embodiments, the mean cost value may be an average value of cost values of one or more segments of one or more equidistant blocks in candidate paths.

It should be noted that the above description of the process for determining a starting location and an ending location of a selected adhesion structure is provided for the purpose of illustration, and not intended to limit the scope of the present disclosure. For persons having ordinary skills in the art, various variations and modifications may be conducted on the application field of the above method and system in form and detail on a basis of implementing the above function after understanding the above process. For example, in some embodiments, in 1301, a cost value of a segment of an equidistant block may be determined as a reciprocal of a thickness value expressed in Equation (3):

$$\text{Cost}_R = (S_{Rfore} + S_{Rback})/V_R. \quad (3)$$

In Equation (3), the items may be the same as those in Equation (2). As another example, in some embodiments, in 1301, a cost value of a segment of an equidistant block may be determined using the thickness-based algorithm or the centerline-based algorithm alone or a combination thereof. As still another example, in some embodiments, in 1301, the obtained cost value of the segment of the equidistant block may be used in the optimal path algorithm directly, or be stored in the storage module 230. Such variations are within the scope of the present disclosure.

FIG. 14 is a flowchart illustrating an exemplary process for processing a first candidate path according to some embodiments of the present disclosure. Process 1400 may be implemented by the image segmentation unit 410 in the processing module 210. In some embodiments, operation 907 illustrated in process 900 may be performed according to the process 1400.

Figure 15B:
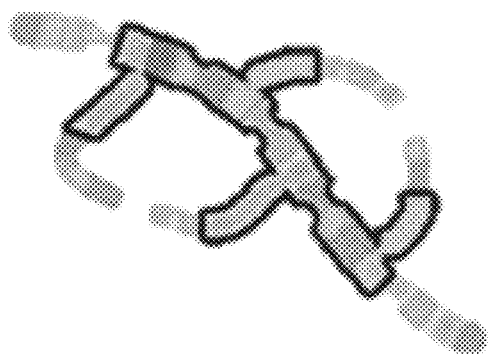

In 1401, other candidate paths except the first candidate path may be cut off. In some embodiments, in process 1400, other candidate paths between a starting location and an ending location of an adhesion structure may be determined, and the other candidate paths may be cut off. In some embodiments, a segment of an equidistant block in the other candidate paths may be set as a background, and thus, the other candidate paths except the first candidate path may be cut off. For example, an equidistant block in the middle of the other candidate paths of the adhesion structure except one or more equidistant blocks of the first candidate path may be set as a background of the image, so that a ring structure of the adhesion structure including the equidistant block in a connected region may be broken. As shown in FIG. 15(*b*), other two ring structures except the first candidate path may be cut off, and there may be only one candidate path in the adhesion structure of the colon which represents a location where the colon is located.

In 1402, a CGDF between a starting point and an ending point of the first candidate path may be determined. The starting point and the ending point of the first candidate path may be two pixels selected optionally from two ends of the first candidate path. In some embodiments, the starting point and the ending point of the first candidate path may be located at a centerline of a selected colon portion (e.g., the centerline of a colon portion extracted in 503), respectively. In some embodiments, two or more intersection points of an extracted centerline and the first candidate path may be designated as the starting point and the ending point of the first candidate path, respectively. In some embodiments, the CGDF may be determined based on Equation (1). The determination of the CGDF between the starting point and the ending point of the first candidate path may be found elsewhere in the present disclosure. See, for example, operation 1102 and the description thereof.

In 1403, the first candidate path may be divided into one or more equidistant blocks based on the CGDF. In some embodiments, the first candidate path may be divided into a plurality of equidistant blocks based on the CGDF and/or one or more distance intervals between the equidistant blocks. In some embodiments, the distance interval(s) between the plurality of equidistant blocks may be equal or unequal. In some embodiments, the distance interval(s) between the plurality of equidistant blocks may be 4 to 6 pixels, 2 to 3 pixels, etc.

In 1404, a characteristic value of an equidistant block of the first candidate path may be determined. In the present disclosure, a characteristic value may be referred to as a cost value. In some embodiments, the characteristic value may be the number of pixels. In some embodiments, one or more characteristic values of the equidistant blocks of the first candidate path may be determined using a thickness-based algorithm. In some embodiments, the characteristic value(s) of the equidistant blocks of the first candidate path may be determined based on Equation (2). See, for example, operation 1301 and the description thereof.

In some embodiments, the characteristic value(s) of all or part of the equidistant blocks of the first candidate path may be determined.

In 1405, it may be determined whether the characteristic value of the equidistant block is greater than a threshold. In some embodiments, the threshold may relate to a statistical thickness of a colon. In some embodiments, a characteristic value of a thickness of a human colon may be represented by the number of pixels. For example, in the case of the same three-dimensional resolution and the distance interval(s) of the equidistant block divided according to the embodiment illustrated above, the threshold may be 6 (i.e., 6 pixels), and thus, the characteristic value of the thickness of a human colon may be less than 6. If the characteristic value of the equidistant block is less than or equal to the threshold, a thickness of the equidistant block of the first candidate path may coincide with a normal thickness of a human colon, and an image relating to a segmented colon may be obtained in 1407. If the characteristic value of the equidistant block is greater than the threshold, the thickness of the equidistant block of the first candidate path may not coincide with the normal thickness of a human colon, and the process may proceed to operation 1406.

In 1406, an equidistant block with its characteristic value greater than the threshold may be removed, and the removed equidistant block may be compensated. In some embodiments, the equidistant block with its characteristic value greater than the threshold may be removed by setting it as a background, that is, a region corresponding to a colon segment with its characteristic value greater than a preset threshold may be eliminated. For example, an equidistant block to be removed may be set as a background of the image.

In some embodiments, the removed equidistant block may be compensated by connecting its adjacent equidistant blocks. In some embodiments, two equidistant blocks adjacent to the removed equidistant block may be inflated until the two equidistant blocks become connected, so as to compensate the removed equidistant block. The inflation may refer to expanding or enlarging an equidistant block using a certain technique. For example, the removed equidistant block may be compensated by performing region growing based on a plurality of seed points relating to part or all pixels of the adjacent equidistant blocks.

In 1407, an image relating to a segmented colon may be obtained. In some embodiments, a complete image relating to a segmented colon may be obtained by processing one or more first candidate paths of all adhesion structures in a connected region. In some embodiments, the obtained image relating to a segmented colon may be used for further image processing, or be stored in the storage module 230.

It should be noted that the above description of the process for processing the first candidate path is provided for the purpose of illustration, and not intended to limit the scope of the present disclosure. For persons having ordinary skills in the art, various variations and modifications may be conducted on the application field of the above method and system in form and detail on a basis of implementing the above function after understanding the above process. For example, in some embodiments, in 1404, the characteristic value of one or more segments of an equidistant block may be set as a reciprocal of the thickness value. For example, it may be determined based on Equation (3). See, for example, the operation 1301 and the description thereof. As another example, in some embodiments, in 1404, the determined characteristic value of the equidistant block may be directly used in 1405 for comparing with the threshold, or be stored in the storage module 230 before comparing with the threshold. Such variations are within the scope of the present disclosure.

Figure 16A:
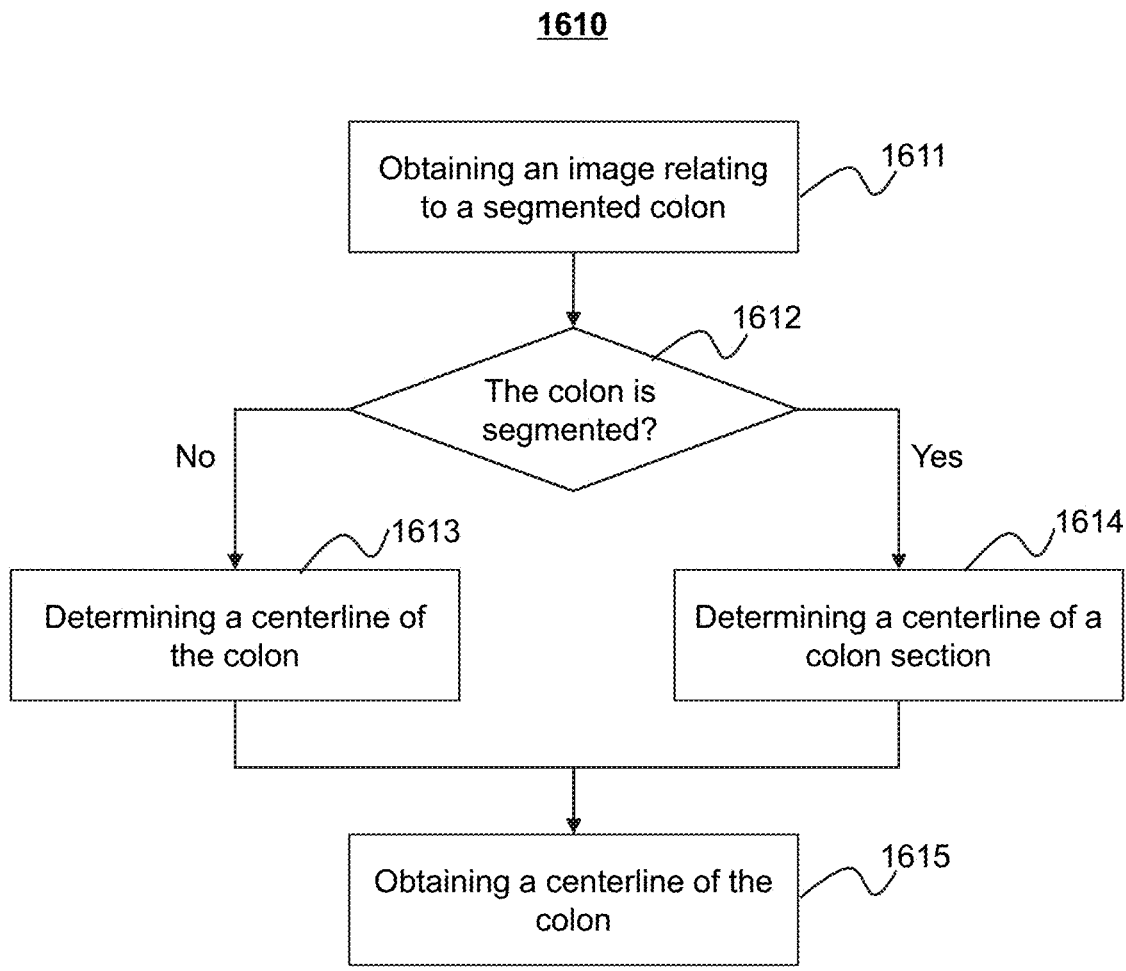
FIG. 16(a) is a flowchart illustrating an exemplary process for determining whether a colon is segmented according to some embodiments of the present disclosure.
Figure 16B:
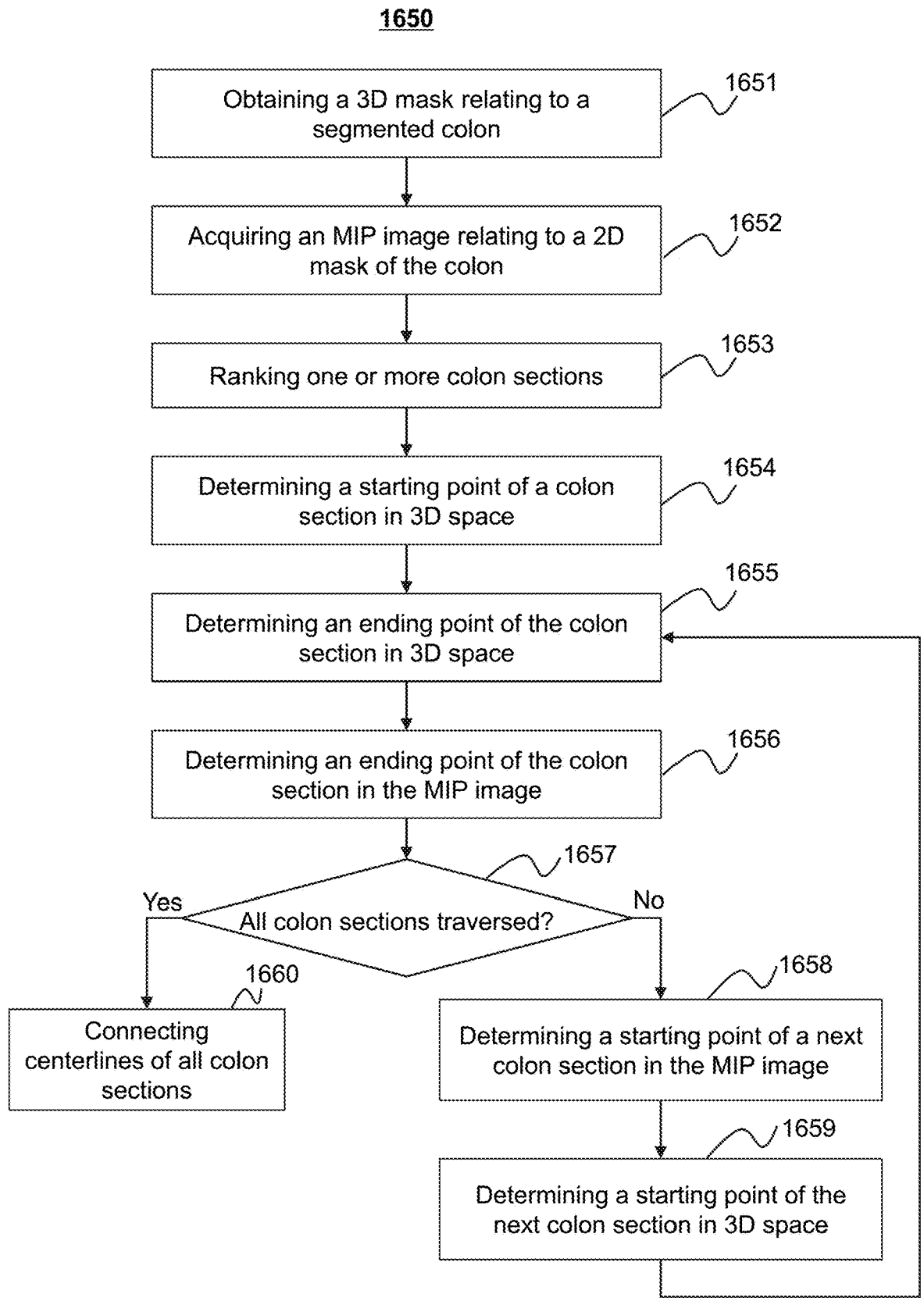
FIG. 16(b) is a flowchart illustrating an exemplary process for automatically connecting one or more centerlines of one or more colon sections according to some embodiments of the present disclosure.

FIG. 16(*a*) is a flowchart illustrating an exemplary process for determining whether a colon is segmented according to some embodiments of the present disclosure. Process 1610 may be implemented by the centerline determination unit 420 in the processing module 210.

In 1611, an image relating to a segmented colon may be obtained. In some embodiments, the obtained image relating to a segmented colon may be segmented from an original three-dimensional scanning image. In some embodiments, the original three-dimensional scanning image may be obtained from the imaging system 110, for example, CT, MRI, PET, X-ray devices, or an ultrasound device. In some embodiments, exemplary techniques for segmentation may include a threshold segmentation technique, a region segmentation technique, an edge segmentation technique, a histogram-based segmentation technique, or the like, or any combination thereof. In some embodiments, the obtained image relating to a segmented colon may be obtained in operation 608 or operation 907.

In 1612, it may be determined whether the colon is segmented. In some embodiments, whether the colon is segmented may be determined based on a segmentation result of the image relating to a colon. If the colon is not segmented, the process may proceed to 1613. If the colon is segmented, the process may proceed to 1615. In some embodiments, in 1611, during a process of generating the original three-dimensional scanning image corresponding to the obtained image relating to a segmented colon, one or more parts of the colon may be folded if a pre-examination relating to a subject is improper, for example, an anus of the subject may be under-inflation before the CT scanning, and thus, one or more segments may be induced in the segmented colon.

In 1613, a centerline of the colon may be determined. The centerline may also be referred to as a middle shaft or a skeleton. The centerline may have connectivity, centricity, robustness, automation, efficiency, etc. An exemplary technique for determining the centerline of the colon may include a manual generation technique, a thinning algorithm, a distance transform algorithm, a level set algorithm, or the like, or any combination thereof. Through the distance transform algorithm, volume data may be coded, and the centerline may be extracted based on a nature that the centerline is located farthest from the boundary. In some embodiments, one or more distances of one or more voxels relating to the colon from the boundary of the colon (Distance From Boundary, DFB) may be determined, and then the centerline may be determined using $1/DFB_q$ as a weight of the boundary to a voxel q, in which the voxel q refers to one of all the voxels in the colon.

In 1614, a centerline of a colon section may be determined. A technique for determining the centerline of a colon section may be the same as or different from that for determining the centerline of the colon in 1613. In some embodiments, centerlines of all colon sections may be obtained by processing all of the colon sections.

In 1615, a centerline of the colon may be obtained. In some embodiments, the centerline determined in 1613 may be designated as a final centerline of the colon. In some embodiments, one or more centerlines of one or more colon sections determined in 1614 may be connected and designated as the final centerline of the colon.

In some embodiments, the centerlines of the colon sections may be connected in a user-interactive way. For example, the centerline of the colon may be obtained by connecting starting points and ending points of colon sections designated by the user.

In some embodiments, the connecting of the centerlines of the colon sections may be implemented in an automatic way. In some embodiments, the automatic way may include one or more of the following operations. A starting point of a first colon section may be set automatically or manually. An ending point H of a centerline of the first colon section may be obtained based on a centerline extraction algorithm. A central point closest to the ending point H may be designated as a starting point J of a second colon section by searching in a spherical region with a center (e.g., the ending point H) and a radius of R. One or more of the above process may be repeated until all the colon sections are processed to obtain the centerlines thereof. In some embodiments, the automatic way may include connecting the centerlines of the colon sections based on an MIP image. FIG. 16(*b*) and the description thereof shows an exemplary process for connecting the centerlines of the colon sections based on an MIP image.

FIG. 16(*b*) is a flowchart illustrating an exemplary process for automatically connecting one or more centerlines of one or more colon sections according to some embodiments of the present disclosure. Process 1650 may be implemented by the centerline unit 420 in the processing module 210. In some embodiments, operation 1615 illustrated in process 1610 may be performed according to the process 1650.

In 1651, a 3D mask relating to a segmented colon may be obtained. In some embodiments, the segmenting of a colon may be realized based on one or more region growing algorithms. The region growing algorithms may be used based on one or more conditions. In some embodiments, the 3D mask relating to a segmented colon may be obtained from the image relating to a segmented colon obtained in 608, or the image relating to a segmented colon obtained in 907.

In 1652, an MIP image relating to a 2D mask of the colon may be acquired. In some embodiments, the MIP image relating to a 2D mask of the colon may be an MIP projection in a coronal plane of a 3D mask of the colon, an MIP projection in a sagittal plane thereof, or an MIP projection in a transverse plane thereof. Merely by way of example, for the MIP projection in the coronal plane, if one or more voxels of one or more colon sections are designated as a mask in the coronal plane, the MIP projection values corresponding to the voxels may be 1; if the voxels of the colon sections are not designated as a mask in the coronal plane, the MIP projection values corresponding to the voxels may be 0. An exemplary MIP image relating to a 2D mask of a colon is shown in FIG. 17(*a*). In some embodiments, the MIP projection values corresponding to voxels of one or more colon sections may be stored in the storage module 230 for further processing.

In 1653, one or more colon sections may be ranked. In some embodiments, one or more rank scores of the colon section(s) may be determined in process 1650. A rank score of a colon section may be an average value corresponding to the colon section. In some embodiments, an average value of a colon section may be an average value of MIP scores of one or more pixels (e.g., all pixels) in the colon section. The MIP scores may relate to spatial positions of the pixels in the colon section. The MIP scores corresponding to pixels at different spatial positions may be the same or different. In some embodiments, the MIP scores of the pixels in the colon section may be obtained based on an MIP score chart relating to the colon.

In some embodiments, an MIP score chart may include one or more regions marked with scores. In some embodiments, the sizes of different regions may be the same or different, and scores marked in different regions may be the same or different. In some embodiments, a score marked in a region may relate to a spatial position of the region. For example, for an MIP score chart relating to the coronal plane of the colon, the scores in different regions may increase gradually in a counterclockwise direction from a starting point of the colon to an ending point thereof. In some embodiments, an MIP score chart relating to the coronal plane of the colon may be divided into seven regions, in which the scores increases gradually in the counterclockwise direction from the starting point of the colon to the ending point thereof, which are 0, 1, 2, 3, 4, 5, and 6, respectively. An exemplary MIP score chart relating to a 2D mask of the colon is shown in FIG. 17(*b*).

In some embodiments, the colon sections may be ranked in ascending order of the average values thereof, and the order of the ranked colon sections may coincide with a natural physiological condition of a human colon. In some embodiments, the ranked colon sections may be marked as a first colon section, a second colon section, a third colon section, etc.

In 1654, a starting point of a colon section in 3D space may be determined. In some embodiments, the starting point of a colon section may be a point on a centerline of the first colon section in 3D space. In some embodiments, a point on the centerline of the first colon section may be designated manually as the starting point of the colon section by a user based on morphological characteristics of the colon section and/or experience of the user. In some embodiments, an intersection point of the centerline of the first colon section and a surface of a starting side of the first colon section may be designated as the starting point of the colon section.

In 1655, an ending point of the colon section in 3D space may be determined. In some embodiments, the ending point of a colon section may be a point on the centerline of a first colon section in 3D space. In some embodiments, a point on the centerline of the first colon section may be designated manually as the ending point of the colon section by the user based on morphological characteristics of the colon section and/or experience of the user. In some embodiments, an intersection point of the centerline of the first colon section and a surface of an ending side of the first colon section may be designated as the ending point of the colon section.

In 1656, an ending point of the colon section in the MIP image may be determined. In some embodiments, the MIP image may be the MIP image relating to a 2D mask of the colon obtained in 1652. In some embodiments, the starting point and the ending point of a colon section in 3D space may be marked with a three-dimensional coordinate (x, y, z), and the starting point and the ending point of the colon section in the MIP image may be marked with a two-dimensional coordinate (x, y). In some embodiments, the MIP image may be in the coronal plane of the colon, and a z axis direction may be perpendicular to the coronal plane of the colon.

In some embodiments, the ending point of the colon section in the MIP image may be determined based on the ending point of the colon section in 3D space determined in 1655. In some embodiments, the ending point of the first colon section in 3D space may be marked as (x1, y1, z1), and the ending point of the first colon section in the MIP image may be marked as (x1, y1).

In 1657, it may determine whether all of the colon sections are traversed. Here, whether all of the colon sections are traversed may refer to whether starting points and ending points of all of the colon sections are determined. If all of the colon sections are traversed, centerlines of all of the colon sections may be connected in 1660. If one or more of the colon sections are not traversed, the process may proceed to 1658.

In 1658, a starting point of a next colon section in the MIP image may be determined. In some embodiments, the next colon section may be obtained based on a ranking result of different colon sections in 1653. For example, a next colon section of the first colon section may be the second colon section.

In some embodiments, the starting point of the next colon section in the MIP image may be determined based on information relating to an ending point of its previous colon section in the MIP image. In some embodiments, the information relating to the previous colon section in the MIP image may be obtained in operation 1656, or from the storage module 230. In some embodiments, in the MIP image, a point in the next colon section closest to the ending point of the previous colon section may be selected as the starting point of the next colon section by searching at the next colon section in a region. A center of the region may be the ending point of the previous colon section. A radius of the region may be R. In some embodiments, R may be obtained based on space distances between different colon sections. For example, R may be 50 pixels.

In 1659, a starting point of the next colon section in 3D space may be determined. In 3D space, one or more starting points of one or more next colon sections may correspond to one or more starting points of one or more next colon sections in the MIP image determined in 1658 one by one. The one-to-one correspondence may indicate that the starting point(s) of the next colon section(s) in 3D space and that in the MIP image determined in 1658 may be one-to-one mapping. The three-dimensional starting point(s) may be obtained by mapping the two-dimensional starting point(s) of the MIP image to 3D space.

In some embodiments, the starting point of the next colon section in 3D space may be determined based on information relating to the starting point in the MIP image. In some embodiments, the information relating to the starting point of the next colon section in the MIP image may be obtained in 1658, or from the storage module 230. For the convenience of illustration, the starting point of the next colon section in 3D space may be marked as ($x_2$, $y_2$, $z_2$), and the starting point of the next colon section in the MIP image may be marked as ($x'_2$, $y'_2$). In some embodiments, $x_2$ may be equal to $x'_2$, and $y_2$ may be equal to $y'_2$. A series of continuous points and masks relating to the colon may be obtained by traversing all of the z axis coordinates of the points that have an x axis coordinate x'$_2$ and a y axis coordinate y'$_2$ in the colon section in 3D space. The points that have an x axis coordinate x'$_2$ and a y axis coordinate y'$_2$ in the colon section may include points in a cavity wall of the colon and the cavity thereof. A point at a centered position among the series of continuous points may be designated as the starting point of the colon section in 3D space.

Figure 17A:
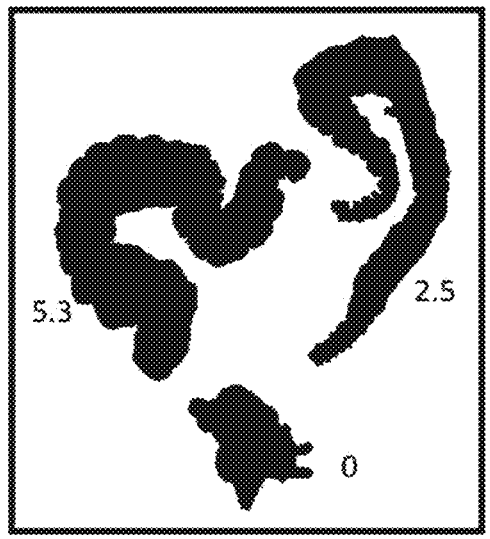
FIG. 17(a) is a schematic diagram illustrating an exemplary maximum intensity projection (MIP) image relating to a two-dimensional mask of a colon according to some embodiments of the present disclosure.
Figure 17B:
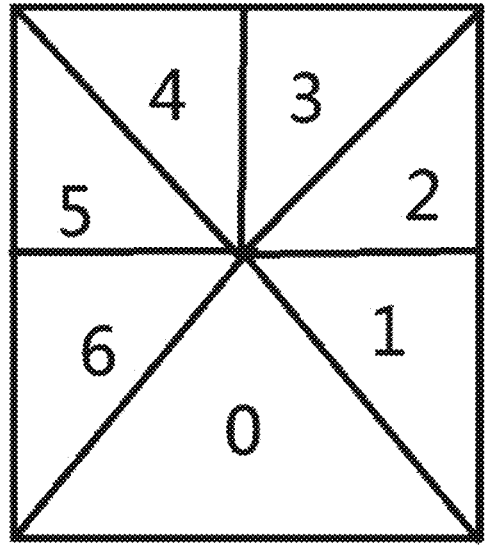
FIG. 17(b) is a schematic diagram illustrating an exemplary MIP score chart relating to a two-dimensional mask of a colon according to some embodiments of the present disclosure.
Figure 17C:
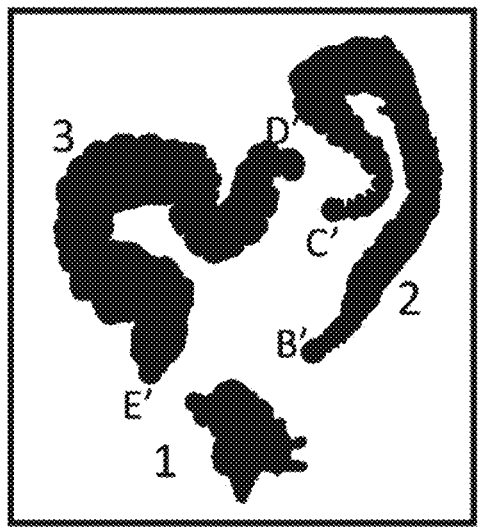
FIG. 17(c) is a schematic diagram illustrating an exemplary distribution of a colon section in an MIP image according to some embodiments of the present disclosure.
Figure 17D:
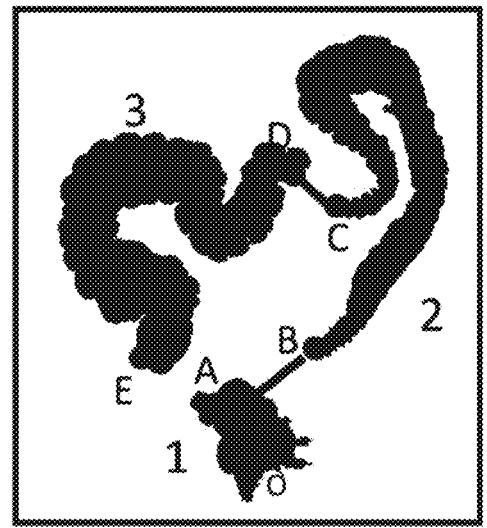
FIG. 17(d) is a schematic diagram illustrating an exemplary distribution of a colon section in a two-dimensional (3D) space according to some embodiments of the present disclosure.

After determining the starting point of the next colon section in 3D space, operations 1655 through 1659 may be repeated until all of the colon sections are traversed, and the process may proceed to 1660. As shown in FIGS. 17(c) and 17(d), three colon sections may be marked respectively as 1, 2, and 3 according to a ranking result. After executing operations 1654 through 1659 for the three colon sections, starting points and ending points of the second colon section and the third colon section may be determined in the MIP image, and be marked respectively as B', C', D', and E', and then, starting points and ending points of the first colon section, the second colon section, and the third colon section may be determined in 3D space and be marked respectively as O, A, B, C, D, and E.

In 1660, the centerlines of all of the colon sections may be connected. In some embodiments, the centerlines of the colon sections may be connected automatically. In some embodiments, a complete centerline of the colon may be obtained by connecting starting points and ending points of all of the colon sections in 3D space.

It should be noted that the above description of the process for automatically connecting the centerlines of the colon sections is provided for the purpose of illustration, and not intended to limit the scope of the present disclosure. For persons having ordinary skills in the art, various variations and modifications may be conducted on the application field of the above method and system in form and detail on a basis of implementing the above function after understanding the above process. For example, in some embodiments, in 1653, for the MIP score chart, the scores in the regions may decrease gradually in a counterclockwise direction from the starting point to the ending point of the colon, and thus, the colon sections may be ranked in descending order of the average values of the colon sections, and the resulting order of the colon sections may coincide with the natural physiological condition of a human colon. As another example, in some embodiments, in 1659, only part of points that have a z axis coordinate z$_2$ instead of all points that have a z axis coordinate z$_2$ in the colon section may be traversed in 3D space, thereby reducing the amount of calculation. Such variations are within the scope of the present disclosure.

Figure 18:
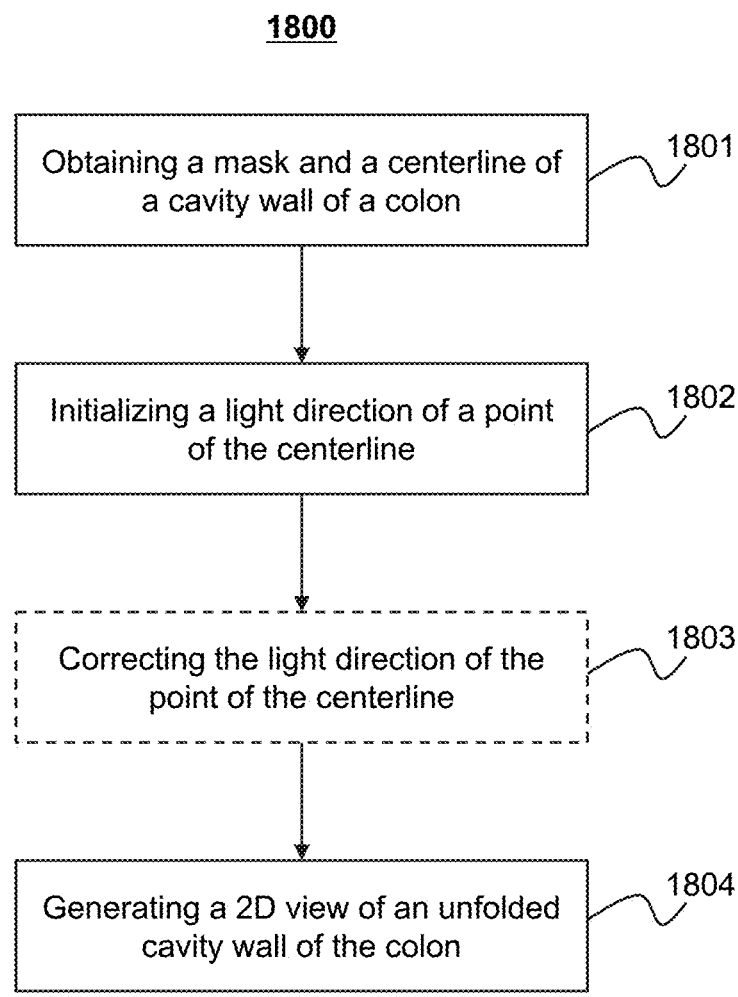
FIG. 18 is a flowchart illustrating an exemplary process for processing an unfolded cavity wall of a colon according to some embodiments of the present disclosure.

FIG. 18 is a flowchart illustrating an exemplary process for processing an unfolded cavity wall of a colon according to some embodiments of the present disclosure. Process 1800 may be implemented by the cavity wall unfolding unit 430 in the processing module 210 of the image processing device 120. In 1801, a mask and a centerline of a cavity wall of a colon may be obtained by the image processing system 100. The cavity wall may be an inner wall of a tubular organ. In some embodiments, the cavity wall may be an inner wall of a colon. In some embodiments, the cavity wall may be a vascular wall, a tracheal wall, or an inner wall of one or more tubular organs, etc.

In 1802, a light direction of a point of the centerline of the cavity wall may be initialized by the image processing system 100. The point of the centerline of the cavity wall may include all or part of points of the centerline. The light direction of the point of the centerline of the cavity wall may include a tangential direction, a normal direction, or other directions, or any combination thereof. The initializing of the light direction of the point of the centerline of the cavity wall may include initializing all or part of the points in the centerline of the cavity wall.

In 1803, the light direction of the point of the centerline may be corrected by the image processing system 100. In some embodiments, the image processing system 100 may correct the light direction of the point of the centerline based on data obtained using electronic colon cleansing. The data obtained using electronic colon cleansing may include an image obtained after removing or partially removing liquid in the cavity of a colon in an enhanced CT image relating to the colon based on an electronic colon cleansing algorithm. The data obtained using electronic colon cleansing may include a CT image relating to a colon scanned after physically colon cleansing of a subject by taking an agent. In some embodiments, the point of the centerline may include all or part of the points of the centerline. The light direction of the point of the centerline may include a tangential direction, a normal direction, or other directions, or any combination thereof. Correcting of the light direction of the point of the centerline may include correcting all or part of the points of the centerline of the cavity wall. In some embodiments, the operation 1803 in which the light direction of the point of the centerline is corrected by the image processing system 100 may be omitted in the processing of an unfolded cavity wall of a colon.

In, 1804, a two-dimensional (2D) view of an unfolded cavity wall may be generated by the image processing system 100. In some embodiments, the cavity wall may be sampled in 1804 based on a determined central point and a corresponding light direction thereof. The two-dimensional view of an unfolded cavity wall may be generated in 1804 by mapping a sample result to a two-dimensional plane. In some embodiments, the cavity wall may be a cavity wall of a colon.

Figure 19:
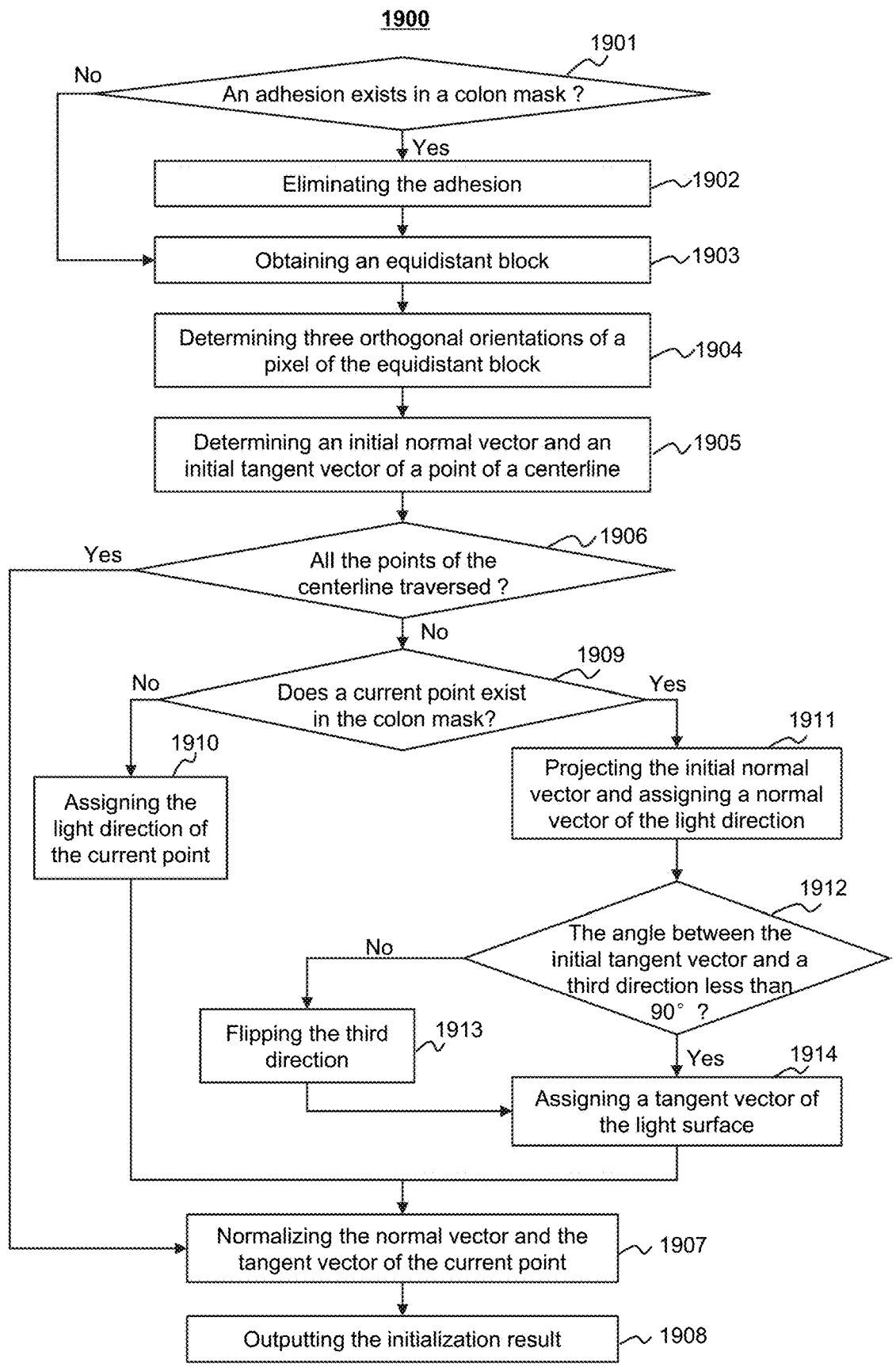
FIG. 19 is a flowchart illustrating an exemplary process for initializing a light direction of a point in a centerline according to some embodiments of the present disclosure.

FIG. 19 is a flowchart illustrating an exemplary process for initializing a light direction of a point in the centerline according to some embodiments of the present disclosure. Process 1900 may be implemented by the cavity wall unfolding unit 430 in the processing module 210 of the image processing device 120. In 1901, whether an adhesion exists in a colon mask may be determined. If an adhesion exists in the colon mask, the adhesion may be eliminated by the image processing system 100 in 1902. If the adhesion does not exist in the colon mask, an equidistant block may be obtained by the image processing system 100 in 1903.

In 1903, the equidistant block may be obtained by the image processing system 100. In some embodiments, in 1903, intersection points of the centerline of the cavity wall of the colon and two side surfaces of the connected region may be designated as a starting point and an ending point respectively by the image processing system 100. A CGDF between a pixel in the connected region, the starting point, and the ending point may be determined by the image processing system 100. The connected region may be divided into one or more equidistant blocks with a preset distance interval based on the determined CGDF by the image processing system 100. The equidistant blocks may be referred to as equidistant slices.

In some embodiments, the CGDF between a pixel in the connected region, the starting point, and the ending point may be determined as follows:

$$CGDF_{AB(p)} = GDF_{A(p)} - GDF_{B(p)}, \quad (4)$$

In Equation (4), the $CGDF_{AB(p)}$ may be a CGDF between a point A, a point B and a pixel p of the connected region. In some embodiments, the point A may be the starting point, while the point B may be the ending point. In some embodiments, the point B may be the starting point, while the point A may be the ending point. The $GDF_{A(p)}$ and the $GDF_{B(p)}$ may be the geodesic distance fields (GDFs) between the point A and the pixel p, and between the point B and the pixel p, respectively.

In some embodiments, the CGDF between the point A, the point B, and the pixel p in the connected region may be obtained by the image processing system 100 through calculation. The CGDF of the connected region may be divided into a series of equidistant blocks based on one or more corresponding distance intervals set by the image processing system 100. The corresponding distance intervals may correspond to the thicknesses of the equidistant blocks. CGDFs of pixels in the same equidistant block may fall into a same range.

In some embodiments, the corresponding distance intervals set by the image processing system 100 may be a length of 0 to 100 pixels. In some embodiments, the corresponding distance intervals between pixels may be set as a length of 1.0 to 2.0 pixels, 2.0 to 3.0 pixels, 3.0 to 4.0 pixels, 4.0 to 5.0 pixels, 5.0 to 6.0 pixels, 6.0 to 7.0 pixels, 7.0 to 8.0 pixels, 8.0 to 9.0 pixels, 9.0 to 10.0 pixels, 10.0 to 20.0 pixels, 20.0 to 30.0 pixels, 30.0 to 40.0 pixels, 40.0 to 50.0 pixels, 50.0 to 60.0 pixels, 60.0 to 70.0 pixels, 70.0 to 80.0 pixels, 80.0 to 90.0 pixels, or 90.0 to 100.0 pixels. For example, the corresponding distance intervals may be set as a length of 2 to 3 pixels.

In 1904, three mutually orthogonal orientations of a pixel of the equidistant block may be determined. The three mutually orthogonal orientations may include a first direction dir1, a second direction dir2, and a third direction dir3. In some embodiments, the three mutually orthogonal orientations of the equidistant block with a certain thickness may be determined using principal component analysis (PCA) by the image processing system 100. As shown in 1903, the equidistant block with a certain thickness may be obtained by dividing a connected region based on a certain distance interval and a CGDF. A three-dimensional coordinate of a pixel in the equidistant block may be designated as three characteristics of the pixel by the image processing system 100, thereby determining three orientations thereof through PCA.

In 1905, an initial normal vector and an initial tangent vector of a point of a centerline may be determined by the image processing system 100. In some embodiments, an initial normal vector N' and an initial tangent vector T' of a point of a centerline of a colon may be determined by the image processing system 100 based on the centerline. Rotation of the initial normal vector N' may be minimized by the image processing system 100. In some embodiments, an angle between normal vectors of two adjacent points of the centerline may be minimized by minimizing the rotation.

In 1906, whether specific points of the centerline have been traversed in 1905 may be determined by the image processing system 100. The specific points may be all or part of the points of the centerline. If the specific points of the centerline are traversed by the image processing system 100 in 1905, a normal vector and a tangent vector of a current point may be normalized in 1907.

If the specific points of the centerline are not traversed by the image processing system 100 in 1905, it may be determined whether a current point exists in the colon mask in 1909. If the current point does not exist in the colon mask, the image processing system 100 may designate a normal vector N and a tangent vector T of a light direction of a previous point as a normal vector and a tangent vector of the current point in 1910. In 1907, the normal vector and the tangent vector of the current point may be normalized by the image processing system 100.

If it is determined by the image processing system 100 in 1909 that the current point exists in the colon mask, the initial normal vector N' may be projected to a plane in which the orientations (i.e., the first direction dir1 and the second direction dir2) are located. In some embodiments, the initial normal vector N' may be assigned to the normal vector N of the light direction by the image processing system 100.

In 1912, whether an angle between the initial tangent vector T' and the third direction dir3 is less than 90° may be determined by the image processing system 100. If the angle between the initial tangent vector T' and the third direction dir3 is equal to or greater than 90°, the third direction dir3 may be flipped by the image processing system 100 in 1913. In 1914, a value relating to the flipped third direction dir3 may be assigned to the tangent vector T by the image processing system 100. If the angle between the initial tangent vector T' and the third direction dir3 is less than 90°, the third direction dir3 may remain unchanged. A value relating to the third direction dir3 may be assigned to the tangent vector T in 1914.

In 1907, the normal vector N and the tangent vector T of the current point may be normalized by the image processing system 100. Lengths of the normalized normal vector N and the tangent vector T may be one, respectively.

In 1908, the initialized light direction of the point of the centerline may be outputted by the image processing system 100.

Figure 20A:
FIG. 20(a) is a schematic diagram illustrating a connected region divided into a plurality of equidistant blocks (or slices) with preset distance intervals according to some embodiments of the present disclosure.

FIG. 20(a) is a schematic diagram illustrating a connected region divided into a plurality of equidistant blocks (or slices) with preset distance intervals according to some embodiments of the present disclosure. In some embodiments, the connected region may be divided into a plurality of equidistant blocks with a preset distance interval by the image processing system 100 based on a determined CGDF. CGDFs of pixels of the same equidistant block may fall into a same range.

Figure 20B:
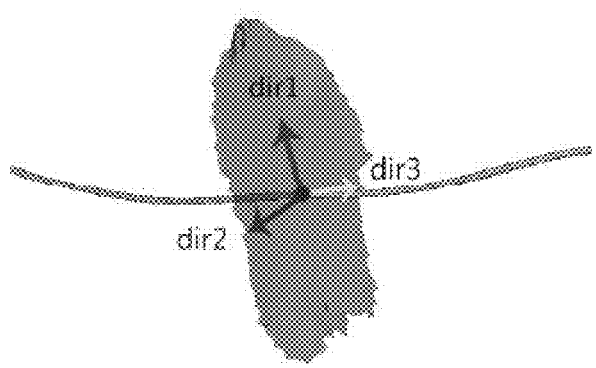
FIG. 20(b) is a schematic diagram illustrating three mutually orthogonal orientations of a pixel in an equidistant block analyzed by using principal component analysis (PCA) according to some embodiments of the present disclosure.

FIG. 20(b) is a schematic diagram illustrating three mutually orthogonal orientations of a pixel in an equidistant block analyzed by using principal component analysis (PCA) according to some embodiments of the present disclosure. The three mutually orthogonal orientations may include a first direction dir1, a second direction dir2 and a third direction dir3.

Figure 21:
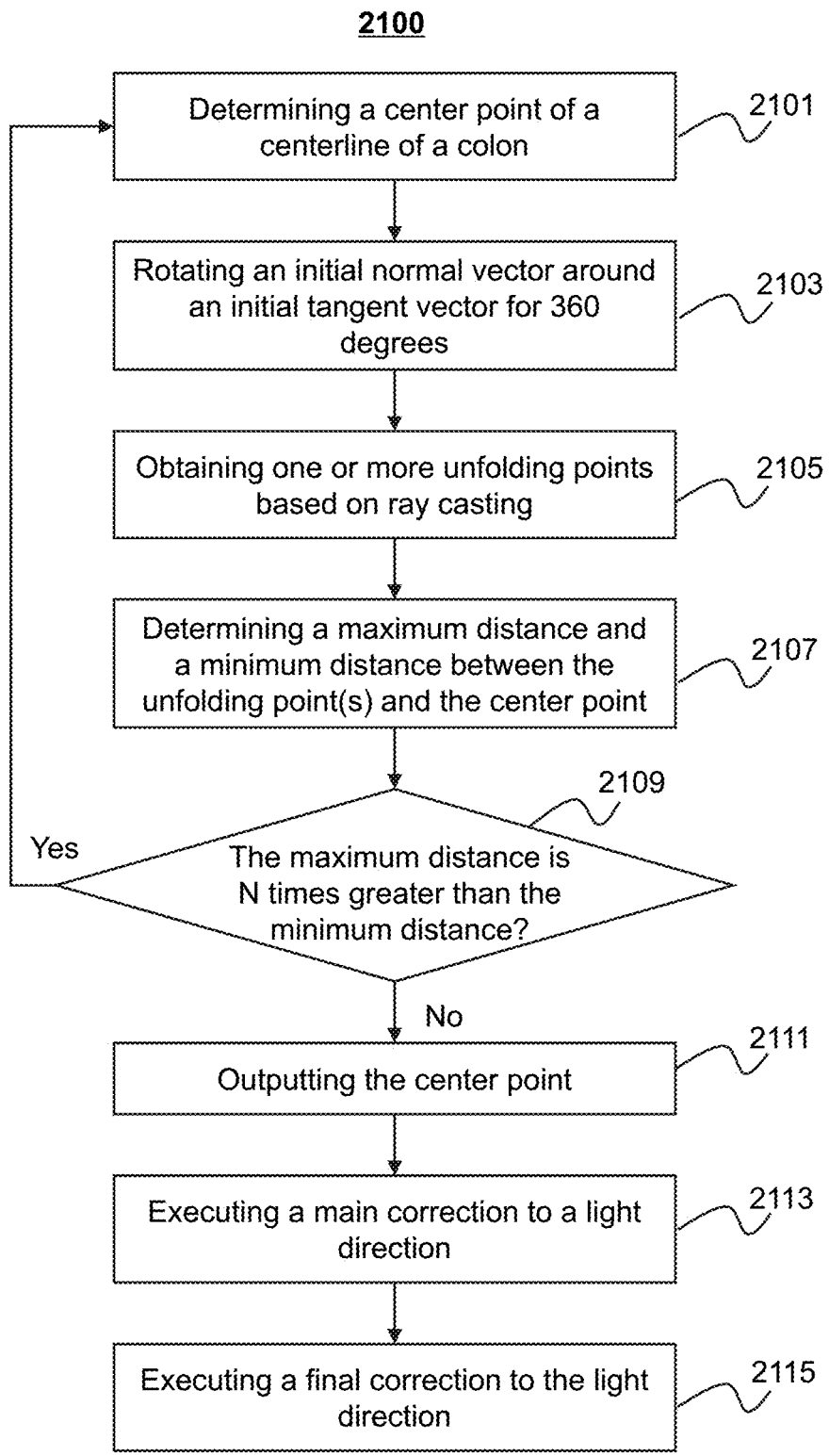
FIG. 21 is a flowchart illustrating an exemplary process for correcting a light direction of a point of a centerline according to some embodiments of the present disclosure.

FIG. 21 is a flowchart illustrating an exemplary process for correcting a light direction of a point of a centerline according to some embodiments of the present disclosure. Process 2100 may be implemented by the cavity wall unfolding unit 430 in the processing module 210 of the image processing device 120. The light direction of the point of the centerline may include a normal direction and a tangential direction. In 2101, a center point P0 of the centerline of a colon may be determined by the image processing system 100. In some embodiments, an initial correction may be performed to the light direction of the point of the centerline by a preliminary adjusting unit of the image processing system 100. In some embodiments, the preliminary adjusting unit may preliminarily correct the light direction. The preliminary adjusting unit may determine a first center point P0 that can be used for unfolding a cavity wall of the colon. A direction of a center point determined before the point P0 may be set as a direction of P0.

In 2103, an initial normal vector around an initial tangent vector may be rotated for 360 degrees in a plurality of times by the image processing system 100. Angles of each rotation may be equal or unequal. An angle of each rotation may be 0 to 120 degrees. In some embodiments, the angle of one rotation may be 0.1 to 1.0 degree, 1.0 to 2.0 degrees, 2.0 to 3.0 degrees, 3.0 to 4.0 degrees, 4.0 to 5.0 degrees, 5.0 to 6.0 degrees, 6.0 to 7.0 degrees, 7.0 to 8.0 degrees, 8.0 to 9.0 degrees, 9.0 to 10.0 degrees, 10.0 to 20.0 degrees, 20.0 to 30.0 degrees, 30.0 to 40.0 degrees, 40.0 to 50.0 degrees, 50.0 to 60.0 degrees, 60.0 to 70.0 degrees, 70.0 to 80.0 degrees, 80.0 to 90.0 degrees, 90.0 to 100.0 degrees, 100.0 to 110.0 degrees, or 110.0 to 120.0 degrees. For example, an angle of each rotation for the initial normal vector rotating around the initial tangent vector may be 1.0 degree, and then 360 rotations are necessary, and 360 rays are generated.

In 2105, M unfolding points may be obtained based on ray casting by the image processing system 100. For a ray of a center point of the centerline with an angle, a CT value of a pixel at a certain position in the ray may be obtained by the image processing system 100 using a ray casting algorithm, based on data obtained after colon cleansing. A relatively small step size may be increased gradually in the ray casting algorithm. When the CT value of the certain position obtained by the image processing system 100 is greater than a certain value after increasing the step size, a point corresponding to the certain position may be designated as an unfolding point in this direction. For example, if the initial normal vector rotates around the initial tangent vector for 360 degrees, and the angle of each rotation is 1 degree, then 360 unfolding points may be obtained by the image processing system 100. If the angle of each rotation is 2 degrees, then 180 unfolding points may be obtained by the image processing system 100. The number of the unfolding points M may relate to the angle of each rotation.

It should be noted that the above description of the CT value is provided for the purpose of illustration, and not intended to limit the scope of the present disclosure. For persons having ordinary skills in the art, various variations and modifications may be conducted on the application field of the above method and system in form and detail on a basis of implementing the above function after understanding the above process. For example, in some embodiments, a density, a gray value, a projection rate of X-ray, etc. of local tissue or a local organ relating to the certain position may be obtained by the image processing system 100 using the ray casting algorithm based on the data obtained after colon cleansing. Such variations are within the scope of the present disclosure.

In some embodiments, the CT value obtained by the image processing system 100 may be greater than a value, the value may be −1000 HU to 0. The value may be −1000 HU to −900 HU, −900 HU to −800 HU, −800 HU to −700 HU, −700 HU to −600 HU, −600 HU to −500 HU, −500 HU to −400 HU, −400 HU to −300 HU, −300 HU to −200 HU, −200 HU to −100 HU, −100 HU to −90 HU, −90 HU to −80 HU, −80 HU to −70 HU, −70 HU to −60 HU, −60 HU to −50 HU, −50 HU to −40 HU, −40 HU to −30 HU, −30 HU to −20 HU, −20 HU to −10 HU, or −10 HU to 0. For example, the value may be −800 HU. If the CT value of a pixel at the certain position obtained by the image processing system 100 is greater than −800 HU, a point corresponding to the certain position may be designated as an unfolding point in this direction.

In some embodiments, the gradually increasing step size in the ray casting algorithm may be 0 to 10 mm. In some embodiments, the gradually increasing step size may be 0.01 mm to 0.1 mm, 0.1 mm to 0.2 mm, 0.2 mm to 0.3 mm, 0.3 mm to 0.4 mm, 0.4 mm to 0.5 mm, 0.5 mm to 0.6 mm, 0.6 mm to 0.7 mm, 0.7 mm to 0.8 mm, 0.8 mm to 0.9 mm, 0.9 mm to 1.0 mm, 1.0 mm to 2.0 mm, 2.0 mm to 3.0 mm, 3.0 mm to 4.0 mm, 4.0 mm to 5.0 mm, 5.0 mm to 6.0 mm, 6.0 mm to 7.0 mm, 7.0 mm to 8.0 mm, 8.0 mm to 9.0 mm, or 9.0 mm to 10.0 mm. For example, the gradually increasing step size may be 0.01 mm.

In 2107, a maximum distance and a minimum distance between the M unfolding points and the center point may be determined by the image processing system 100. In 2109, whether the maximum distance is greater than N times of the minimum distance may be determined by the image processing system 100. If the maximum distance is not greater than N times of the minimum distance, the center point may be designated as the center point P0 for unfolding the cavity wall of the colon. The center point may be output by the image processing system 100 in 2111. If the maximum distance is greater than N times of the minimum distance, the center point may be not suitable to be designated as the center point P0 for unfolding the cavity wall of the colon. Operation 2101 and following related operations may be executed by the image processing system 100 for one or more times, until the center point P0 suitable for unfolding the cavity wall of the colon is determined.

In some embodiments, the number N may be 0.1 to 10. The number N may be 0.1 to 0.2, 0.2 to 0.3, 0.3 to 0.4, 0.4 to 0.5, 0.5 to 0.6, 0.6 to 0.7, 0.7 to 0.8, 0.8 to 0.9, 0.9 to 1.0, 1.0 to 2.0, 2.0 to 3.0, 3.0 to 4.0, 4.0 to 5.0, 5.0 to 6.0, 6.0 to 7.0, 7.0 to 8.0, 8.0 to 9.0, or 9.0 to 10.0. For example, N may be 3.

In 2113, a main correction to a main light direction may be executed by a main adjusting unit in the processing module 210 of the image processing system 100. The main adjusting unit may obtain one or more directions of one or more center points for unfolding the cavity wall of the colon by performing the main correction for the main light direction. In 2115, a final correction may be executed to a main light direction by a final adjusting unit in the processing module 210 of the image processing system 100. In some embodiments, the final adjusting unit of the image processing system 100 may perform a final correction for the light direction of the point of the centerline, so as to process one or more center points which are not processed by the main adjusting unit. An exemplary process for implementing operations 2113 and 2115 may be found elsewhere in the present disclosure. See, for example, FIG. 22 and description thereof.

Figure 22:
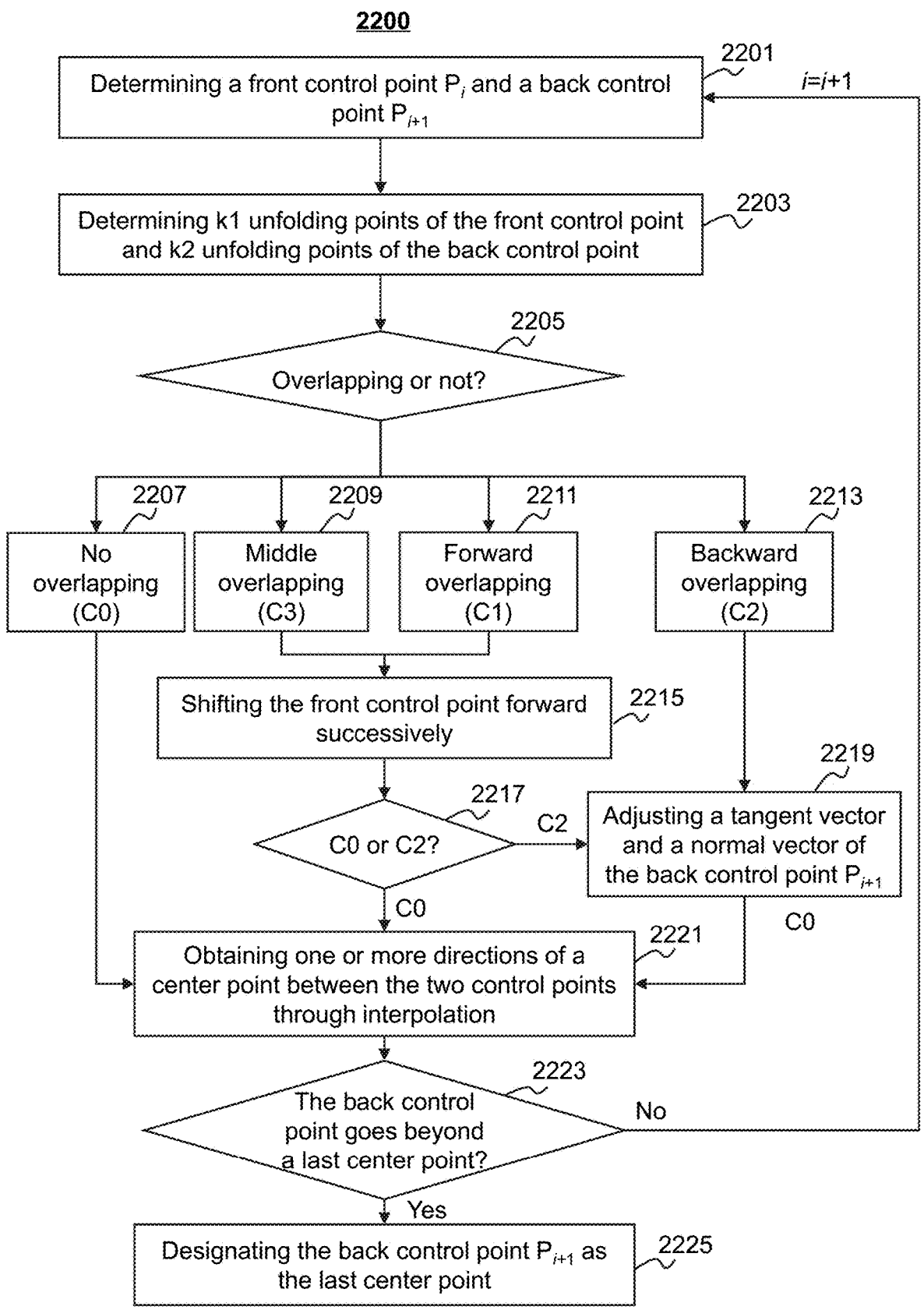
FIG. 22 is a flowchart illustrating an exemplary process for performing a main correction and a final correction to a light direction of a point of a centerline according to some embodiments of the present disclosure.
Figure 23A:
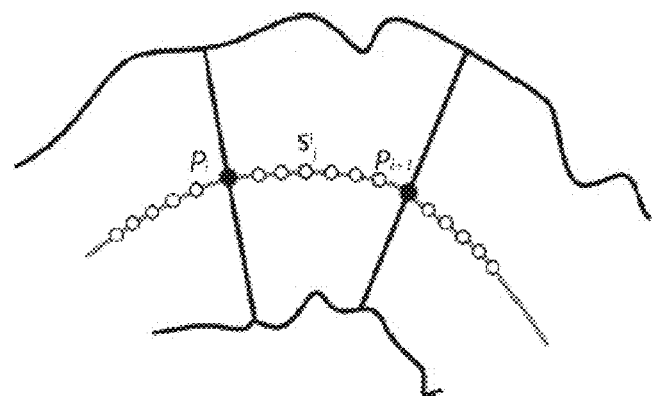
FIG. 23(a) is a schematic diagram illustrating an exemplary control point and a center point used in correcting a light direction according to some embodiments of the present disclosure.

FIG. 22 is a flowchart illustrating an exemplary process for performing a main correction and a final correction to a light direction of a point of a centerline according to some embodiments of the present disclosure. Process 2200 may be implemented by the cavity wall unfolding unit 430 in the processing module 210 of the image processing device 120. In 2201, a front control point $P_i$ and a back control point $P_{i+1}$ may be determined by the image processing system 100, as shown in FIG. 23(a). A space between the back control point $P_{i+1}$ and the front control point $P_i$ may be 10 to 1000. In some embodiments, the space between the back control point $P_{i+1}$ and the front control point $P_i$ may be 10 to 20, 20 to 30, 30 to 40, 40 to 50, 50 to 60, 60 to 70, 70 to 80, 80 to 90, 90 to 100, 100 to 200, 200 to 300, 300 to 400, 400 to 500, 500 to 600, 600 to 700, 700 to 800, 800 to 900, or 900 to 1000. For example, the space between the back control point $P_{i+1}$ and the front control point $P_i$ may be 50.

In 2203, k1 unfolding points of the front control point $P_i$ (also referred to as front unfolding points) and k2 unfolding points of the back control point $P_{i+1}$ (also referred to as back unfolding points) may be determined by the image processing system 100. In some embodiments, the number k1 may be equal to the number k2. In some embodiments, the k1 front unfolding points may be obtained by the image processing system 100 through performing ray casting in an initial direction of the front control point $P_i$. The k2 back unfolding points may be obtained by the image processing system 100 through performing ray casting in an initial direction of the back control point $P_{i+1}$. The number of the obtained front unfolding points and back unfolding points may relate to an angle of each rotation in ray casting, and related descriptions may be found in FIG. 21 and the description thereof.

In 2205, an overlapping situation of two or more unfolding surfaces corresponding to the front control point $P_i$ and the back control point $P_{i+1}$ may be determined by the image processing system 100, as shown in FIGS. 23(*b*), 23(*c*), 23(*d*), and 23(*e*). An unfolding surface of the front control point may be a plane determined by one or more (e.g., all) of the unfolding points thereof. An unfolding surface of the back control point may be a plane determined by one or more (e.g., all) of the unfolding points thereof. In the determination of the overlapping situation of the unfolding surfaces corresponding to the front control point $P_i$ and the back control point $P_{i+1}$, if k1 is not equal to k2, then the angle of a rotation may be adjusted by the image processing system 100 to make k1 equal to k2, and related descriptions may be found in FIG. 21 and the description thereof. In FIG. 23(*b*), $P_i$ may be the front control point; $P_{i+1}$ may be the back control point; $T_i$ and $T_{i+1}$ may be initial tangent vectors of the front control point $P_i$ and the back control point $P_{i+1}$, respectively; $B_i(k)$ may be a kth unfolding point of the front control point; $B_{i+1}(k)$ may be a kth unfolding point of the back control point; $Q_i(k)$ may relate to a connecting direction of the kth unfolding point of the back control point and the front control point, i.e., $B_{i+1}(k)-P_i$; $W_{i+1}(k)$ may relate to a connecting direction of the kth unfolding point of the front control point and the back control point, i.e., $B_i(k)-P_{i+1}$.

If $T_i \cdot Q_i(k) < 0$, and $-T_{i+1} \cdot W_{i+1}(k) < 0$, it may be determined by the image processing system 100 that an overlapping situation of the unfolding surfaces corresponding to the front control point $P_i$ and the back control point $P_{i+1}$ is middle overlapping, which may be marked as C3; if $T_i \cdot Q_i(k) < 0$, and $-T_{i+1} \cdot W_{i+1}(k) \geq 0$, it may be determined by the image processing system 100 that an overlapping situation of the unfolding surfaces corresponding to the front control point $P_i$ and the back control point $P_{i+1}$ is a forward overlapping, which may be marked as C1; if $T_i \cdot Q_i(k) \geq 0$, and $-T_{i+1} \cdot W_{i+1}(k) < 0$, it may be determined by the image processing system 100 that an overlapping situation of the unfolding surfaces corresponding to the front control point $P_i$ and the back control point $P_{i+1}$ is a backward overlapping, which may be marked as C2; if $T_i \cdot Q_i(k) \geq 0$, and $-T_{i+1} \cdot W_{i+1}(k) \geq 0$, or other cases, it may be determined by the image processing system 100 that an overlapping situation of the unfolding surfaces corresponding to the front control point $P_i$ and the back control point $P_{i+1}$ is no overlapping, which may be marked as C0. Four cases of no overlapping, a backward overlapping, a middle overlapping, and a forward overlapping may be shown in FIGS. 23(*b*), 23(*c*), 23(*d*), and 23(*e*).

As shown in FIG. 22, a center point S between the front control point $P_i$ and the back control point $P_{i+1}$ may be selected by the image processing system 100. $S_j^i$ may be a $j^{th}$ center point behind the front control point $P_i$. In 2207, it may be determined by the image processing system 100 that the overlapping situation of the unfolding surfaces corresponding to the front control point $P_i$ and the back control point $P_{i+1}$ is no overlapping (C0). Then in 2221, directions $R_j^i(k)$ of the center point $S_j^i$ may be obtained by the image processing system 100 through interpolating a front control surface and a back control surface, as illustrated by Equation (5):

$$R_j^i(k) = \left(\frac{t-j}{t} \cdot B_i(k) + \frac{j}{t} \cdot B_{i+1}(k)\right) - S_j^i, \tag{5}$$

In Equation (5), $R_j^i(k)$ may be a kth direction of the jth center point $S_j^i$ from the front control point $P_i$; t may be a distance between the front control point $P_i$ and the back control point $P_{i+1}$.

In 2209, it may be determined by the image processing system 100 that the overlapping situation of the unfolding surfaces corresponding to the front control point $P_i$ and the back control point $P_{i+1}$ is middle overlapping (C3). In 2211, it may be determined by the image processing system 100 that the overlapping situation of the unfolding surfaces corresponding to the front control point $P_i$ and the back control point $P_{i+1}$ is a forward overlapping (C1).

If the overlapping situation is C1 or C3, the front control point $P_i$ may be shifted successively by the image processing system 100 in 2215. For example, the front control point $P_i$ may be shifted forward successively by the image processing system 100. The forward shifting of the front control point $P_i$ may refer to using a center point and/or a control point before the front control point $P_i$ as a new front control point successively. A point between the new front control point and the back control point may be a center point. The image processing system 100 may determine an overlapping situation of the unfolding surfaces corresponding to the new front control point and the back control point based on the determination criteria mentioned above, until the overlapping situation is C0 or C2.

If the overlapping situation of the unfolding surfaces corresponding to the front control point and the back control point is C0 after shifting the front control point $P_i$, a plurality of directions $R_j^i(k)$ of $S_j^i$ may be obtained by the image processing system 100 through interpolating a front control surface and a back control surface based on Equation (5) in 2221.

If the overlapping situation of the unfolding surfaces corresponding to the front control point and the back control point is C2 after shifting the front control point $P_i$, or it is determined by the image processing system 100 in 2215 that the overlapping situation of the unfolding surfaces corresponding to the front control point and the back control point is C2, then a tangent vector and a normal vector of the back control point $P_{i+1}$ may be adjusted by the image processing system 100 in 2219. In some embodiments, the image processing system 100 may traverse the $S_j^i$ from near to far, using a tangent vector and a normal vector of the $S_j^i$ as the tangent vector and the normal vector of the back control point $P_{i+1}$ successively. A distance between the $S_j^i$ and the back control point $P_{i+1}$ may be gradually increased by the image processing system 100. For example, the $S_j^i$ may be traversed by the image processing system 100 based on a principle of from near to far. The "near" in the principle of from near to far may refer that the center point $S_j^i$ is close to the back control point $P_{i+1}$. The "far" in the principle of from near to far may refer that the center point $S_j^i$ is far from the back control point $P_{i+1}$. From near to far may refer that j decreases gradually. The image processing system 100 may determine the unfolding surface of the back control point $P_{i+1}$ in the light direction using ray casting, and determine an overlapping situation of the unfolding surface of the back control point $P_{i+1}$ and the unfolding surface of the front control point $P_i$. If the overlapping situation of the unfolding surfaces corresponding to the back control point $P_{i+1}$ and the front control point $P_i$ is C0, a plurality of directions $R_j^i(k)$ of $S_j^i$ may be obtained by the image processing system 100 through interpolating a front control surface and a back control surface based on Equation (4) in 2221.

In 2223, it may be determined by the image processing system 100 whether the back control point $P_{i+1}$ goes beyond a last center point. In some embodiments, the image processing system 100 may designate the back control point $P_{i+1}$ as a new front control point $P_i$, and designate a center point which has a certain space behind the new front control point $P_i$ as a new back control point $P_{i+1}$. For example, the certain space may be 50. If it is determined that the back control point $P_{i+1}$ does not go beyond the last center point, the image processing system 100 may perform operation 2201 and the following related operations thereto for one or more times.

If it is determined that the back control point $P_{i+1}$ goes beyond the last center point, the last center point may be designated by the image processing system 100 as the back control point $P_{i+1}$ in 2225. In some embodiments, a final correction may be performed to the light direction of the point of the centerline by the final adjusting unit of the image processing system 100, so as to traverse one or more center points which are not processed by the main adjusting unit. If it is determined that the back control point $P_{i+1}$ goes beyond the last center point, the image processing system 100 may designate the last center point as the back control point $P_{i+1}$, and adjust a direction of the back control point $P_{i+1}$ by executing the processing step in the case of C2 until the front unfolding surface and the back unfolding surface are adjusted to be no overlapping. Then the image processing system 100 may obtain a direction of a middle center point through interpolation.

Figure 23B:
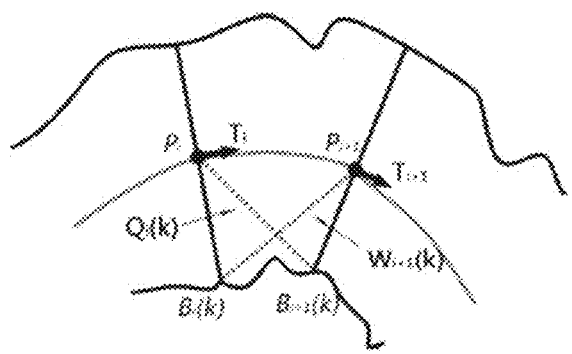
FIG. 23(b) is a schematic diagram illustrating an overlapping situation of an unfolding surface corresponding to a front control point and an unfolding surface corresponding to a back control point being no overlapping according to some embodiments of the present disclosure.
Figure 23C:
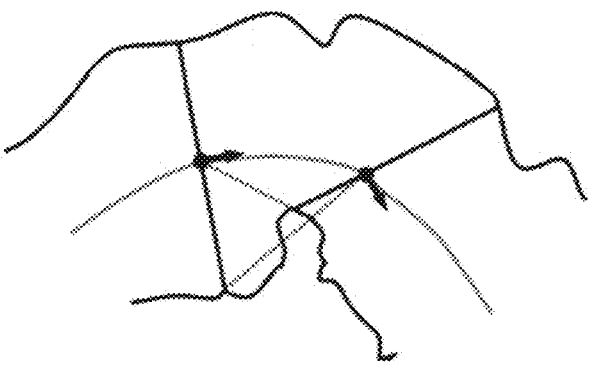
FIG. 23(c) is a schematic diagram illustrating an overlapping situation of an unfolding surface corresponding to a front control point and an unfolding surface corresponding to a back control point being a backward overlapping according to some embodiments of the present disclosure.
Figure 23D:
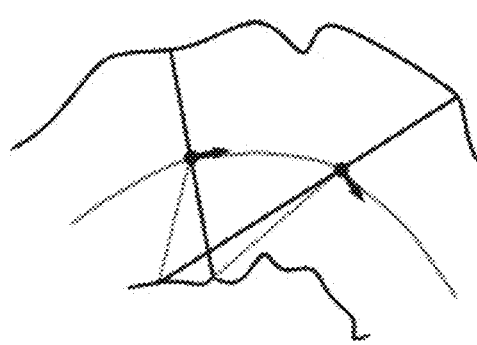
FIG. 23(d) is a schematic diagram illustrating an overlapping situation of an unfolding surface corresponding to a front control point and an unfolding surface corresponding to a back control point being middle overlapping according to some embodiments of the present disclosure.
Figure 23E:
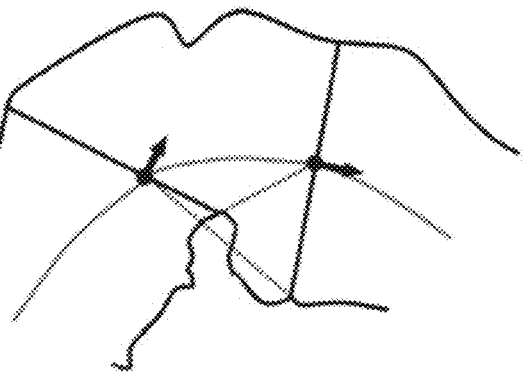
FIG. 23(e) is a schematic diagram illustrating an overlapping situation of an unfolding surface corresponding to a front control point and an unfolding surface corresponding to a back control point being a forward overlapping according to some embodiments of the present disclosure.

FIG. 23(a) is a schematic diagram illustrating a control point and a center point used in correcting a light direction according to some embodiments of the present disclosure. FIG. 23(b) is a schematic diagram illustrating an overlapping situation of an unfolding surface corresponding to a front control point and an unfolding surface corresponding to a back control point being no overlapping according to some embodiments of the present disclosure. FIG. 23(c) is a schematic diagram illustrating an overlapping situation of an unfolding surface corresponding to a front control point and an unfolding surface corresponding to a back control point being a backward overlapping according to some embodiments of the present disclosure. FIG. 23(d) is a schematic diagram illustrating an overlapping situation of an unfolding surface corresponding to a front control point and an unfolding surface corresponding to a back control point being middle overlapping according to some embodiments of the present disclosure. FIG. 23(e) is a schematic diagram illustrating an overlapping situation of an unfolding surface corresponding to a front control point and an unfolding surface corresponding to a back control point being a forward overlapping according to some embodiments of the present disclosure. Whether the cavity wall of the colon unfolded from the unfolding point is overlapped may be determined based on the overlapping situation of the unfolding surfaces corresponding to the front control point and the back control point.

FIG. 24(a) is a flowchart illustrating an exemplary volume rendering process of a medical image according to some embodiments of the present disclosure. Process 2400 may be implemented by the cavity wall unfolding unit 430 in the processing module 210 of the image processing device 120.

In 2401, an image relating to volume data of one or more tissues may be obtained. Labels of the one or more tissues may be organized in a tissue set. In some embodiments, the medical image may be a three-dimensional and/or two-dimensional image obtained through scanning by imaging systems of various modalities. In some embodiments, the medical image may be obtained by transmitting from an internal or external storage system, for example, a picture archiving and communication system (PACS), etc. The imaging systems of various modalities may include without limitation to a magnetic resonance imaging (MRI) system, a magnetic resonance angiography (MRA) system, a computed tomography scanning (CT) system, a positron emission tomography (PET) system, or the like, or any combination thereof.

In 2402, a sample point in the volume data may be selected. In 2403, one or more neighboring points of the sample point may be obtained. In some embodiments, labels of the neighboring points may be organized in a neighboring point set. As shown in FIG. 24(c), the sample point x may have eight neighboring points in space. In 2404, it may be determined whether the labels of the neighboring points belong to the tissue set. In some embodiments, a label of a neighboring point in the neighboring point set may be selected based on the tissue set and the neighboring point set, and whether the label of the neighboring point belongs to the tissue set may be determined. That is, it may be determined whether the label of the neighboring point is the same as a tissue label of the tissue set, or whether an attribute of the neighboring point and a tissue of the tissue set are the same or belong to a same tissue.

In 2405, a color of the sample point may be determined based on the determination result obtained in 2402. In 2406, a volume rendering result of the tissues may be obtained based on the color of the sample point.

FIG. 24(b) is a flowchart illustrating an exemplary volume rendering process of a medical image according to some embodiments of the present disclosure. Process 2410 may be implemented by the image processing device 120, for example, the processing module 210 in the image processing device 120, or the cavity wall unfolding unit 430 in the processing module 210.

In 2411, an image relating to volume data of one or more tissues may be obtained. The tissue labels of the one or more tissues are organized in a tissue set. In some embodiments, the volume data may be three-dimensional data including discrete voxels. In some embodiments, the volume data may include texels (i.e., texture elements). The texels may be fundamental units in image texture space. The textures may be represented by one or more arrays of the texels. An image value of a point of the image relating to the volume data may correspond to one or more attributes of the voxels or texels. The attributes may include gray scale, brightness, a color, a spatial position, absorbance of X-ray or γ-ray, density of hydrogen atom, biomolecule metabolism, receptor and/or neurohumoral activity, or the like, or any combination thereof. Image values of the voxels or texels may be represented by labels.

In some embodiments, the image relating to the volume data may be an image output after image processing. For example, the image relating to the volume data may include a medical image processed by image segmentation, a medical image for extracting a centerline of a vessel, a virtual endoscopic image, an image relating to an unfolding result of a cavity wall of a colon including a polyp tissue, or the like, or any combination thereof. The image segmentation may refer to dividing an image into one or more specific tissues. The tissues may include a head, a thoracic cavity, an organ, a bone, a vessel, a colon, etc., a tissue of multiple organs, a polyp tissue, a nodule, a cyst, a cancerous tumor, multiple non-organ tissues, etc.

In some embodiments, the labels of the tissues and the image values of the voxels may be one or more attributes corresponding to the voxels. Merely by way of example, an image relating to the volume data extracted from a vessel may include tissues such as a bone, a vessel, a muscle, etc., and attributes of the tissues may correspond to the labels of the tissues. For example, a label of the bone is one, a label of the vessel is two, and a label of the muscle is three. The labels of the tissues may be organized in a tissue set.

In 2412, a sample point in the volume data may be selected. In 2413, one or more neighboring points of the sample point may be obtained. Labels of the neighboring points may be organized in a neighboring point set. In some embodiments, the image relating to the volume data may record a value of each discrete grid in three-dimensional space. The values of one or more (e.g., all) discrete grids may be a discrete point set, that is, a voxel set. A voxel may be a normalized cubic space corresponding to a sample point obtained by sampling at equal intervals in three directions using a three-dimensional Cartesian grid with a resolution of n×n×n. The sample point may be located at the grid or at a point of other spatial positions. In actual sampling, data relating to intervals between adjacent voxels may be provided, such as a step size that represents an interval between the adjacent voxels.

In some embodiments, a small neighboring region of a sample point x may be defined as a cuboid range centered by the sample point x. The sample point x may have n neighboring points in a continuous volume data space. As shown in FIG. 24(c), the sample point x may have eight neighboring points in the volume data space. In three-dimensional space, an attribute of a coordinate such as a position, a color, and/or a density may be defined by one or more labels, that is, an attribute of a neighboring point may be represented by one or more corresponding labels. Merely by way of example, if the labels of the neighboring points are organized in a neighboring point set, a two-dimensional or three-dimensional rendering result of an image may be observed from different angles by using the information mentioned above and/or display software.

In some embodiments, a closest neighboring point of the sample point may be selected. According to statistics theory, a possibility that the sample point and the closest neighboring point belong to a same tissue (i.e., a same voxel label, e.g., a same attribute such as color, density, etc.) may be larger than that of other neighboring points, that is, the sample point may be processed by processing the closest neighboring point, and thus, a color of the sample point may be determined.

In 2414, it may be determined whether the labels of the neighboring points belong to the tissue set. In some embodiments, a label of a neighboring point in the neighboring point set may be selected to determine whether the label of the neighboring point belongs to the tissue set, based on the tissue set and the neighboring point set. That is, it may be determined whether the label of the neighboring point is the same as a tissue label of the tissue set, or whether the neighboring point and a tissue of the tissue set have the same attribute or belong to a same tissue.

If not, that is, it may be determined that the labels of the neighboring points do not belong to the tissue set, the process may proceed to 2415, in which a color list may be obtained based on the labels of the neighboring points, and a color of the sample point may be determined. The color list may include preset color attributes of the voxels, the color attributes and the image values of the voxels may have a mapping relationship, and/or the image values of the voxels may be represented by the labels. For example, an image value of a sample point corresponding to the neighboring point may be obtained based on the label(s) of the neighboring point(s). A color attribute of the sample point may be further obtained based on a mapping relationship between the image value of the sample point and the color list, and then volume rendering may be performed to the sample point. In some embodiments, the color attribute may be the intensity of gray value of a voxel, for example, an HU value. In some embodiments, the color attribute may be a rendering color preset by a user and/or a processor. In some embodiments, the neighboring point may be the closest neighboring point of the sample point.

If it is determined to be yes, that is, it may be determined that the labels of the neighboring points belong to the tissue set, the process may proceed to 2416, in which the image values of the neighboring points may be normalized based on the tissue label. The normalization process may be shown in FIG. 24(d).

FIG. 24(d) is a flowchart illustrating an exemplary process for normalizing an image value of a neighboring point according to some embodiments of the present disclosure. Process 2420 may be implemented by the image processing device 120, for example, the processing module 210 in the image processing device 120, or the cavity wall unfolding unit 430 in the processing module 210. In 2421, a tissue label in a tissue set may be selected. In 2422, the labels of all neighboring points in a neighboring point set may be traversed based on the tissue label. In 2423, it may be determined whether the label(s) of the neighboring point(s) are identical to the tissue label.

If it is determined to be yes, that is, the label(s) of the neighboring point(s) are identical to the tissue label, the process may proceed to 2424, in which the neighboring point(s) may be designated as belonging to a foreground region.

If it is determined to be no, that is, the label(s) of the neighboring point(s) are not identical to the tissue label, the process may proceed to 2425, in which the neighboring point(s) may be designated as belonging to a background region.

In some embodiments, the foreground region may be a tissue desirable to be displayed in the volume data, for example, a vessel boundary and a bone may be tissues desirable to be displayed in an image relating to a vessel, and other tissues may belong to the background region. In some embodiments, the normalization process may be a binarization process. For example, if the label(s) of the neighboring point(s) are identical to the tissue label, the image value(s) of the neighboring point(s) may be set to 1; if the label(s) of the neighboring point(s) are not identical to the tissue label, the image value(s) of the neighboring point(s) may be set to 0.

In 2417, an interpolation result of the sample point may be obtained based on the interpolation of the normalized image values of the neighboring points. In some embodiments, the interpolation process may be performed to image values of neighboring points in the foreground region. In some embodiments, the interpolation process may include linear interpolation, non-linear interpolation, interpolation based on a regularization function, and/or diffusion interpolation based on a partial differential equation, etc. For example, a linear interpolation may be performed to the image values of the neighboring points in the foreground region. An interpolation result of the neighboring points with respect to the sample point may be determined based on an interpolation coefficient function, and an interpolation result with respect to the sample point may be obtained on one or more mathematical operations including addition, averaging, and/or integration. An exemplary interpolation operation may be performed based on Equation (6):

$$S(x) = \Sigma_0^i f(x, x_i) S_i, \quad (6)$$

In Equation (6), x may represent a sample point, S(x) may represent a set of values relating to an interpolation result, and $x_i$ may represent an ith neighboring point of the sample point x, in which i is a natural number from 1 to n. For example, if eight neighboring points near the sample point x is used for interpolation operation, i may be one of the numbers from 1 to 8. $S_i$ may represent a normalization result of the neighboring point $x_i$ with respect to the sample point. $f(x, x_i)$ may represent an interpolation coefficient function of the neighboring point $x_i$ with respect to the sample point.

In 2418, a color of the sample point may be determined based on the interpolation result of the image value(s). An exemplary process for determining the color of the sample point may be shown in FIG. 24(*e*).

Figure 24:
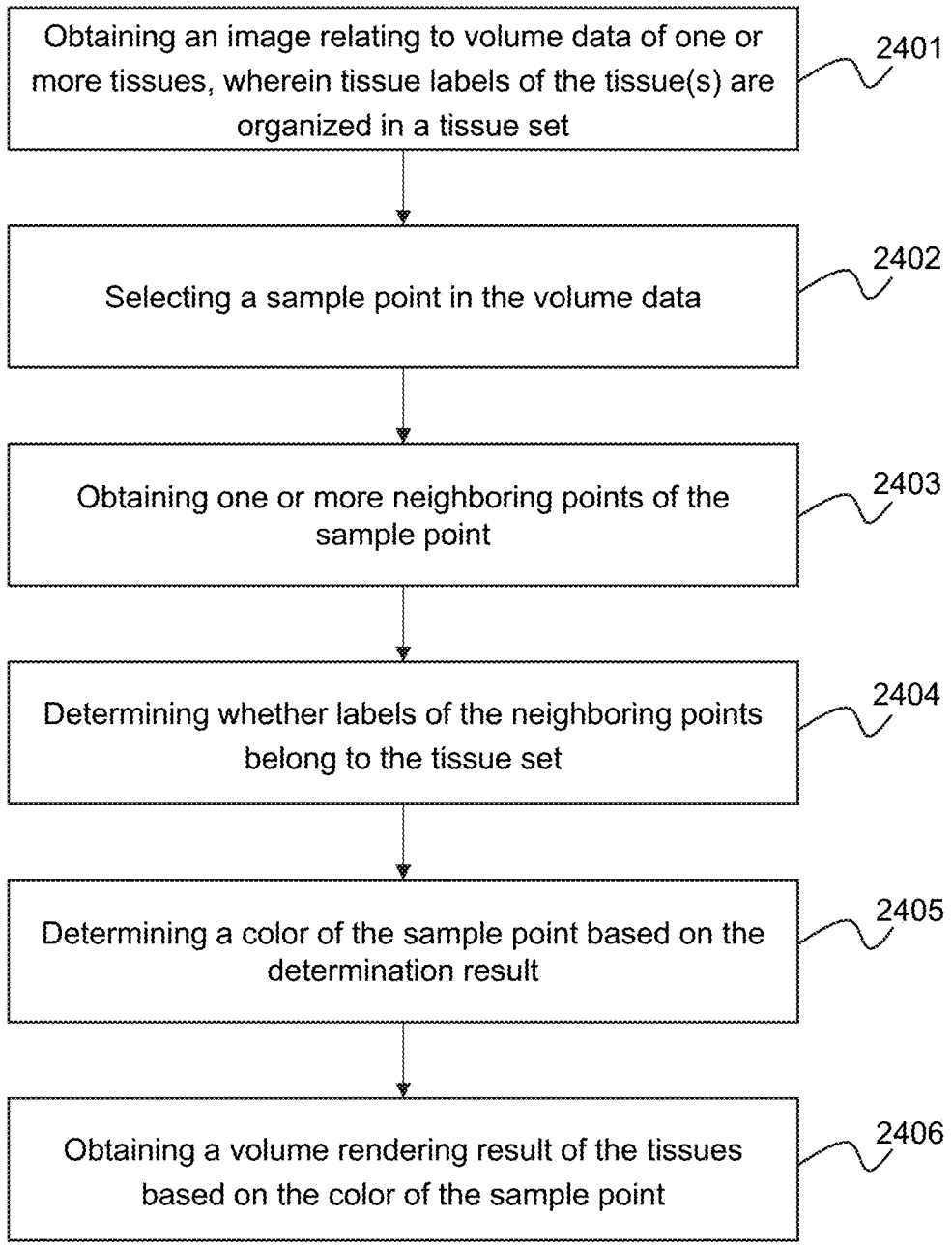
FIG. 24(a) is a flowchart illustrating an exemplary volume rendering process of a medical image according to some embodiments of the present disclosure.
FIG. 24(b) is a flowchart illustrating an exemplary volume rendering process of a medical image according to some embodiments of the present disclosure.
FIG. 24(c) is a schematic diagram illustrating a space location of a sample point relative to one or more neighboring points according to some embodiments of the present disclosure.
FIG. 24(d) is a flowchart illustrating an exemplary process for normalizing an image value of a neighboring point according to some embodiments of the present disclosure.
FIG. 24(e) is a flowchart illustrating an exemplary process for determining a color of a sample point according to some embodiments of the present disclosure.
FIG. 24(f) is a flowchart illustrating an exemplary volume rendering process for displaying a polyp tissue segmentation result in an unfolded intestinal wall according to some embodiments of the present disclosure.
Figure 24:
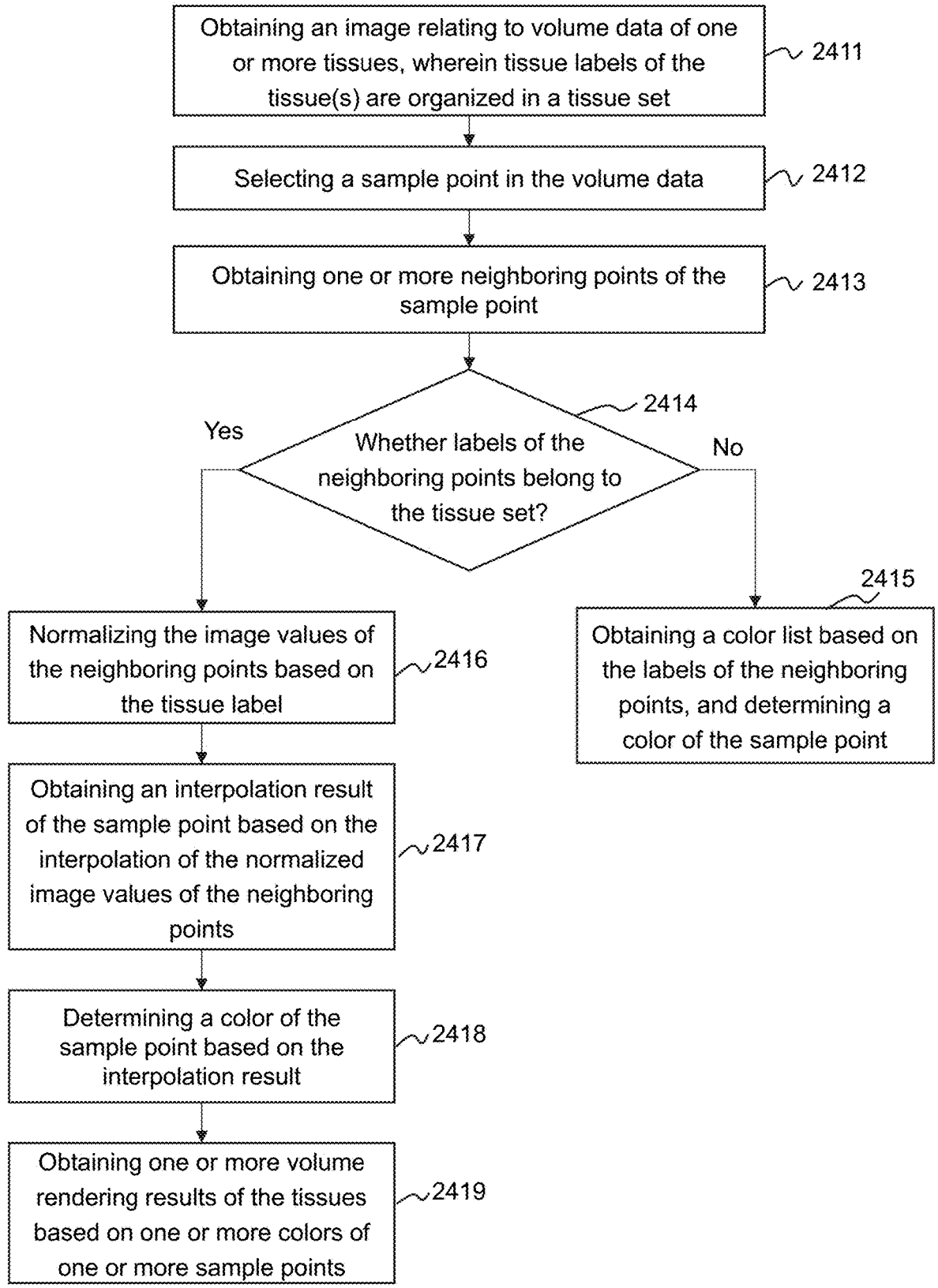
Figure 24:
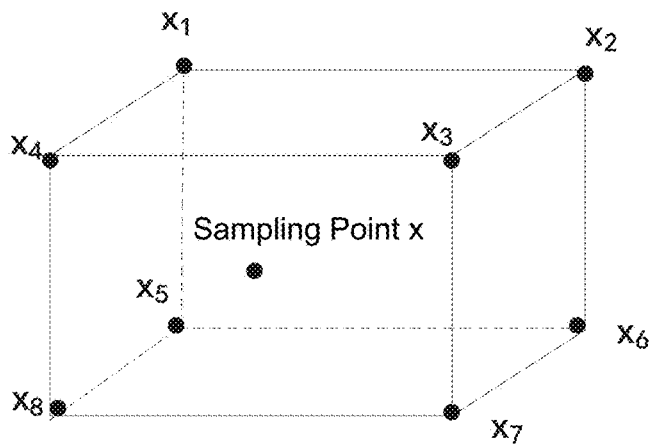
Figure 24:
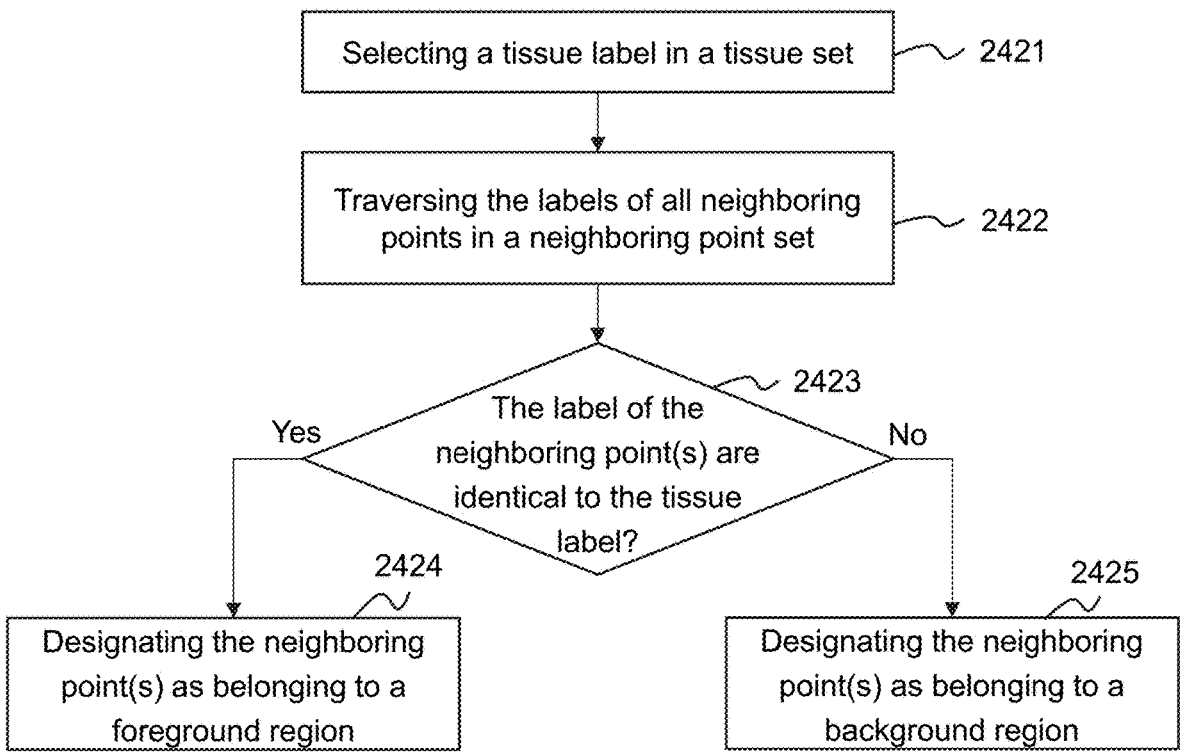
Figure 24:
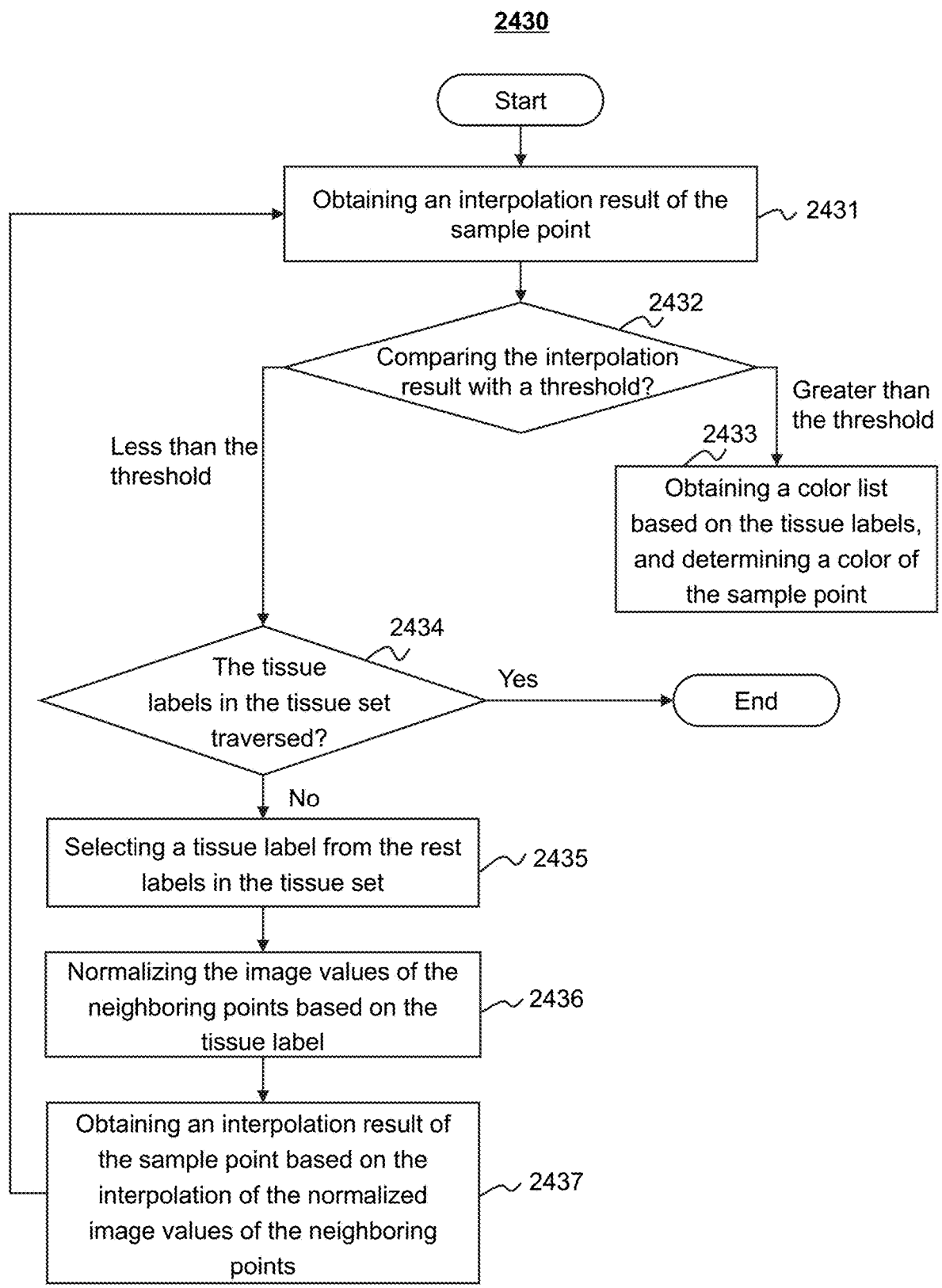
Figure 24:
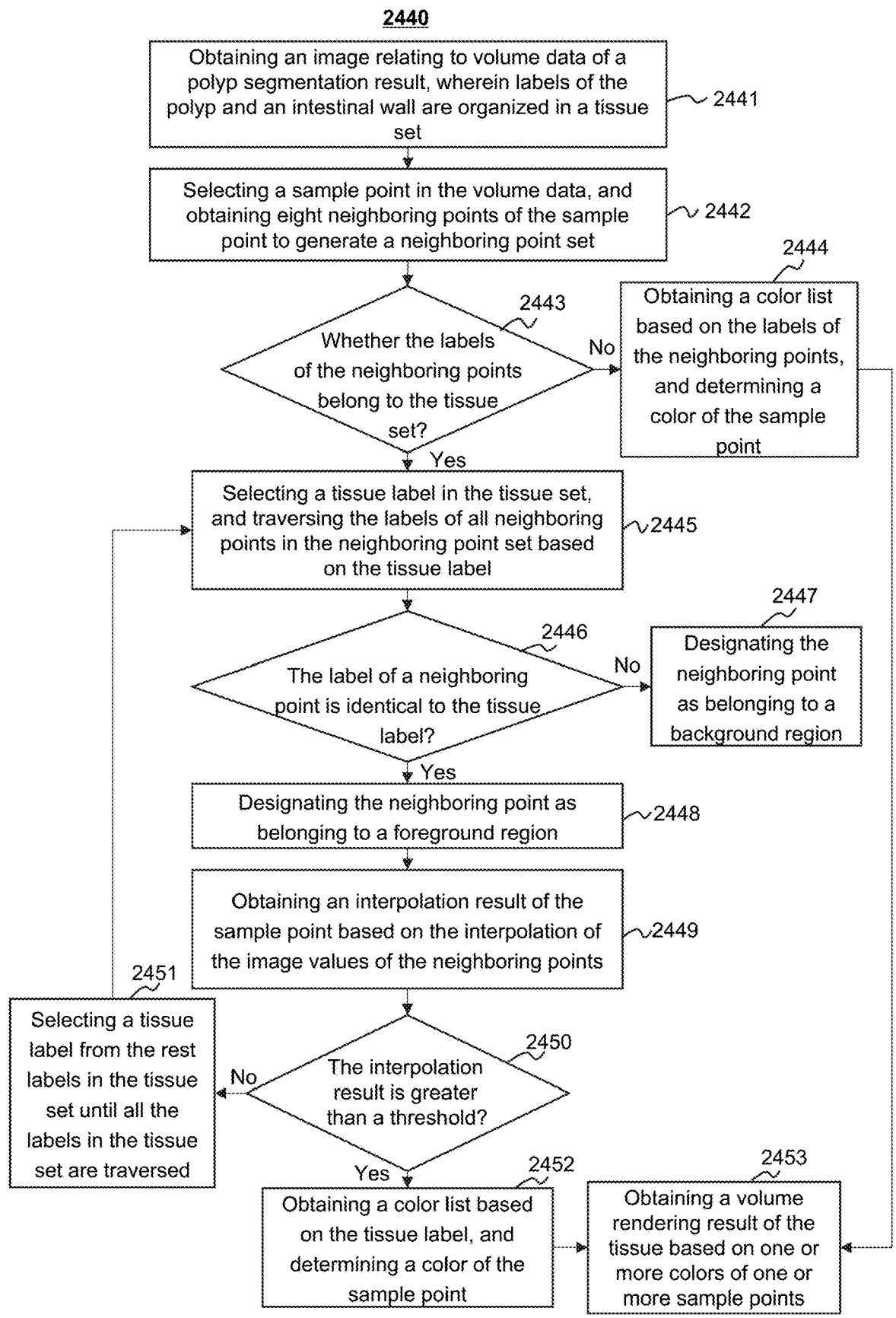

FIG. 24(*e*) is a flowchart illustrating an exemplary process for determining a color of a sample point according to some embodiments of the present disclosure. Process 2430 may be implemented by the image processing device 120, for example, the processing module 210 in the image processing device 120, or the cavity wall unfolding unit 430 in the processing module 210. In 2431, an interpolation result of the sample point may be obtained. In 2432, the interpolation result may be compared with a threshold. In some embodiments, the threshold may be a number greater than or equal to 0.5 and smaller than 1, that is, a number in a range of [0.5, 1). The comparison of the interpolation result and the threshold may refer to the determination of a probability that the sample point belongs to a selected tissue. For example, if the interpolation result of the sample point is greater than the threshold, the process may proceed to 2433, in which a color list may be obtained based on the tissue labels to determine the color of the sample point.

If the interpolation result of the sample point is less than the threshold, the process may proceed to 2434, in which it may be determined whether the tissue labels in the tissue set are traversed. If it is determined to be yes, that is, one or more (e.g., all) interpolation results of the sample point are less than the threshold, process 2430 may be ended. If it is determined to be no, that is, one or more interpolation results of the sample point are no less than the threshold, the process may proceed to 2435, in which a tissue label may be selected from the rest labels in the tissue set. In 2436, the image values of the neighboring points may be normalized based on the tissue label. In 2437, an interpolation result of the sample point may be obtained based on the interpolation of the normalized image values of the neighboring points. In some embodiments, the interpolation result may be compared with the threshold. If the interpolation result of the image value is greater than the threshold, a color list may be obtained based on the tissue labels to determine the color of the sample point. For example, the threshold may be 0.5 or 0.8.

Then the process may return to 2431 and repeat process 2430 until all of the tissue labels in the tissue set are traversed, so as to determine a tissue to which the sample point belongs, obtain a color list based on the labels, and determine the color of the sample point.

Through the above process in which it is determined whether the labels of the neighboring points belong to the tissue set, it may be determined whether the sample point is located at a boundary where it is necessary to render different tissues. If it is determined to be yes, the interpolation result of the sample point may be obtained through normalization process and interpolation operation, and the probability that the sample point belongs to a preset tissue may be further determined by comparing the interpolation result and the threshold. In some embodiments, the generation of a label of an inexistent tissue that may induce error displaying may be avoided in the operation. Then a color list may be obtained based on the labels of the tissue, and the sample point may be rendered accurately.

In 2419, one or more volume rendering results of the tissues may be obtained based on one or more colors of one or more sample points. In some embodiments, information relating to the neighboring points and the tissues may be fully used in the process, and thus, the accuracy of the rendering result may be improved, and an effect of image aliasing may be overcome.

FIG. 24(*f*) is a flowchart illustrating an exemplary volume rendering process for displaying a polyp tissue segmentation result in an unfolded intestinal wall according to some embodiments of the present disclosure. Process 2440 may be implemented by the image processing device 120, for example, the processing module 210 in the image processing device 120, or the cavity wall unfolding unit 430 in the processing module 210. In 2441, an image relating to volume data of a polyp tissue segmentation result may be obtained, in which labels of the polyp tissue and the intestinal wall are organized in a tissue set. In some embodiments, the polyp tissue segmentation result may be an output result of an image processing system (e.g., the image processing system 100). For example, the processing system may be arranged in an imaging system, or may accomplish one or more corresponding functions through a cloud computing platform, or may be obtained by transmitting from one or more interior or external storage systems such as picture archiving and communication systems (PACS).

The image relating to the polyp tissue segmentation result may include a polyp tissue and an intestinal wall tissue. Labels of the intestinal wall tissue and the polyp tissue may include one or more attributes of volume data of corresponding tissues. An image value may be marked by a tissue label, and the volume data may correspond to one or more voxels. One or more labels of the polyp tissue and the intestinal wall tissue may be preset in the tissue set. For example, for the convenience of an iteration order in one or more following processes, a label of the polyp tissue may be preset to be prior to that of the intestinal wall tissue in a processing priority order based on a goal of volume rendering of the polyp tissue.

In 2442, a sample point may be selected in the volume data, eight neighboring points of the sample point may be obtained, a neighboring point set may be generated based on the labels of the eight neighboring points. As shown in FIG. 24(*c*), the sample point x may have eight neighboring points in space.

In 2443, it may be determined whether the labels of the neighboring points belong to the tissue set. In some embodiments, for the tissue set organized by the labels of the polyp tissue and the labels of the intestinal wall tissue, and the neighboring point set organized by the eight neighboring points of the sample point, a label of a neighboring point in the neighboring point set may be selected, and it may be determined whether the label of the neighboring point belongs to the tissue set. That is, whether the label of the neighboring point is the same as a tissue label in the tissue set, or whether an attribute of the neighboring point is the same as that of the polyp tissue or the intestinal wall tissue in the tissue set, that is, whether the neighboring point belongs to the intestinal wall tissue, the polyp tissue, or other noise regions.

If the determination result is no, the process may proceed to 2444, in which a color list may be obtained based on the labels of the neighboring points, and the color of the sample point may be determined. The color list may be used to preset one or more color attributes of the voxels. There may be a mapping relationship between the color attributes and the image values of the voxels. In some embodiments, the image values of the voxels may be represented by one or more labels. An image value of the sample point may be obtained based on the labels of the neighboring points. A color attribute of the sample point may be further obtained based on a mapping relationship between the image value of the sample point and the color list, and then volume rendering may be performed to the sample point. Then the process may proceed to 2453, in which one or more colors that belong respectively to the polyp tissue or the intestinal wall tissue may be obtained in an image relating to a polyp segmentation result based on the color(s) of the sample point(s).

If the determination result is yes, in 2445, a tissue label in the tissue set may be selected, a label of the polyp tissue may be selected based on an order of the tissue label, and the labels of all neighboring points in the neighboring point set may be traversed based on the tissue label. In 2446, it may be determined whether the label of a neighboring point is identical to the tissue label. In some embodiments, it may be determined whether the neighboring points belong to the polyp tissue. If the label of a neighboring point is not identical to the tissue label, the process may proceed to 2447, in which the neighboring point may be designated as belonging to a background region.

If the label of the neighboring point is identical to the tissue label, the process may proceed to 2448, in which the neighboring point may be designated as belonging to a foreground region. In some embodiments, the determination of the neighboring point may be realized through binarization processing. For example, if the label of the neighboring point is identical to that of the polyp tissue, the image value of the neighboring point may be set to 1; if not, the image value of the neighboring point may be set to 0. In some embodiments, the labels of the neighboring points may be normalized, and the normalized labels may be used in the following interpolation processing, and thus, speed and accuracy of the volume rendering may be improved.

In 2449, an interpolation result of the sample point may be obtained based on the interpolation of the image values of the neighboring points. For example, interpolation results of the neighboring points with respect to the sample point may be determined using linear interpolation based on an interpolation coefficient function. An exemplary interpolation operation may be performed based on Equation (6). Then the interpolation results of the sample points may be obtained on one or more mathematical operations including addition, averaging, and/or integration.

In 2450, the interpolation result may be compared with the threshold. If the interpolation result is less than the threshold, the process may proceed to 2451, a tissue label may be selected from the rest labels in the tissue set, and operations 2445 through 2450 may be performed repeatedly until all the labels in the tissue set are traversed. In some embodiments, the tissue label may include labels of the polyp tissue and labels of the intestinal wall tissue. For example, a label of the polyp tissue may be selected according to a preset label priority. If the interpolation result of the sample point obtained in operations 2445 through 2451 is less than the preset threshold, that is, the probability that the sample point does not belong to the polyp tissue is relatively larger, then a label of the intestinal wall tissue may be selected and operations 2445 through 2450 may be performed repeatedly. The threshold may be a number in the range of [0.5, 1). For example, the preset threshold may be 0.5, 0.6, or 0.8.

If the interpolation result is greater than the threshold, the process may proceed to 2452, and a color list may be obtained based on the tissue label. For example, the volume rendering may be performed to the sample point based on the color of the polyp tissue preset in the color list.

Figure 31A:
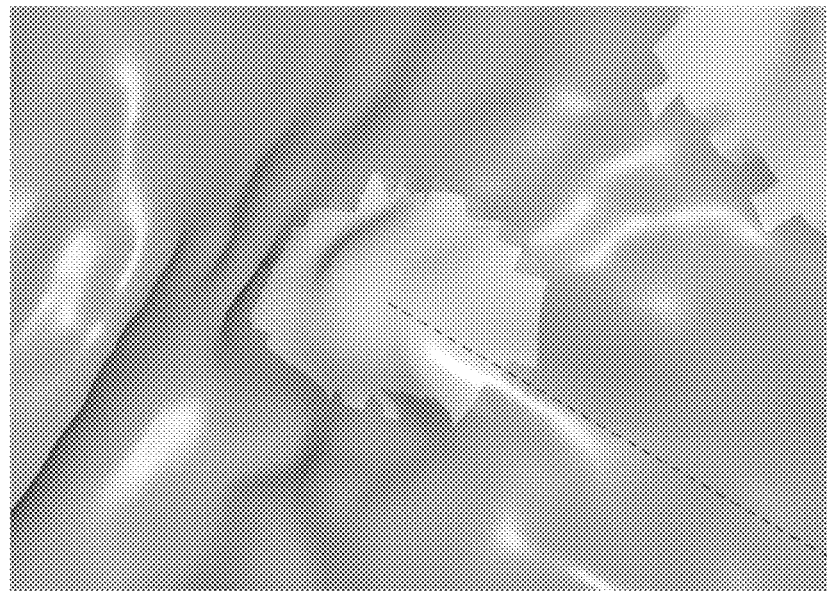
FIG. 31(a) is a schematic diagram illustrating an exemplary medical image obtained before and after volume rendering according to some embodiments of the present disclosure.
Figure 31B:
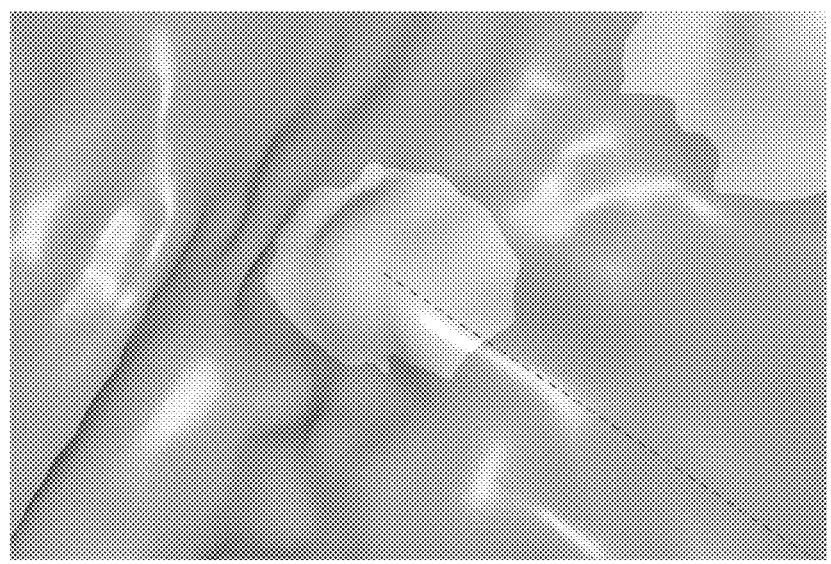
FIG. 31(b) is a schematic diagram illustrating an exemplary medical image obtained before and after volume rendering according to some embodiments of the present disclosure.

In 2453, a color that belongs respectively to the polyp tissue or the intestinal wall tissue in an image relating to a polyp segmentation result may be obtained based on one or more colors of one or more sample points, as shown in FIGS. 31(a) and 31(b).

It should be noted that the above description of the processes 2400, 2410, 2420, 2430, and 2440 are merely provided for the purposes of illustration, and not intended to limit the scope of the present disclosure. For persons having ordinary skills in the art, combinations may be made to one or more of the operations, and modifications and changes may be made to the operations of the processes on the basis of achieving the above functions under the teachings of the above processes 2400, 2410, 2420, 2430, and 2440. However, those variations and modifications do not depart from the scope of the present disclosure. For example, in some embodiments, operation 2416 in process 2410 may further include process 2420, and operation 2418 in process 2410 may further include process 2430. Such variations are within the scope of the present disclosure.

Figure 25A:
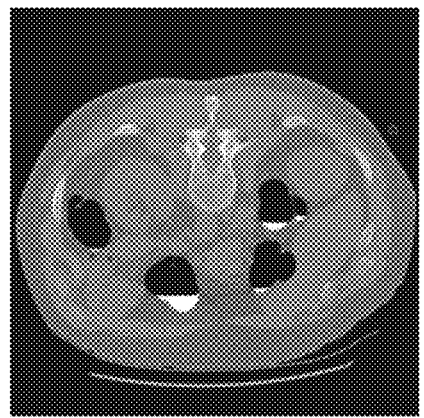
FIG. 25(a) is a schematic diagram illustrating segmentation of an image relating to a colon according to some embodiments of the present disclosure.
Figure 25B:
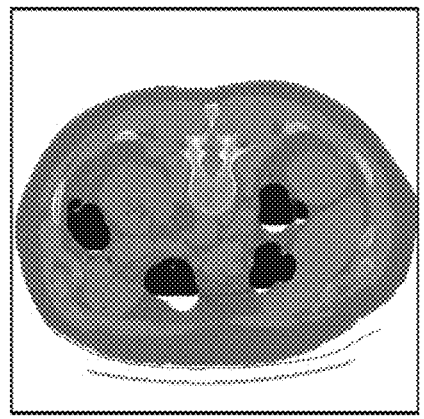
FIG. 25(b) is a schematic diagram illustrating segmentation of an image relating to a colon according to some embodiments of the present disclosure.
Figure 25C:
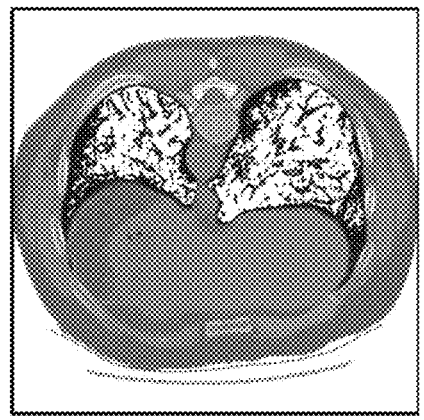
FIG. 25(c) is a schematic diagram illustrating segmentation of an image relating to a colon according to some embodiments of the present disclosure.

FIGS. 25(a), 25(b), and 25(c) are schematic diagrams illustrating segmentation of an image relating to a colon according to some embodiments of the present disclosure. FIG. 25(a) shows an original image relating to a colon. In some embodiments, the original image may be obtained through computed tomography colonography (CTC) in the imaging system 110. FIG. 25(b) shows an image relating to a colon obtained after removing one or more background voxels. In some embodiments, the image shown in FIG. 25(b) may be obtained through process 600. FIG. 25(c) shows an image relating to a colon obtained after removing air in one or more lungs. In some embodiments, the image shown in FIG. 25(c) may be obtained through process 600.

Figure 26A:
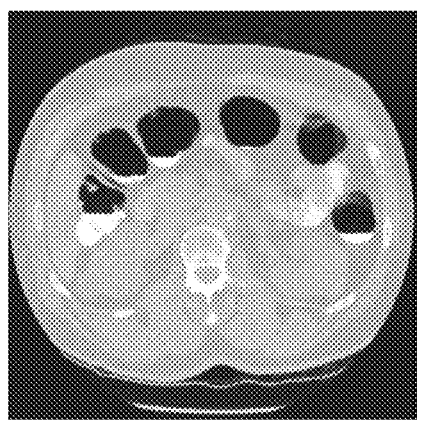
FIG. 26(a) is a schematic diagram illustrating segmentation of another image relating to a colon according to some embodiments of the present disclosure.
Figure 26B:
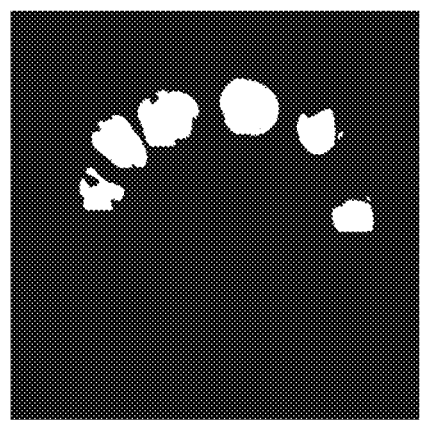
FIG. 26(b) is a schematic diagram illustrating segmentation of another image relating to a colon according to some embodiments of the present disclosure.
Figure 26C:
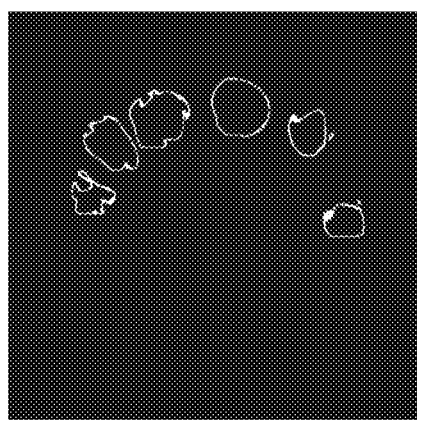
FIG. 26(c) is a schematic diagram illustrating segmentation of another image relating to a colon according to some embodiments of the present disclosure.
Figure 26D:
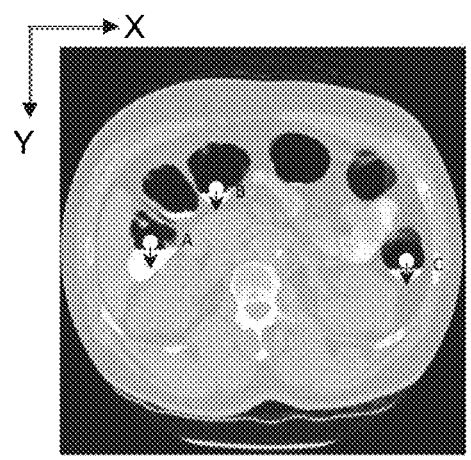
FIG. 26(d) is a schematic diagram illustrating segmentation of another image relating to a colon according to some embodiments of the present disclosure.

FIGS. 26(a), 26(b), and 26(c) are schematic diagrams illustrating segmentation of another image relating to a colon according to some embodiments of the present disclosure. FIG. 26(a) shows an original image relating to a colon. In some embodiments, the original image may be obtained through computed tomography colonography (CTC) in the imaging system 110. FIG. 26(b) shows an air segmentation result of the image relating to a colon. In some embodiments, the air segmentation result may be obtained through process 600. FIG. 26(c) shows one or more boundary voxels of the air in the image relating to a colon. In some embodiments, the boundary voxels of the air in the colon may be obtained through operation 606 in process 600. FIG. 26(d) shows a schematic diagram of an image relating to a colon viewing from the boundary voxels towards a positive direction of the Y axis. In some embodiments, the image shown in FIG. 26(d) may be a specific implementation result of operation 606, in which one or more liquid points were detected based on seed points relating to the segmented colon points.

Figure 27A:
FIG. 27(a) is a schematic diagram illustrating an exemplary segmentation result of an image relating to a colon according to some embodiments of the present disclosure.
Figure 27B:
FIG. 27(b) is a schematic diagram illustrating an exemplary segmentation result of an image relating to a colon according to some embodiments of the present disclosure.
Figure 27C:
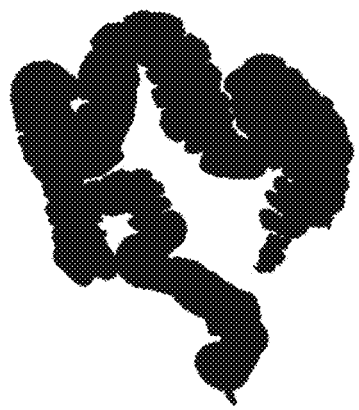
FIG. 27(c) is a schematic diagram illustrating an exemplary segmentation result of an image relating to a colon according to some embodiments of the present disclosure.
Figure 27D:
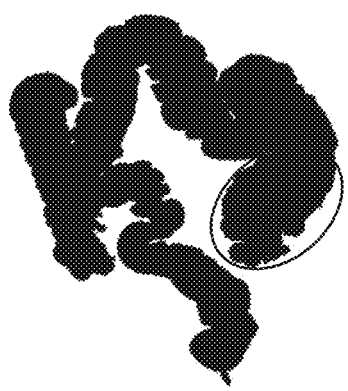
FIG. 27(d) is a schematic diagram illustrating an exemplary segmentation result of an image relating to a colon according to some embodiments of the present disclosure.
Figure 27E:
FIG. 27(e) is a schematic diagram illustrating an exemplary segmentation result of an image relating to a colon according to some embodiments of the present disclosure.
Figure 27F:
FIG. 27(f) is a schematic diagram illustrating an exemplary segmentation result of an image relating to a colon according to some embodiments of the present disclosure.

FIGS. 27(a), 27(b), 27(c), 27(d), 27(e), and 27(f) are schematic diagrams illustrating exemplary segmentation results of an image relating to a colon according to some embodiments of the present disclosure. FIGS. 27(a) and 27(b) show a first comparison between two segmentation results based on a first set of image data relating to a colon. FIG. 27(a) shows an original image relating to a colon. In some embodiments, the original image may be obtained through computed tomography colonography (CTC) in the imaging system 110. The original image may be an image relating to a colon before compensation. FIG. 27(b) shows a compensated image. In some embodiments, the compensated image relating to a colon may be obtained through process 600. FIGS. 27(c) and 27(d) show a second comparison between two segmentation results based on a second set of image data relating to a colon. FIG. 27(c) shows an original image relating to a colon. The original image may be an image relating to a colon before compensation. FIG. 27(d) shows a compensated image. In some embodiments, the compensated image relating to a colon may be obtained through process 600. FIGS. 27(e) and 27(f) show a third comparison between two segmentation results based on a third set of image data relating to a colon. FIG. 27(e) shows an original image relating to a colon. The original image may be an image relating to a colon before compensation. FIG. 27(f) shows a compensated image. In some embodiments, the compensated image relating to a colon may be obtained through process 600.

It should be noted that the schematic diagrams of FIGS. 25(a), 25(b), 25(c), 26(a), 26(b), 26(c), 26(d), 27(a), 27(b), 27(c), 27(d), 27(e), and 27(f) are merely provided for the purposes of illustration, and not intended to limit the scope of the present disclosure.

Figure 28A:
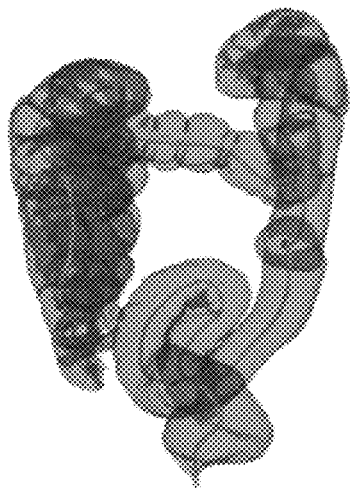
FIG. 28(a) is a schematic diagram illustrating an exemplary colon structure according to some embodiments of the present disclosure.
Figure 28B:
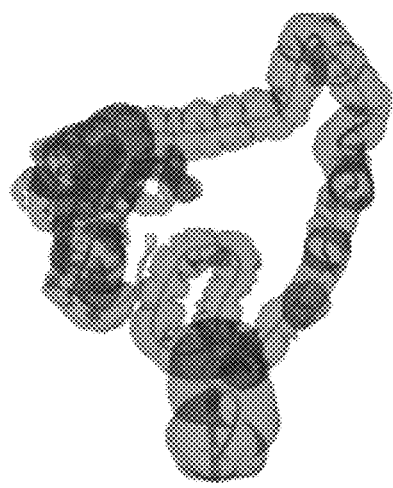
FIG. 28(b) is a schematic diagram illustrating an exemplary colon structure according to some embodiments of the present disclosure.
Figure 28C:
FIG. 28(c) is a schematic diagram illustrating an exemplary colon structure according to some embodiments of the present disclosure.
Figure 28D:
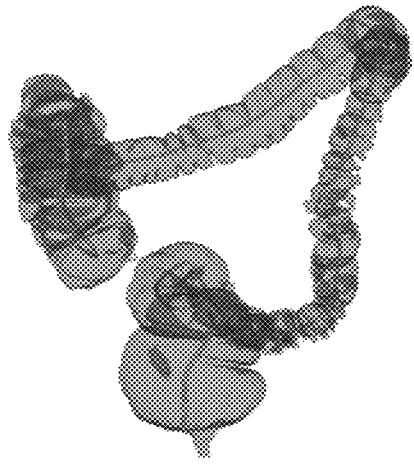
FIG. 28(d) is a schematic diagram illustrating an exemplary colon structure according to some embodiments of the present disclosure.

FIGS. 28(a), 28(b), and 28(c) are schematic diagrams illustrating exemplary colon structures according to some embodiments of the present disclosure. FIGS. 28(a), 28(b), and 28(c) are schematic diagrams of exemplary colons having an adhesion structure according to some embodiments of the present disclosure. The adhesion structure may be formed by adhesion of different regions of a colon, simple adhesion between a colon and a non-colon structure such as a small intestine, a complex adhesion between a colon and a non-colon structure such as a small intestine, or the like, or any combination thereof. FIG. 28(d) shows a schematic diagram illustrating an exemplary colon obtained by removing one or more adhesion structures of the colon in FIG. 28(c) according to some embodiments of the present disclosure. In some embodiments, colon obtained by removing one or more adhesion structures may be obtained through process 1650.

Figure 29A:
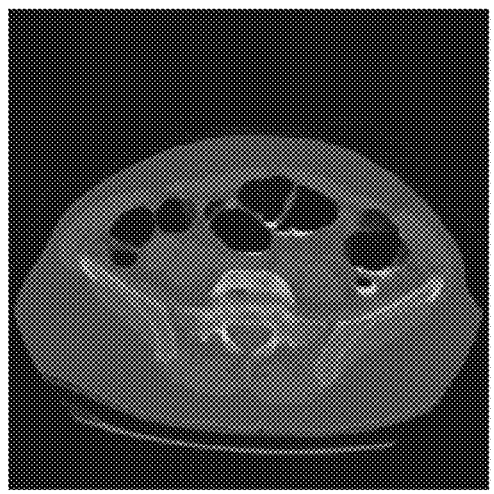
FIG. 29(a) is a schematic diagram illustrating an exemplary two-dimensional CT scanning image relating to a colon portion according to some embodiments of the present disclosure.
Figure 29B:
FIG. 29(b) is a schematic diagram illustrating an exemplary two-dimensional CT scanning image relating to a colon portion according to some embodiments of the present disclosure.
Figure 29C:
FIG. 29(c) is a schematic diagram illustrating an exemplary two-dimensional CT scanning image relating to a colon portion according to some embodiments of the present disclosure.

FIGS. 29(a), 29(b), and 29(c) are schematic diagrams illustrating exemplary two-dimensional CT scanning images relating to a colon portion according to some embodiments of the present disclosure. FIGS. 29(a), 29(b), and 29(c) shows two-dimensional CT scanning images in a transverse plane, a sagittal plane, and a coronal plane, respectively.

It should be noted that the schematic diagrams of FIGS. 28(a), 28(b), 28(c), 28(d), 29(a), 29(b), and 29(c) are merely provided for the purposes of illustration, and not intended to limit the scope of the present disclosure.

Figure 30A:
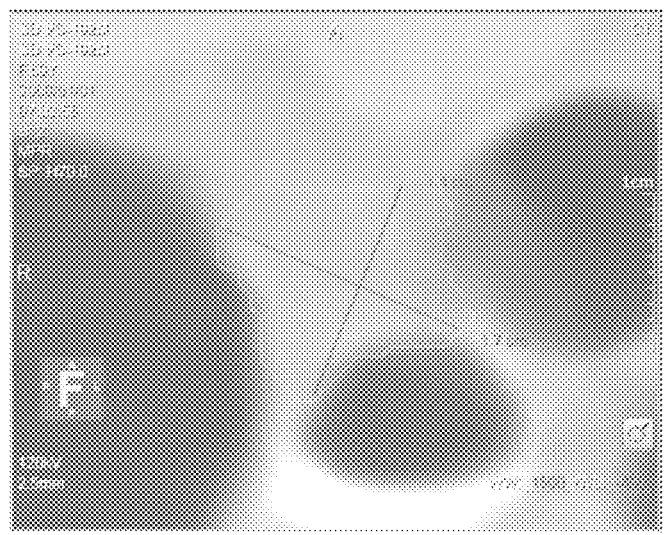
FIG. 30(a) is a schematic diagram illustrating an exemplary image relating to an effect of anti-aliasing according to some embodiments of the present disclosure.
Figure 30B:
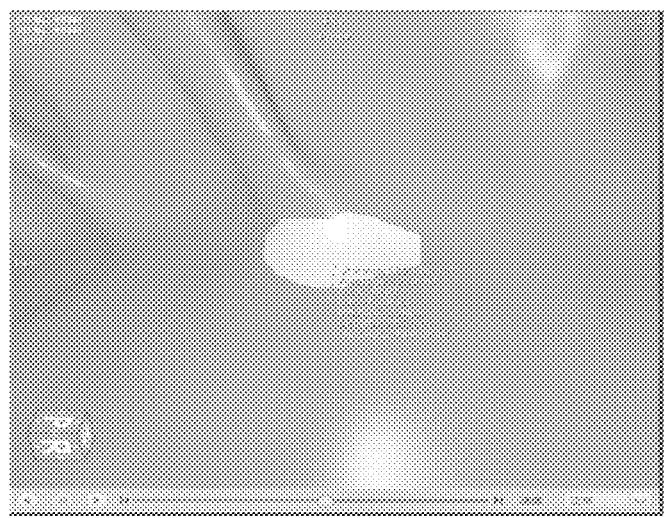
FIG. 30(b) is a schematic diagram illustrating an exemplary image relating to an effect of anti-aliasing according to some embodiments of the present disclosure.

FIGS. 30(a) and 30(b) are schematic diagrams illustrating exemplary images relating to an effect of anti-aliasing according to some embodiments of the present disclosure. FIG. 30(a) is a schematic diagram illustrating an effect of an anti-aliasing profile in image displaying. FIG. 30(b) is a schematic diagram illustrating an effect of an anti-aliasing region edge in image displaying.

FIGS. 31(a) and 31(b) are schematic diagrams illustrating an exemplary medical image obtained before and after volume rendering according to some embodiments of the present disclosure. FIG. 31(a) shows a volume rendering result of a polyp tissue segmentation result in an unfolded cavity wall of a colon. As shown in FIG. 31(a), the polyp tissue may need to be enlarged for display due to a small volume thereof, but the display effect of the image may be influenced due to aliasing of the tissue edge. The enlarged edge of the polyp tissue shown in FIG. 31(b) may be smooth and have no aliasing after being processed by a volume rendering technique described in the present disclosure.

Described above are different aspects of a method for image processing and/or a method for implementing other operations through programs. Programs in technology may refer to "products" or "articles" existing in a form of executive code and/or related data, which are participated or implemented by computer readable media. Tangible and permanent storage media may include a memory or storage used by a computer, a processor, or similar devices or related modules. For example, semiconductor memories, tape drives, magnetic disk drives, or any other devices offering storage function for software.

All or part of the software may sometimes communicate over a network such as the Internet or other network of communication. Such communication may allow software to be loaded from one computer or processor to another, for example: to be loaded from a control server or host computer in an image processing system to a hardware platform under computer environment, or other computer environment implementing a system, or a system with similar functions of providing information needed for image processing. Therefore, another medium capable of transmitting software elements may be used as a physical connection between local devices, for example, light wave, electric wave, electromagnetic wave, etc., implementing transmission through cables, fiber optic cables, or air. Physical media for carriers such as cables, wireless connection, fiber optic cables or other similar devices may be referred to as media for carrying software. Here, all terms representing "readable media" of computers or machines may represent media participated during the processing of an instruction by a processor, unless a tangible storage medium is limited thereto.

Therefore, a computer readable medium may have multiple forms which include but are not limited to a tangible storage medium, a carrier medium, or a physical transmission medium. Stable store media may include: CD or disk, and other storage systems capable of implementing system components described in the figures used in other computers or similar devices. Unstable storage media may include a dynamic memory, for example, a main memory of a computer platform. Tangible transmission media may include coaxial cables, copper cables, and optic fibers, and include lines forming a bus within a computer system. A carrier transmission medium may transmit electric signals, electromagnetic signals, sound wave signals, or light wave signals, which may be produced by a method of radio frequency or infrared data communication. Usual computer readable media may include hard disks, diskettes, tapes, any other magnetic media; CD-ROMs, DVDs, DVD-ROMs, any other optic media, punched cards, any other physical storage media including an aperture mode; RAMs, PROMs, EPROMs, FLASH-EPROMs, any other memory chips or tapes; carriers transmitting data or instructions, cables, or connecting devices transmitting carriers, or any other program codes and/or data readable by a computer. Many of these computer readable media may occur in a process of the execution of instructions and transmission of a plurality of results by a processor.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of some patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters outlined in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values outlined in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An image processing method implemented on at least one machine each of which has at least one processor and at least one storage device, the method comprising:
   obtaining an image relating to volume data of a plurality of tissues, wherein tissue labels of the plurality of tissues are organized in a tissue set;
   selecting a sample point based on the volume data;
   obtaining one or more neighboring points of the sample point, wherein one or more neighboring labels correspondingly to the one or more neighboring points respectively are organized in a neighboring point set;
   determining whether the one or more neighboring labels belong to the tissue set;
   determining a color of the sample point based on the determination result, wherein the determining a color of the sample point based on the determination result comprises:
      in response to determining that a target neighboring label of the one or more neighboring labels does not belong to the tissue set, obtaining a first color list based on the target neighboring label, the first color list including preset color attributes corresponding to image values respectively; and
      determining the color of the sample point based on an image value of the sample point and the first color list; and
   obtaining a volume rendering result of the plurality of tissues based on the color of the sample point.

2. The method of claim 1, the determining whether the one or more neighboring labels belong to the tissue set comprising:
   determining whether the target neighboring label is the same as one of the tissue labels in the tissue set;
   in response to determining that the target neighboring label is the same as one of the tissue labels in the tissue set, determining that the target neighboring label belongs to the tissue set; and
   in response to determining that the target neighboring label is different from any one of the tissue labels in the tissue set, determining that the target neighboring label does not belong to the tissue set.

3. The method of claim 1, wherein the target neighboring label is a closest neighboring point of the sample point.

4. The method of claim 2, the determining a color of the sample point based on the determination result further comprising:
   in response to determining that the target neighboring point belongs to the tissue set, selecting a tissue label in the tissue set and normalizing image values of the plurality of neighboring points based on the selected tissue label;
   obtaining an interpolation result of the sample point based on an interpolation of the normalized image values of the plurality of neighboring points; and
   determining the color of the sampling point based on the interpolation result.

5. The method of claim 4, the normalizing image values of the plurality of neighboring points based on the selected tissue label comprising:
   traversing the neighboring labels in the neighboring point set;
   for each of the traversed neighboring labels in the neighboring point set,
      determining whether the neighboring label is identical to the selected tissue label;
      in response to determining that the neighboring label is identical to the selected tissue label, designating a neighboring point corresponding to the neighboring label as belonging to a foreground region and setting an image value of the neighboring point as a first value; and
      in response to determining that the neighboring label is not identical to the selected tissue label, designating the neighboring point corresponding to the neighboring label as belonging to a background region and setting the image value of the neighboring point as a second value.

6. The method of claim 5, wherein the first value is 1 and the second value is 0.

7. The method of claim 4, the determining the color of the sampling point based on the interpolation result comprising:
   comparing the interpolation result of the sampling point with a threshold;
   in response to determining that the interpolation result of the sampling point is greater than the threshold, obtaining a second color list based on the selected tissue label, the second color list including preset color attributes corresponding to image values respectively; and
   determining the color of the sample point based on an image value of the sample point and the second color list.

8. The method of claim 7, the determining the color of the sampling point based on the interpolation result further comprising:
   in response to determining that the interpolation result of the sampling point is less than the threshold, selecting another tissue label from rest tissue labels in the rest tissue set and normalizing the image values of the plurality of neighboring points based on the updated selected tissue label;
   obtaining an updated interpolation result of the sample point based on an interpolation of the updated normalized image values of the plurality of neighboring points;
   comparing the updated interpolation result of the sampling point with a threshold; and in response to determining that the updated interpolation result of the sampling point is less than the threshold, repeating operations of selecting another tissue label in rest tissue labels in the tissue set, normalizing the image values of the plurality of neighboring points based on the updated selected tissue label, and obtaining an updated interpolation result of the sample point based on an interpolation of the updated normalized image values of the plurality of neighboring points, until the updated interpolation result is larger than the threshold or otherwise all the tissue labels in the tissue set are traversed.

9. The method of claim 4, wherein the interpolation includes at least one of a linear interpolation, a nonlinear interpolation, an interpolation based on a regularization function, or a diffusion interpolation based on a partial differential equation.

10. A system for image processing, comprising:
at least one storage device storing a set of instructions; and
at least one processor configured to communicate with the at least one storage device, wherein when executing the set of instructions, the at least one processor is directed to cause the system to:
obtain an image relating to volume data of a plurality of tissues, wherein tissue labels of the plurality of tissues are organized in a tissue set;
select a sample point based on the volume data;
obtain one or more neighboring points of the sample point, wherein one or more neighboring labels corresponding to the one or more neighboring points respectively are organized in a neighboring point set;
determine whether the one or more neighboring labels belong to the tissue set;
determine a color of the sample point based on the determination result, wherein to determine a color of the sample point based on the determination result, the at least one processor is directed to cause the system to:
in response to determining that a target neighboring label of the one or more neighboring labels does not belong to the tissue set, obtain a first color list based on the target neighboring label, the first color list including preset color attributes corresponding to image values respectively; and
determine the color of the sample point based on an image value of the sample point and the first color list; and
obtain a volume rendering result of the plurality of tissues based on the color of the sample point.

11. The system of claim 10, wherein to determine whether the one or more neighboring labels belong to the tissue set, the at least one processor is directed to cause the system to:
determine whether the target neighboring label is the same as one of the tissue labels in the tissue set;
in response to determining that the target neighboring label is the same as one of the tissue labels in the tissue set, determine that the target neighboring label belongs to the tissue set; and
in response to determining that the target neighboring label is different from any one of the tissue labels in the tissue set, determine that the target neighboring label does not belong to the tissue set.

12. The method of claim 10, wherein the target neighboring label is a closest neighboring point of the sample point.

13. The system of claim 11, wherein to determine a color of the sample point based on the determination result, the at least one processor is further directed to cause the system to:
in response to determining that the target neighboring point belongs to the tissue set, select a tissue label in the tissue set and normalize image values of the plurality of neighboring points based on the selected tissue label;
obtain an interpolation result of the sample point based on an interpolation of the normalized image values of the plurality of neighboring points; and
determine the color of the sampling point based on the interpolation result.

14. The system of claim 13, wherein to normalize image values of the plurality of neighboring points based on the selected tissue label, the at least one processor is directed to cause the system to:
travers the neighboring labels in the neighboring point set;
for each of the traversed neighboring labels in the neighboring point set,
determine whether the neighboring label is identical to the selected tissue label;
in response to determining that the neighboring label is identical to the selected tissue label, designating a neighboring point corresponding to the neighboring label as belonging to a foreground region and setting an image value of the neighboring point as a first value; and
in response to determining that the neighboring label is not identical to the selected tissue label, designate the neighboring point corresponding to the neighboring label as belonging to a background region and set the image value of the neighboring point as a second value.

15. The system of claim 14, wherein the first value is 1 and the second value is 0.

16. The system of claim 13, wherein to determine the color of the sampling point based on the interpolation result, the at least one processor is directed to cause the system to:
compare the interpolation result of the sampling point with a threshold;
in response to determining that the interpolation result of the sampling point is greater than the threshold, obtain a second color list based on the selected tissue label, the second color list including preset color attributes corresponding to image values respectively; and
determine the color of the sample point based on an image value of the sample point and the second color list.

17. The method of claim 16, wherein to determine the color of the sampling point based on the interpolation result further comprising, the at least one processor is further directed to cause the system to:
in response to determining that the interpolation result of the sampling point is less than the threshold, select another tissue label from rest tissue labels in the rest tissue set and normalize the image values of the plurality of neighboring points based on the updated selected tissue label;
obtain an updated interpolation result of the sample point based on an interpolation of the updated normalized image values of the plurality of neighboring points;
compare the updated interpolation result of the sampling point with a threshold; and
in response to determine that the updated interpolation result of the sampling point is less than the threshold, repeat operations of selecting another tissue label in rest tissue labels in the tissue set, normalizing the image values of the plurality of neighboring points based on the updated selected tissue label, and obtaining an updated interpolation result of the sample point based on an interpolation of the updated normalized image values of the plurality of neighboring points, until the updated interpolation result is larger than the threshold or otherwise all the tissue labels in the tissue set are traversed.

18. A non-transitory computer readable medium storing instructions, the instructions, when executed by at least one machine, causing the at least one machine to implement a method comprising:
   obtaining an image relating to volume data of a plurality of tissues, wherein tissue labels of the plurality of tissues are organized in a tissue set;
   selecting a sample point based on the volume data;
   obtaining one or more neighboring points of the sample point, wherein one or more neighboring labels corresponding to the one or more neighboring points respectively are organized in a neighboring point set;
   determining whether the one or more neighboring labels belong to the tissue set;
   determining a color of the sample point based on the determination result, wherein the determining a color of the sample point based on the determination result comprises:
      in response to determining that a target neighboring label of the one or more neighboring labels does not belong to the tissue set, obtaining a first color list based on the target neighboring label, the first color list including preset color attributes corresponding to image values respectively; and
      determining the color of the sample point based on an image value of the sample point and the first color list; and
   obtaining a volume rendering result of the plurality of tissues based on the color of the sample point.

* * * * *